April 2, 1957     O. H. SCHUCK     2,787,428
AIR TRAFFIC CONTROL APPARATUS
Filed June 17, 1948     20 Sheets-Sheet 1
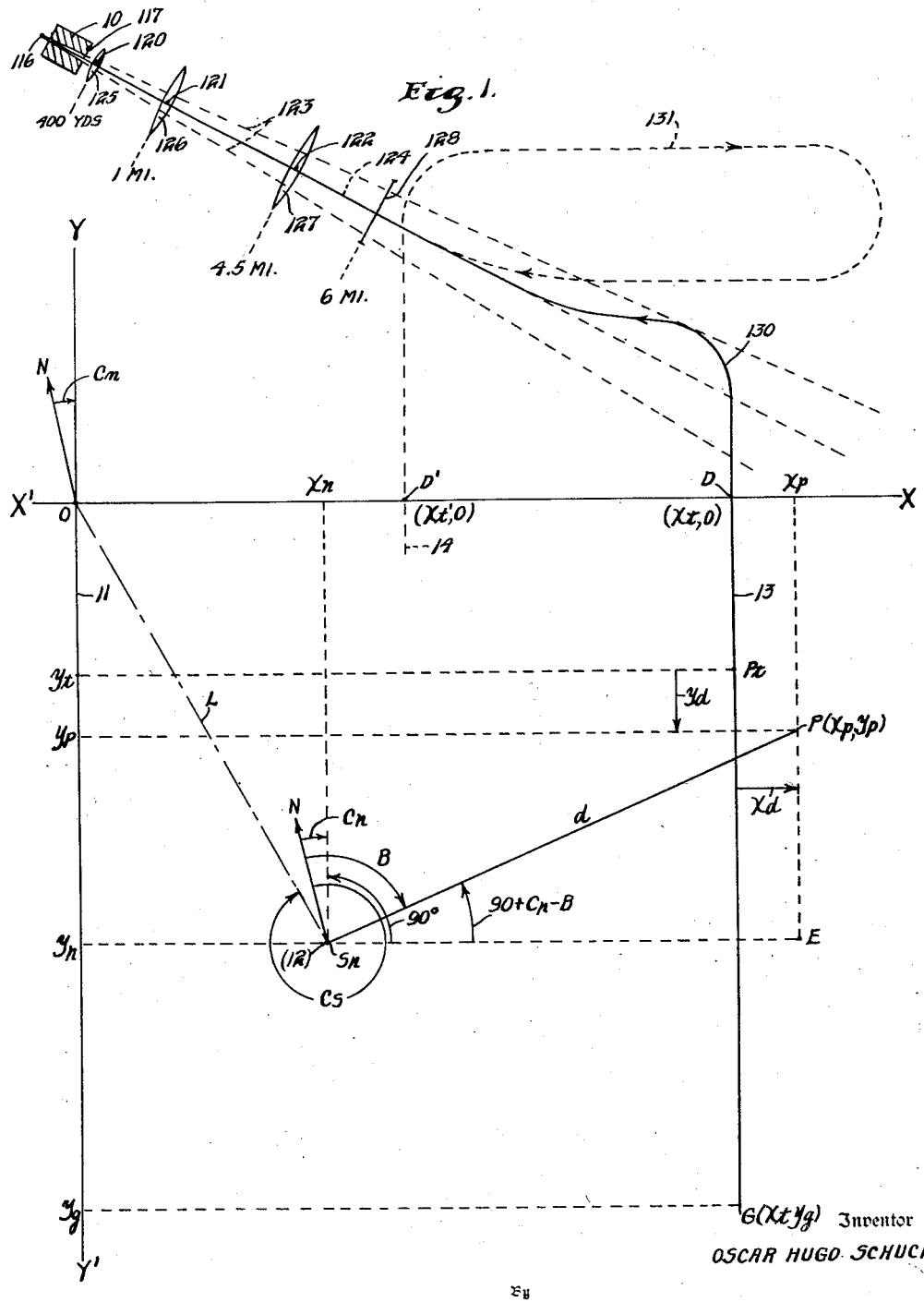
Inventor
OSCAR HUGO SCHUCK
George H. Fisher
Attorney

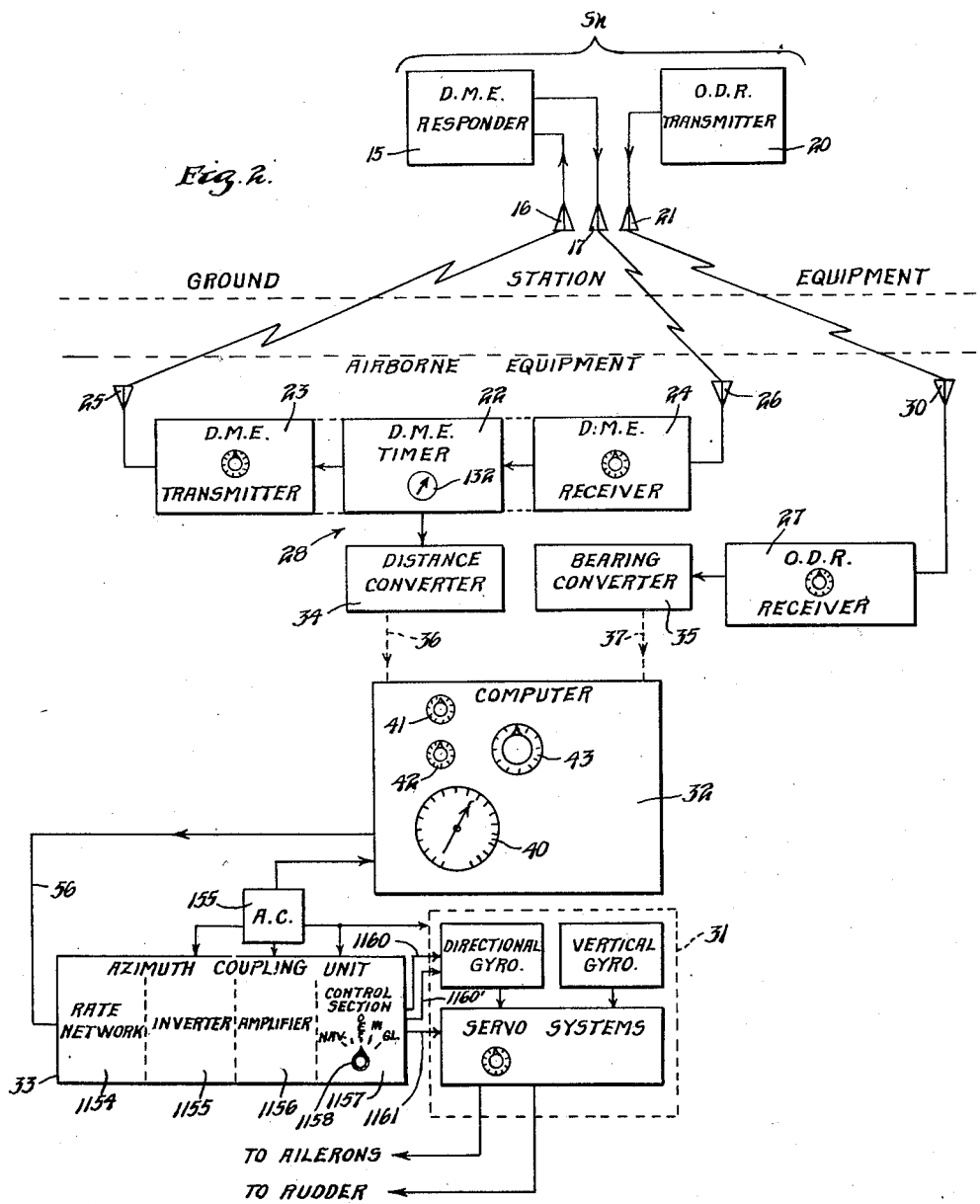

April 2, 1957     O. H. SCHUCK     2,787,428
AIR TRAFFIC CONTROL APPARATUS
Filed June 17, 1948     20 Sheets-Sheet 3
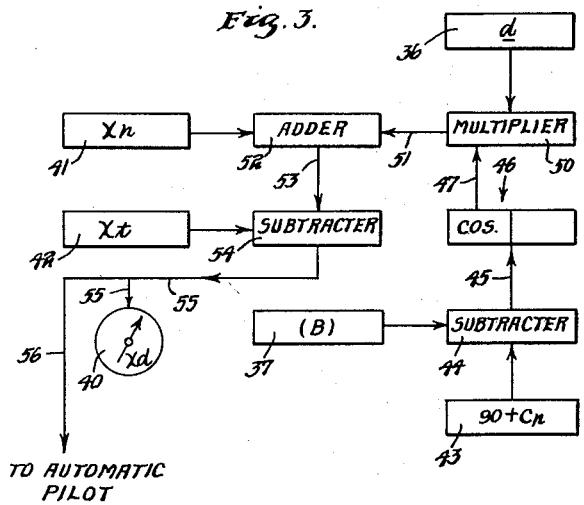
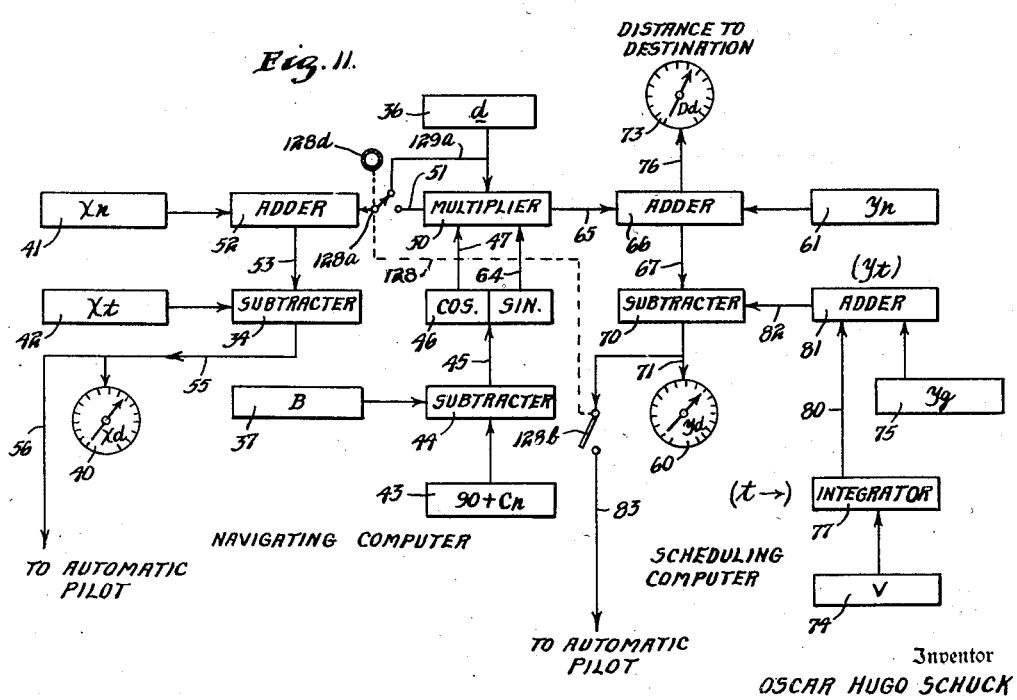
Inventor
OSCAR HUGO SCHUCK
By
George H. Fisher
Attorney

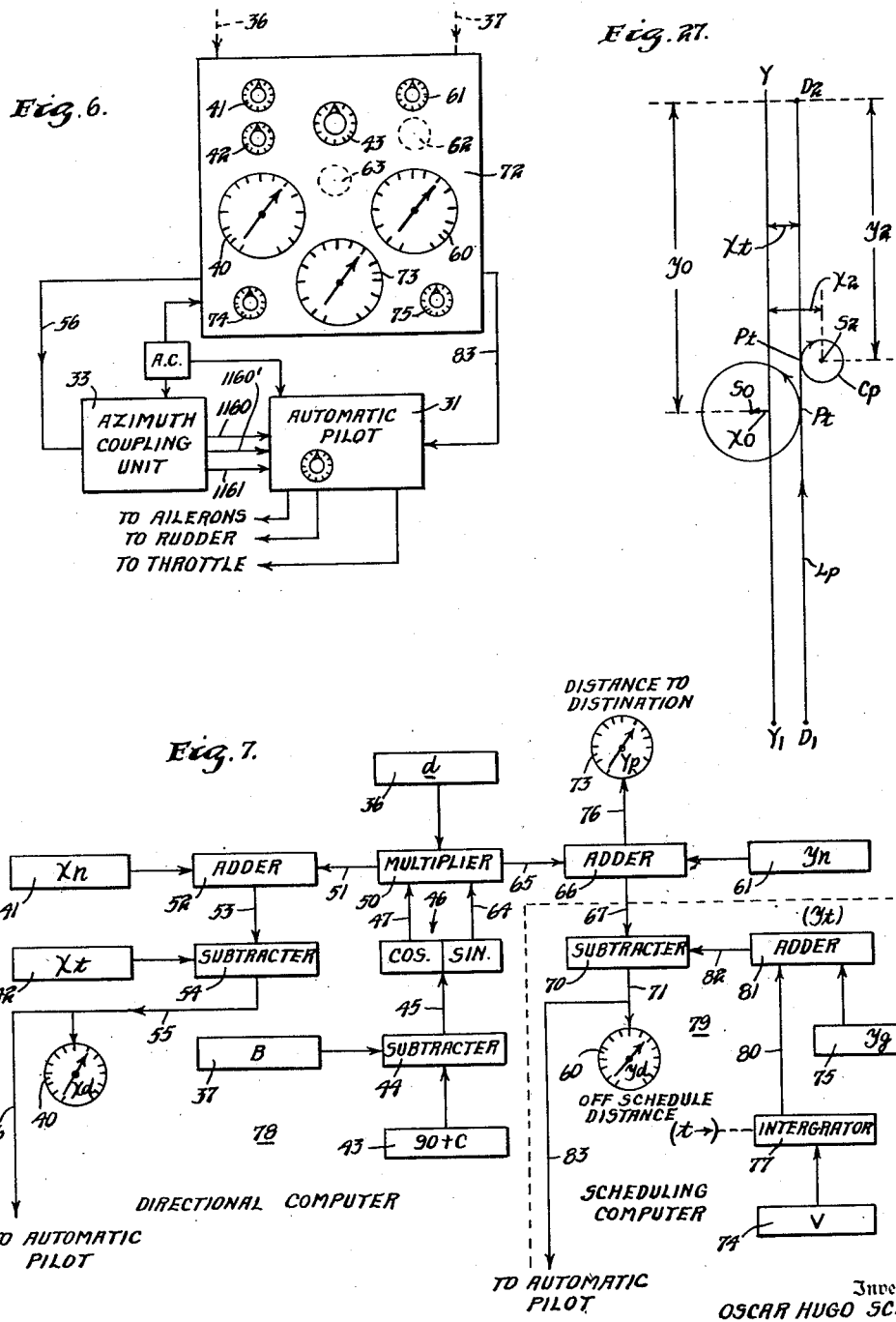

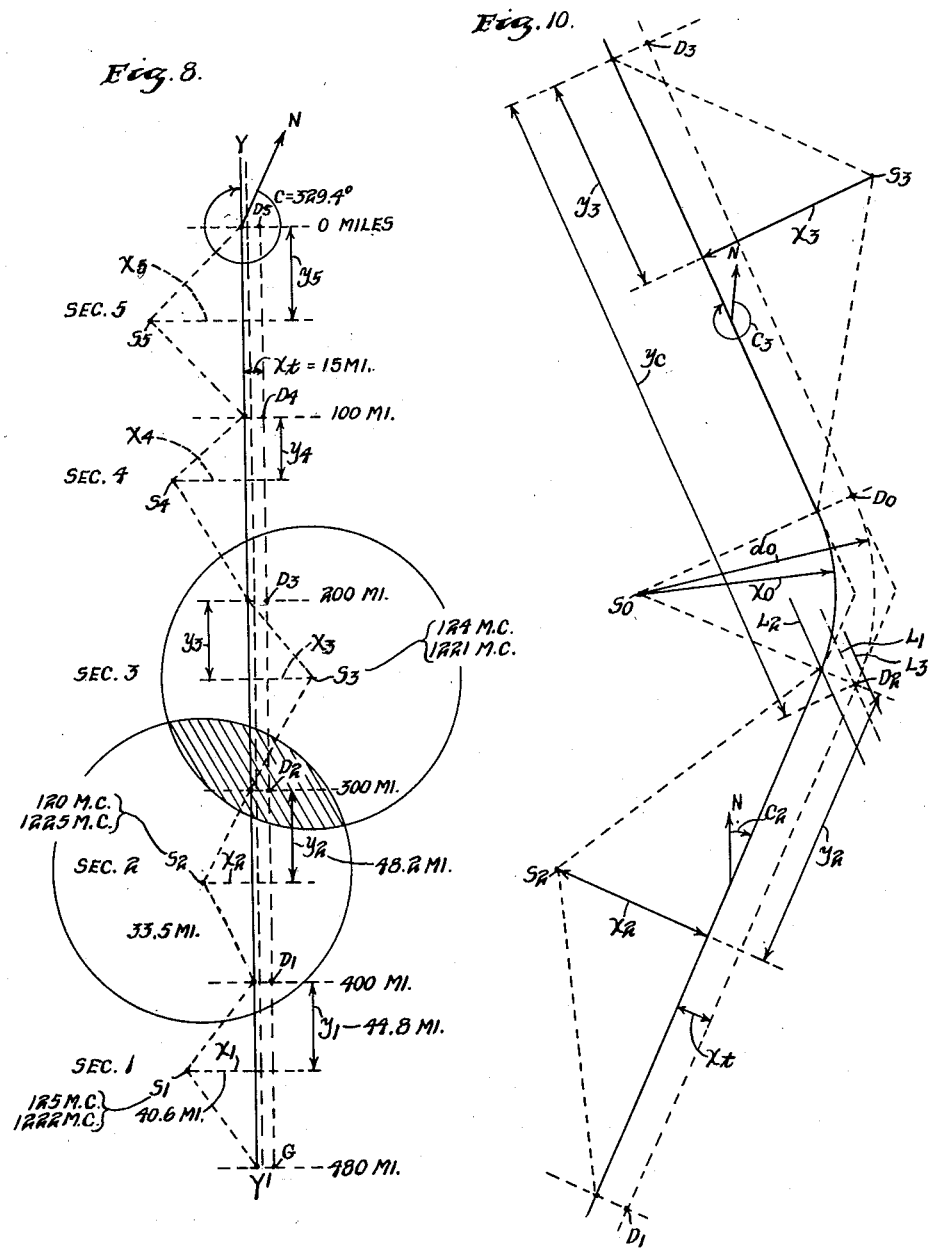

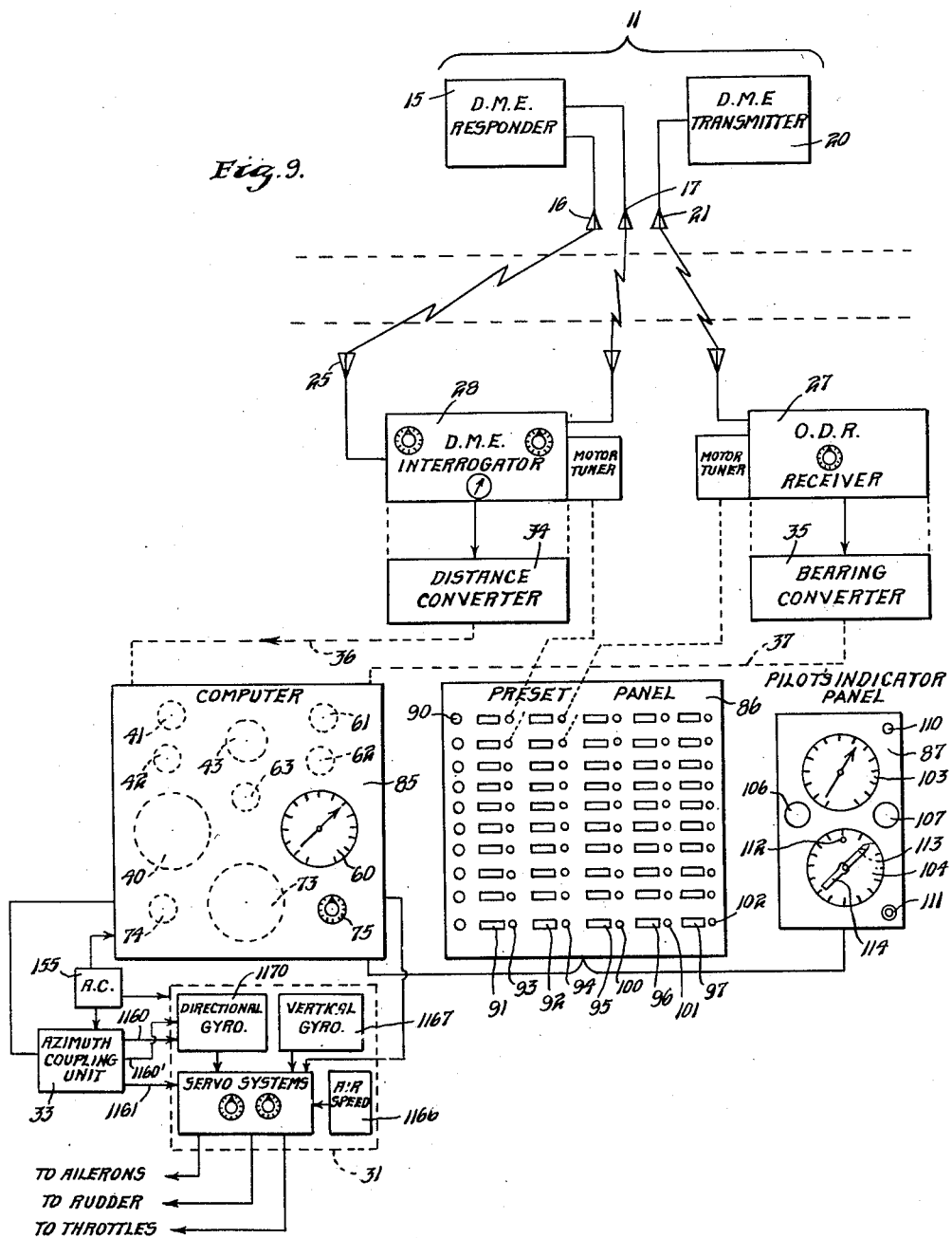

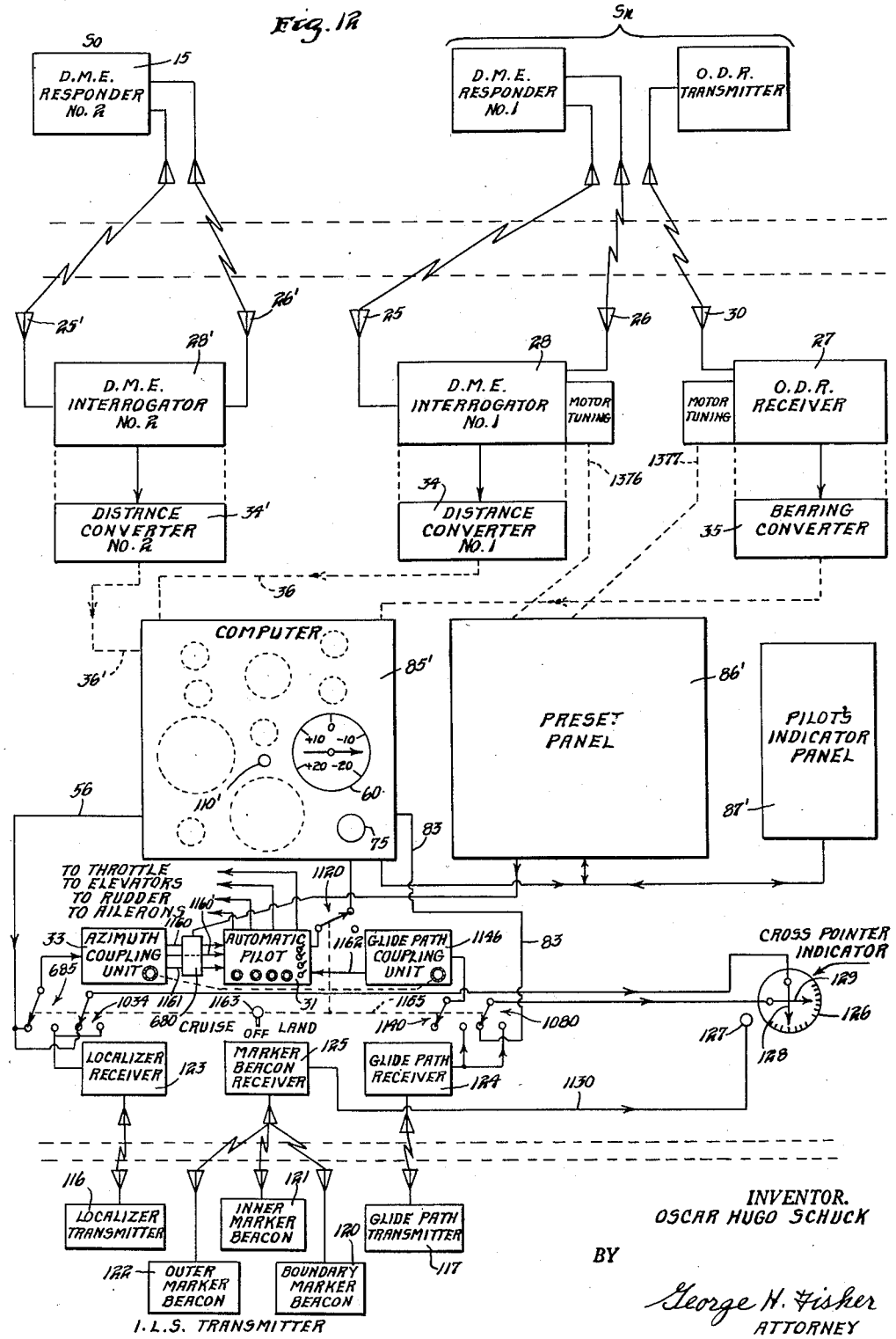

April 2, 1957  O. H. SCHUCK  2,787,428
AIR TRAFFIC CONTROL APPARATUS
Filed June 17, 1948  20 Sheets-Sheet 9
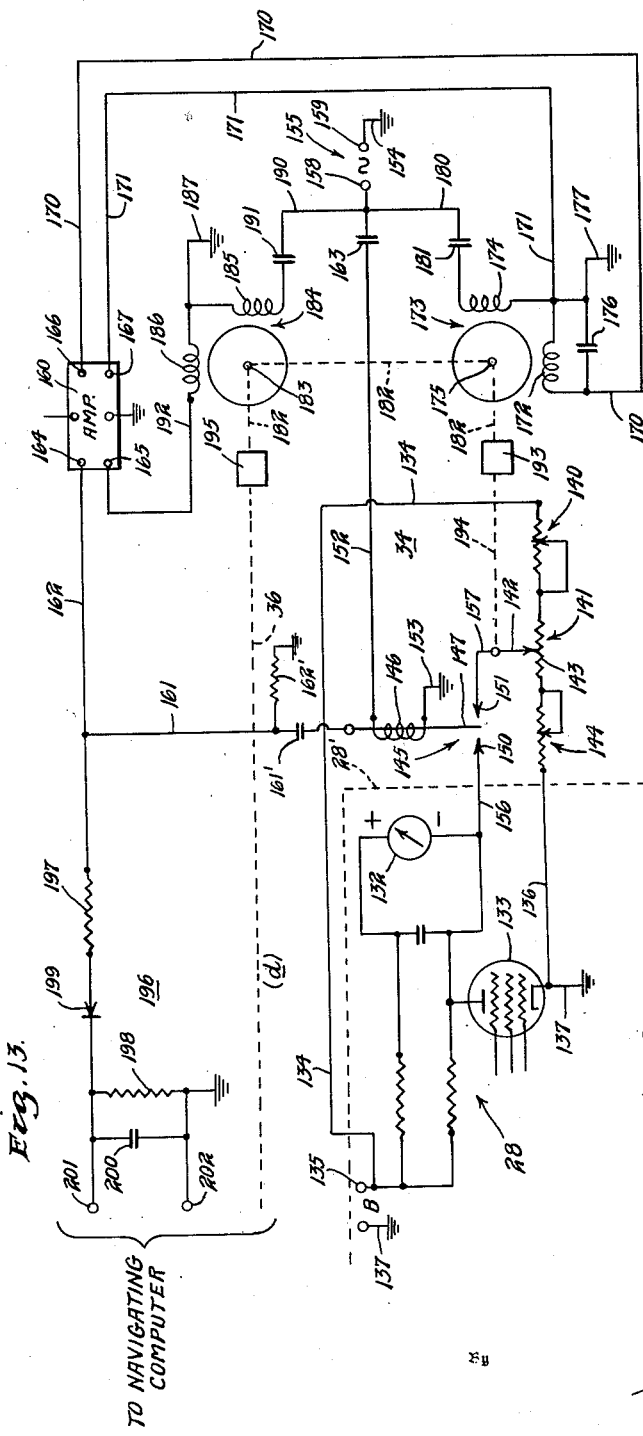
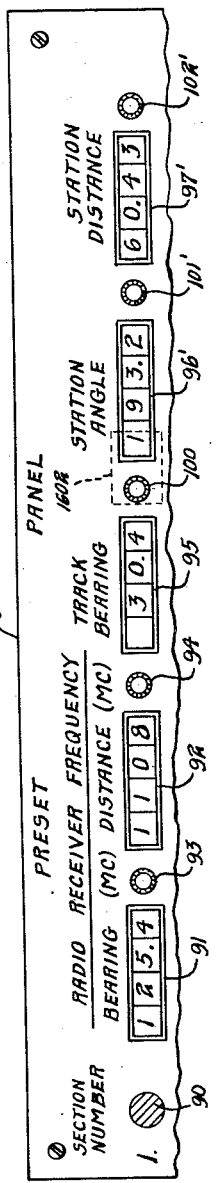
Inventor
OSCAR HUGO SCHUCK
George H. Fisher
Attorney

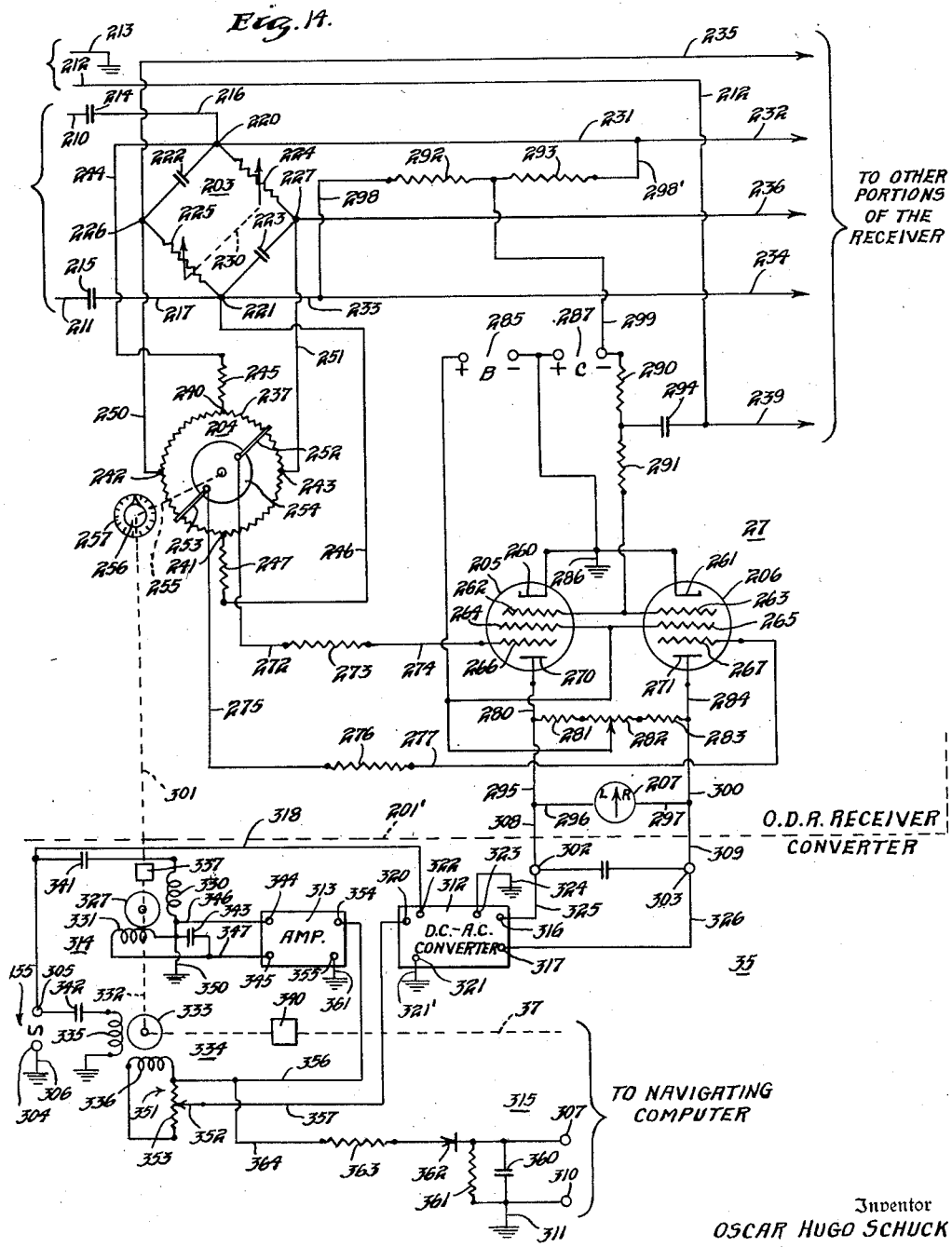

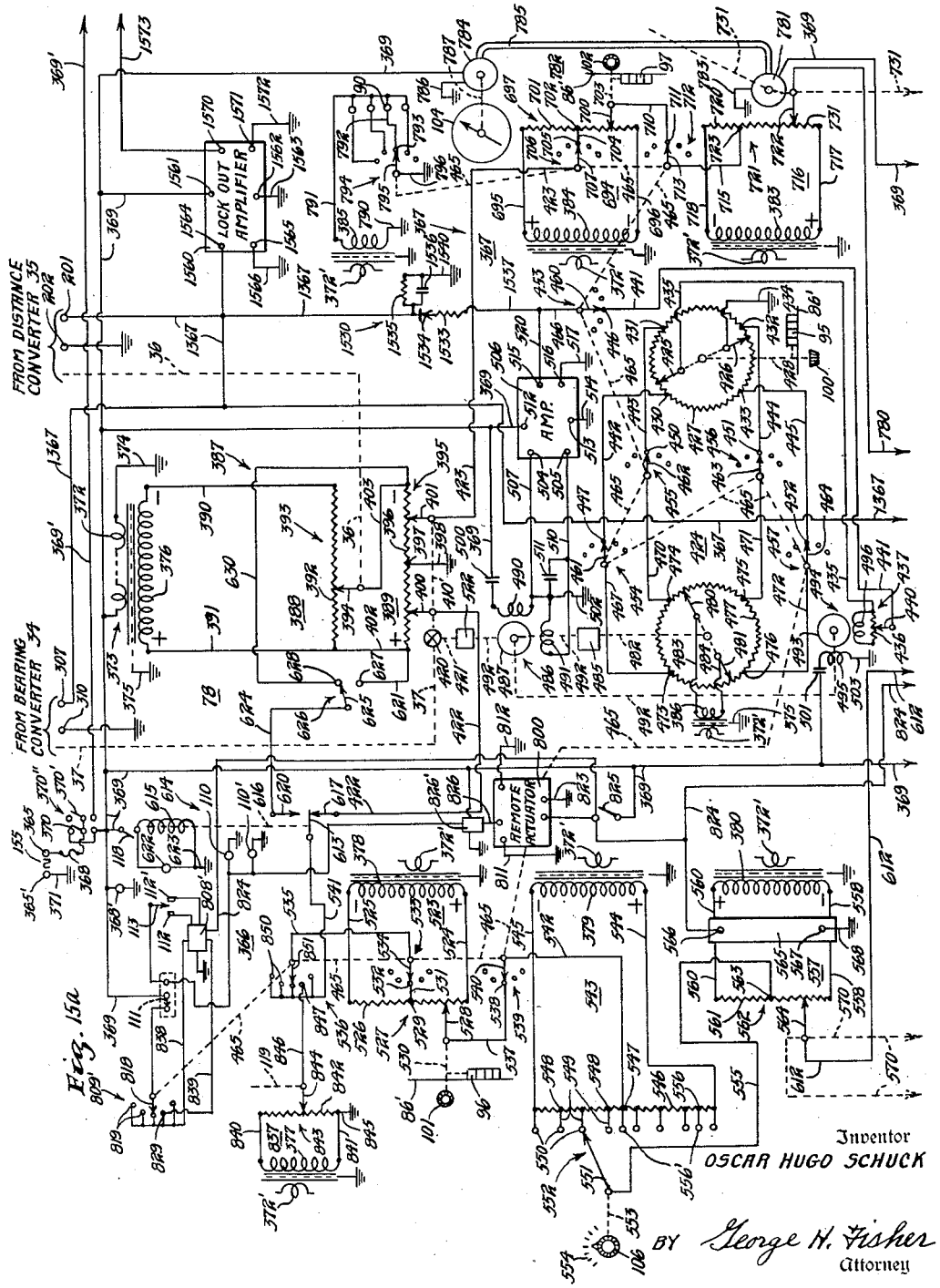

Fig. 15b

April 2, 1957 — O. H. SCHUCK — 2,787,428
AIR TRAFFIC CONTROL APPARATUS
Filed June 17, 1948 — 20 Sheets-Sheet 13

Inventor
OSCAR HUGO SCHUCK
By George H. Fisher
Attorney

April 2, 1957      O. H. SCHUCK      2,787,428
AIR TRAFFIC CONTROL APPARATUS
Filed June 17, 1948      20 Sheets-Sheet 14
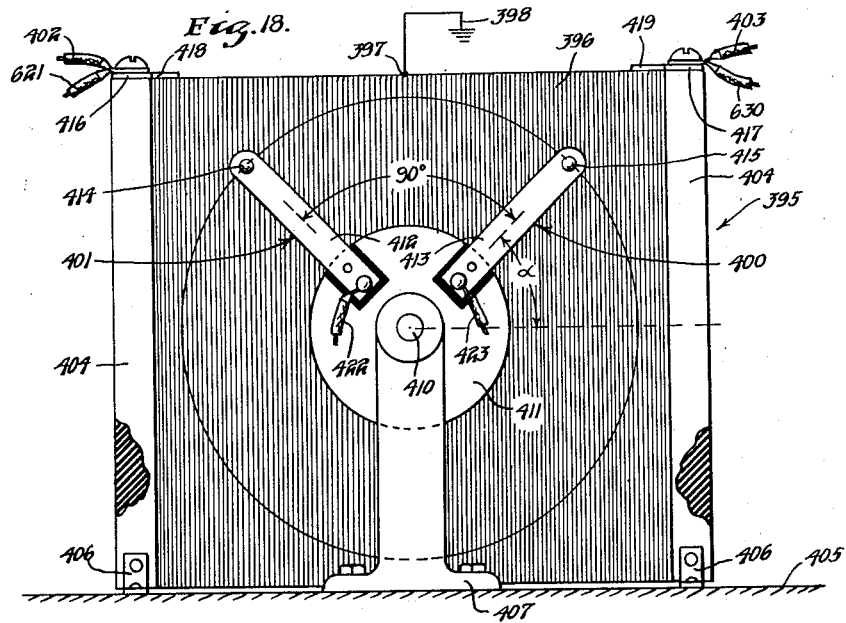
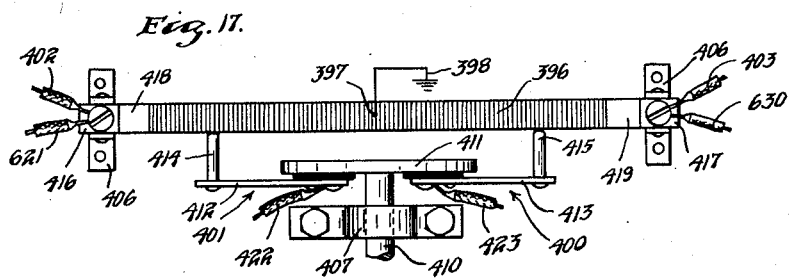
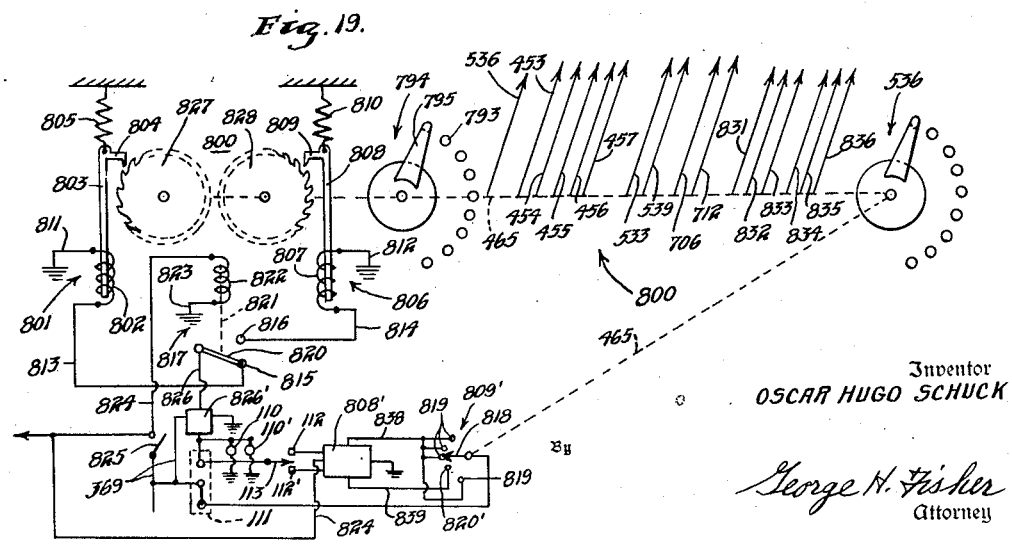
Inventor
OSCAR HUGO SCHUCK
George H. Fisher
Attorney

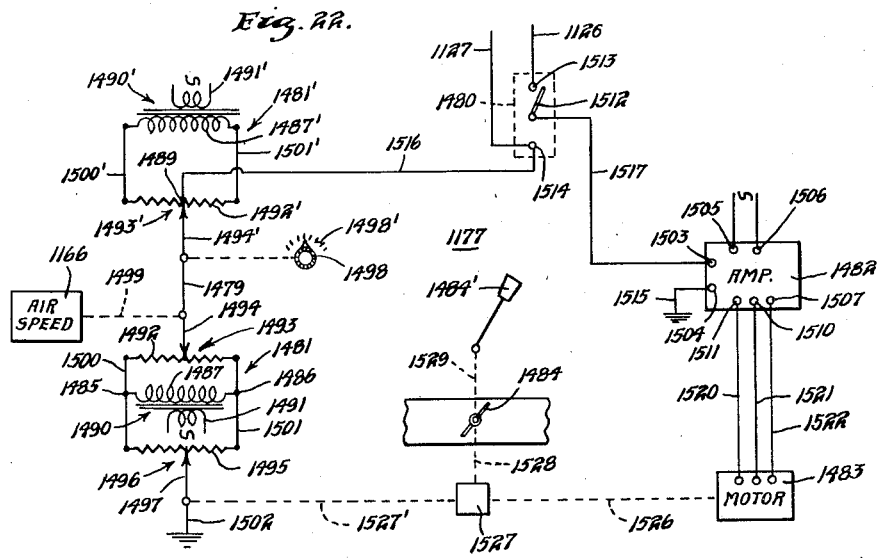

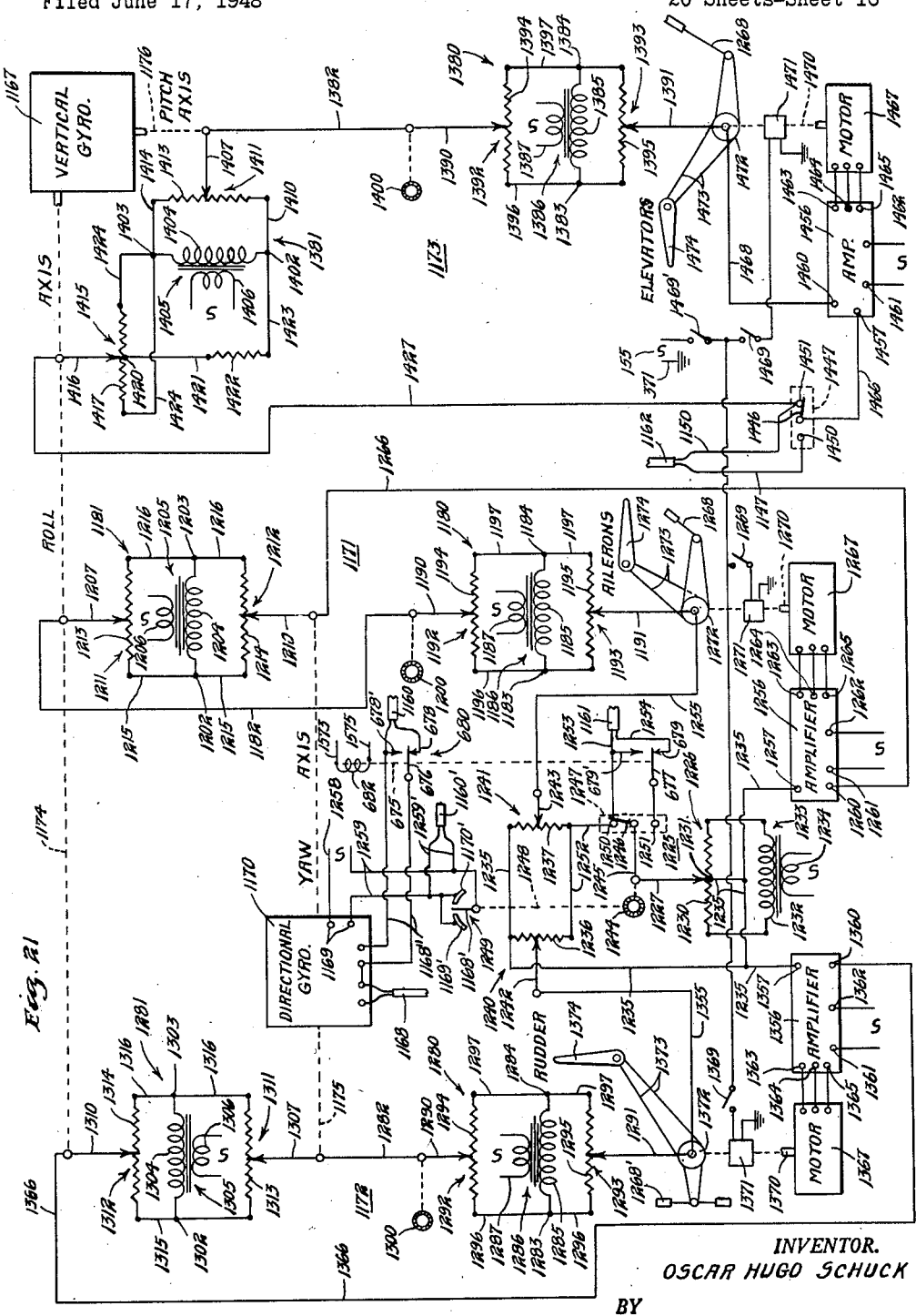

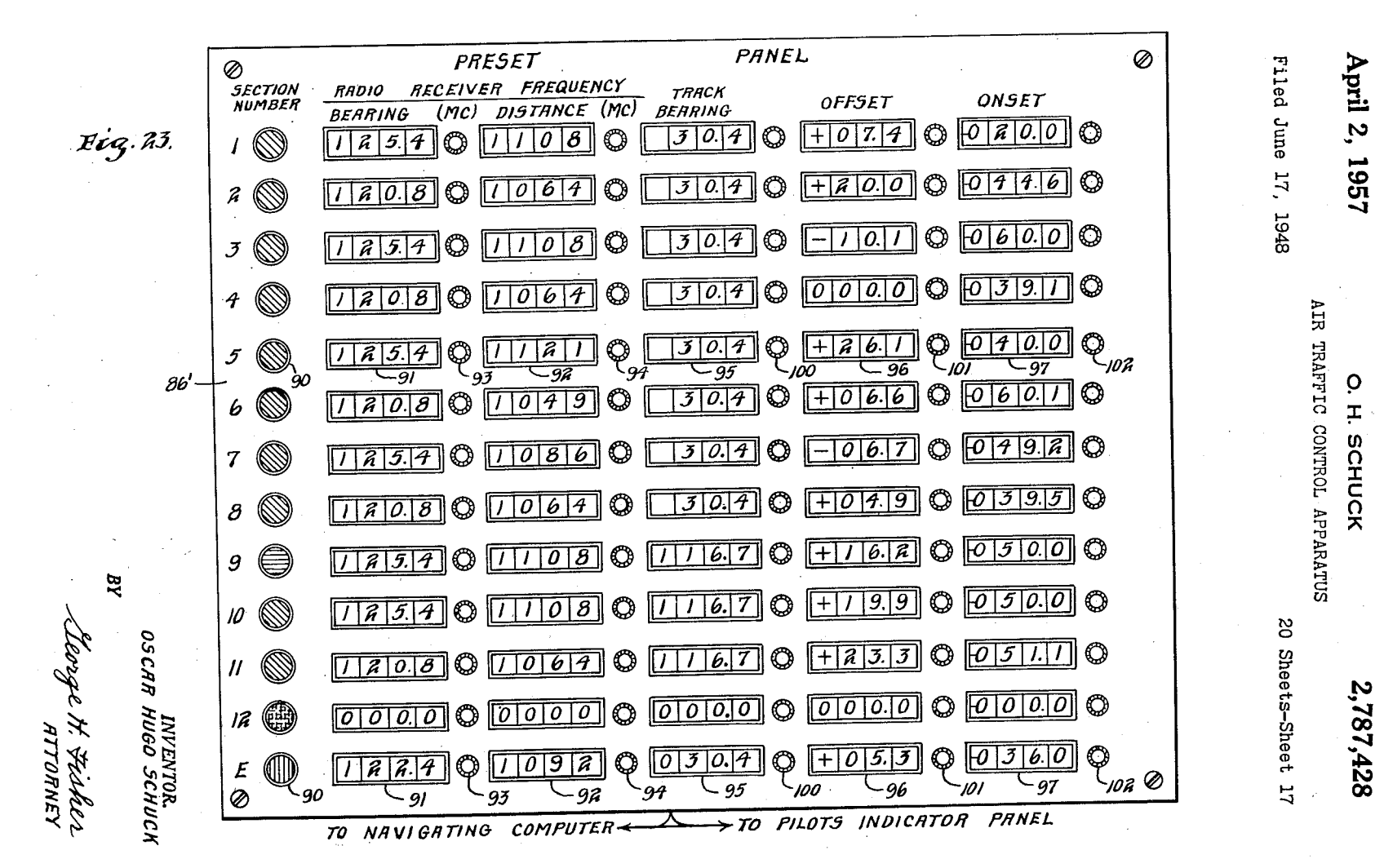

April 2, 1957 O. H. SCHUCK 2,787,428
AIR TRAFFIC CONTROL APPARATUS
Filed June 17, 1948 20 Sheets-Sheet 17

Fig. 23.

INVENTOR.
OSCAR HUGO SCHUCK
BY
George H. Fisher
ATTORNEY

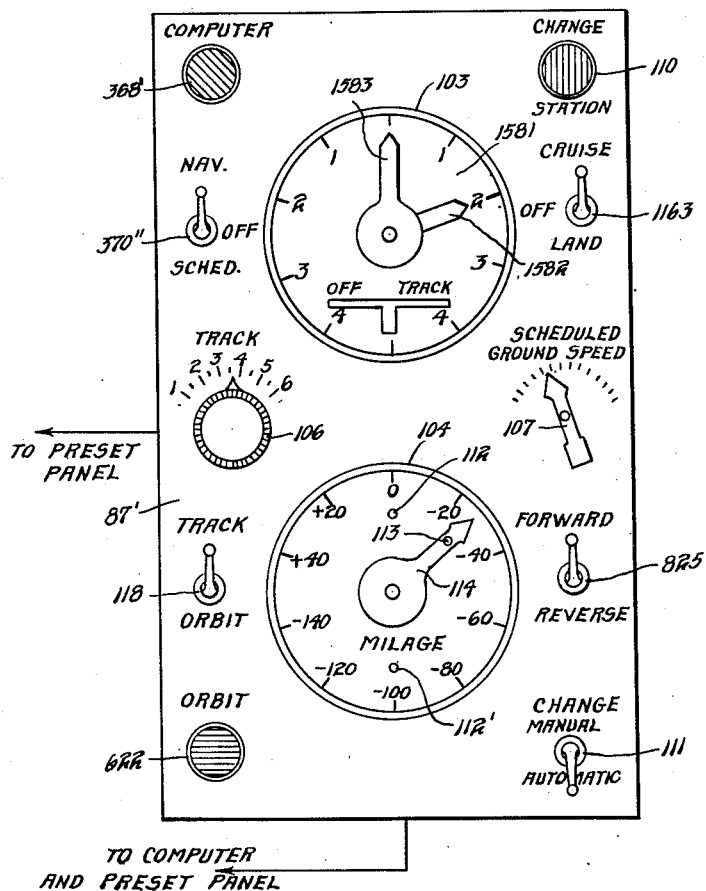

April 2, 1957     O. H. SCHUCK     2,787,428
AIR TRAFFIC CONTROL APPARATUS
Filed June 17, 1948     20 Sheets-Sheet 19
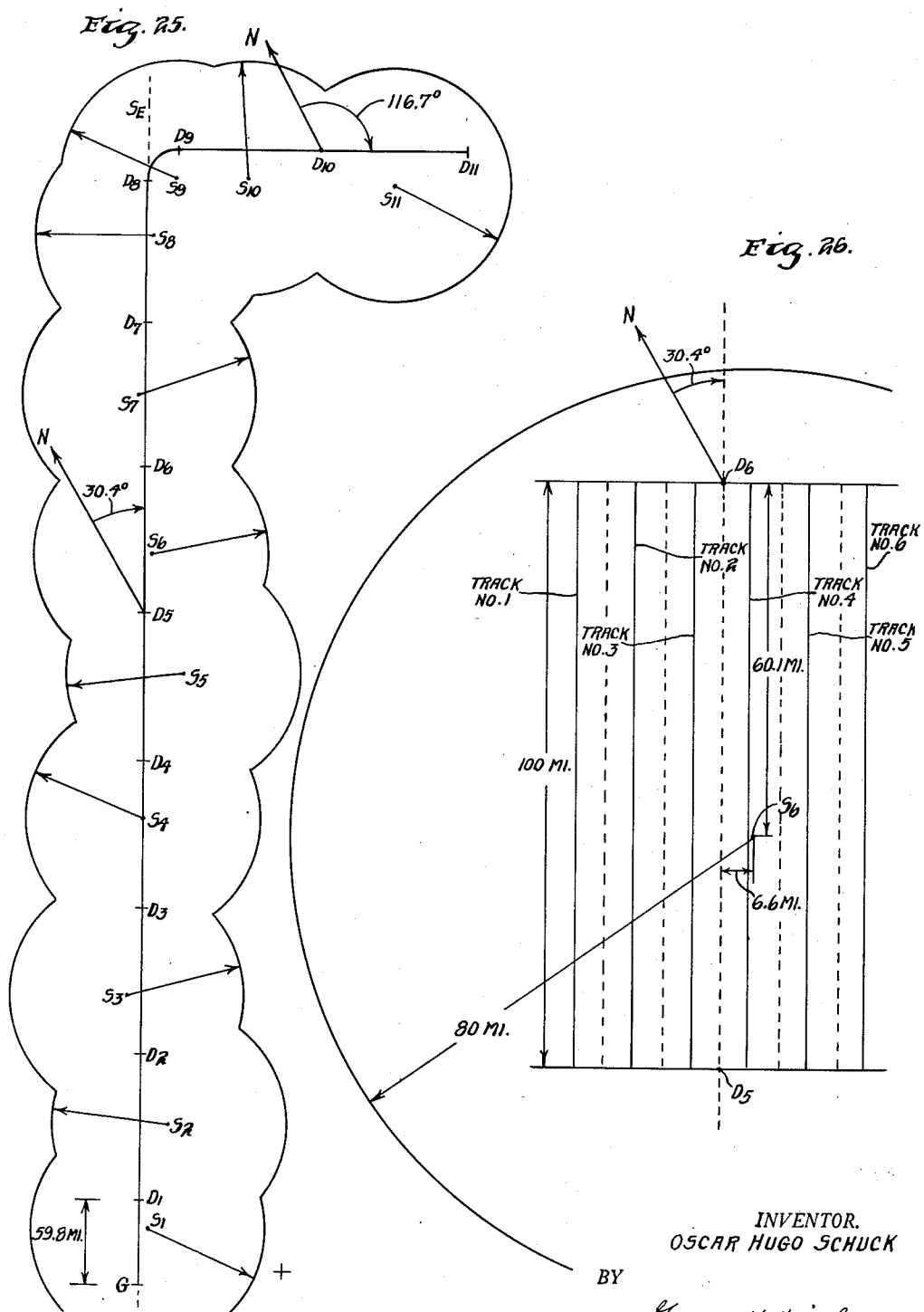
INVENTOR.
OSCAR HUGO SCHUCK
BY
George H. Fisher
ATTORNEY Inventor
OSCAR HUGO SCHUCK By George H. Fisher
Attorney United States Patent Office 2,787,428
Patented Apr. 2, 1957

2,787,428

AIR TRAFFIC CONTROL APPARATUS

Oscar Hugo Schuck, Minneapolis, Minn., assignor to Minneapolis-Honeywell Regulator Company, Minneapolis, Minn., a corporation of Delaware Application June 17, 1948, Serial No. 33,608

43 Claims. (Cl. 244—77)

The invention relates to the field of aviation, and more particularly to an improved system for the control of air traffic in an area, and to means for putting said system into effect.

In aircraft control it is already known how to regulate the operation of individual craft so as to govern the attitude of the craft about three axes to bring about directed, level flight, and to maintain constant the air speed and the elevation of the craft. Devices of this nature are referred to as automatic pilots, and they function well as far as control of a single craft is concerned.

The problem of coordinated control of numerous craft in a sizable area transcends the capabilities of existing automatic pilots, however, and at present is handled by voice communication between the pilots of the various craft and supervisory operators at the control towers of the various airports. Instructions from the towers and the practice known as stacking supplement the scheduling and navigating procedures of the various individual flights to make their completion at a busy airport a practicable, if often protracted, process.

Automatic supervision of the craft in an area so that each, following its schedule, arrives at the destination at such an instant that it can land immediately, without unduly cutting down the capacity of any runway by precautionary delays, especially under overcast weather conditions, is a goal which is difficult of achievement, but one which the present invention accomplishes.

OBJECTS OF THE INVENTION

A general object of the invention is to provide a system of aircraft control in which a number of craft may be travelling toward an airport, by following radio signals, without increase in the collision hazard as the airport is approached.

Another object of the invention is to provide a system of aircraft control, including radio actuated means, for enabling the pilots of the various craft to keep themselves on such schedules that stacking at the airport of arrival is unnecessary.

A more specific object is to provide means, for installation in an aircraft, which is capable of deriving bearing and distance data from the radiations of a selected radio ground station, and of computing from these data the coordinates of the position of the craft at any time in a Cartesian system which may be brought into a desired alignment with the position of the transmitting station and the desired ground path.

Another object of the invention is to provide means, as described above, capable of controlling the azimuth of the craft so that it follows a given straight line path, and so that that path may be any selected one of a number of mutually parallel paths.

Another object of the invention is to provide a system as described above which includes further means for adapting the system to use in controlling craft moving along a path having one or more changes in direction.

Another object of the invention is to provide means, as described above, capable of controlling the air speed of the craft so that it maintains a scheduled ground speed, whether in accordance with manual adjustment or under automatic actuation.

Another object of the invention is to provide means, as described above, capable of controlling the movement of a craft along a course comprising a number of sections, in each of which there is located a suitable transmitter, and which automatically subjects control of the aircraft to one transmitter after another as the craft proceeds along the course.

Another object of the invention is to provide means for controlling the movement of a craft, including an automatic pilot, alternatively by signals supplied by an Instrument Landing System at an airport being approached or by signals from any automatically selected one of a plurality of spaced ground stations each having as components an Omnidirectional Range transmitter and a Distance Measuring Equipment responder, the controlling means having components common to control from either of the controlling signals.

Another object of the invention is to provide an improved Preset Panel for use in a system as described previously, in which there are means adjustable in accordance with characteristics of the system to be later established, together with means causing said characteristics to be established in a regular program.

Another object of the invention is to provide a Pilot's Indicator Panel for the system outlined above, at which are centralized the indicators for the amounts by which a craft is displaced from its destination and from its assigned track, together with means for selecting any one of a plurality of tracks to be followed, and for varying the nature of the schedule which the craft must follow.

Another object of the invention is to provide a Directional Computer capable of deriving from the radio signals above described an output voltage proportional to the departure of the craft from a selected straight line course.

Another object of the invention is to provide a Scheduling Computer for determining what should be the displacement of the craft at any time with respect to a point of arrival, and the difference between this displacement and the actual displacement of the craft, for various scheduled ground speeds.

Another object of the invention is to provide manually adjustable and automatically radio-responsive computing means to give output voltages corresponding to the components, along the X- and Y-axes of a Cartesian system, of the displacement of the craft carrying the computing means from an on-course, on-schedule position. Stated differently, the computing means determines from bearing and range radio signals, supplied respectively by the Omnidirectional Range and the Distance Measuring Equipment, and from manually adjusted settings correlating the computer with the terrain over which the flight is being conducted, the off-track distance and the off-schedule distance of the craft.

Yet another object is to provide such a computer which can be quickly altered to cause the craft to seek and maintain a circular orbit about a transmitting station.

Still another object of the invention is to provide such a computer which can be quickly altered to maintain controlled operation of the craft along the selected track in a reverse direction.

A further object of the invention is to provide means deriving from an air-borne Distance Measuring Equipment indicator of conventional construction a mechanical shaft rotation which is proportional to the distance being measured by the receiver.

A further object of the invention is to provide means deriving from an air-borne Omnidirectional Range receiver of conventional construction a mechanical shaft rotation which is proportional to the bearing angle being measured by the receiver.

A still further object of the invention is to provide a system of the class described, having a number of subordinate servo systems, with means for preventing the performance of any ultimate control function so long as any of the subordinate systems is not in a state of proper adjustment.

A specific object of the invention is to provide means for computing values of $x_d$ and $y_d$ in the following equations:

$$x_d = x_n + \underline{d} \cos(90° + C_n - B) - x_t$$

and $$y_d = y_n + \underline{d} \sin(90° + C_n - B) - y_t$$

where $x_n$, $y_n$, $x_t$, and $(90° + C_n)$ are manually settable, while $\underline{d}$ and B are automatically varied in accordance with the received distance and bearing radio information, and $y_t$ may be either manually adjustable or automatically variable.

Another specific object of the invention is to provide control means for causing one of a number of generally similar processes to proceed in a certain sense, together with means for initiating an alteration in the control means whenever the process reaches a selected state, so as to apply the control means to the next process in a sequence.

A further specific object of the invention is to provide, in a system such as described, a cross-pointer meter and an Azimuth Coupling Unit, together with alternatively operable means for actuating one of the needles of the meter, and energizing the coupling unit, either in accordance with the departure of the craft from the desired ground path and schedule, or in accordance with departure of the craft from a desired runway landing path.

Various other objects, advantages and features of novelty which characterize my invention are pointed out with particularity in the claims annexed hereto and forming a part hereof. However, for a better understanding of the invention, its advantages, and objects obtained by its use, reference should be had to the subjoined drawings, which form a further part hereof, and to the accompanying descriptive matter, in which are illustrated and described certain preferred embodiments of the invention.

In the drawing:

Figure 1 is a diagram showing spatial relationships involved in the practice of the invention;

Figure 2 is a simplified schematic showing of an azimuth control system comprising a portion of the invention;

Figure 3 is a block diagram showing the functional relationship of elements making up the computer of Figure 2;

Figure 6 is a schematic showing similar to Figure 4 but including still further components of the complex aircraft control system comprising the invention;

Figure 7 is a block diagram of the structure of Figure 6;

Figure 8 is a diagram similar to Figure 1, but showing special problems arising in an extended flight;

Figure 9 is a schematic showing similar to Figure 6, but including further components of the aircraft control system comprising the invention;

Figure 10 is an enlarged view similar to Figure 8, illustrating further special problems arising when automatic change in direction of flight must take place;

Figure 11 shows a modification of Figure 7;

Figure 12 is a showing of the elements making up a complete system according to the invention, and their interrelation;

Figure 13 is a detailed showing of a converter for connecting the Distance Measuring Equipment to the computer;

Figure 14 is a similar showing of a converter for connecting the Omnidirectional Range receiver to the computer;

Figure 15B:
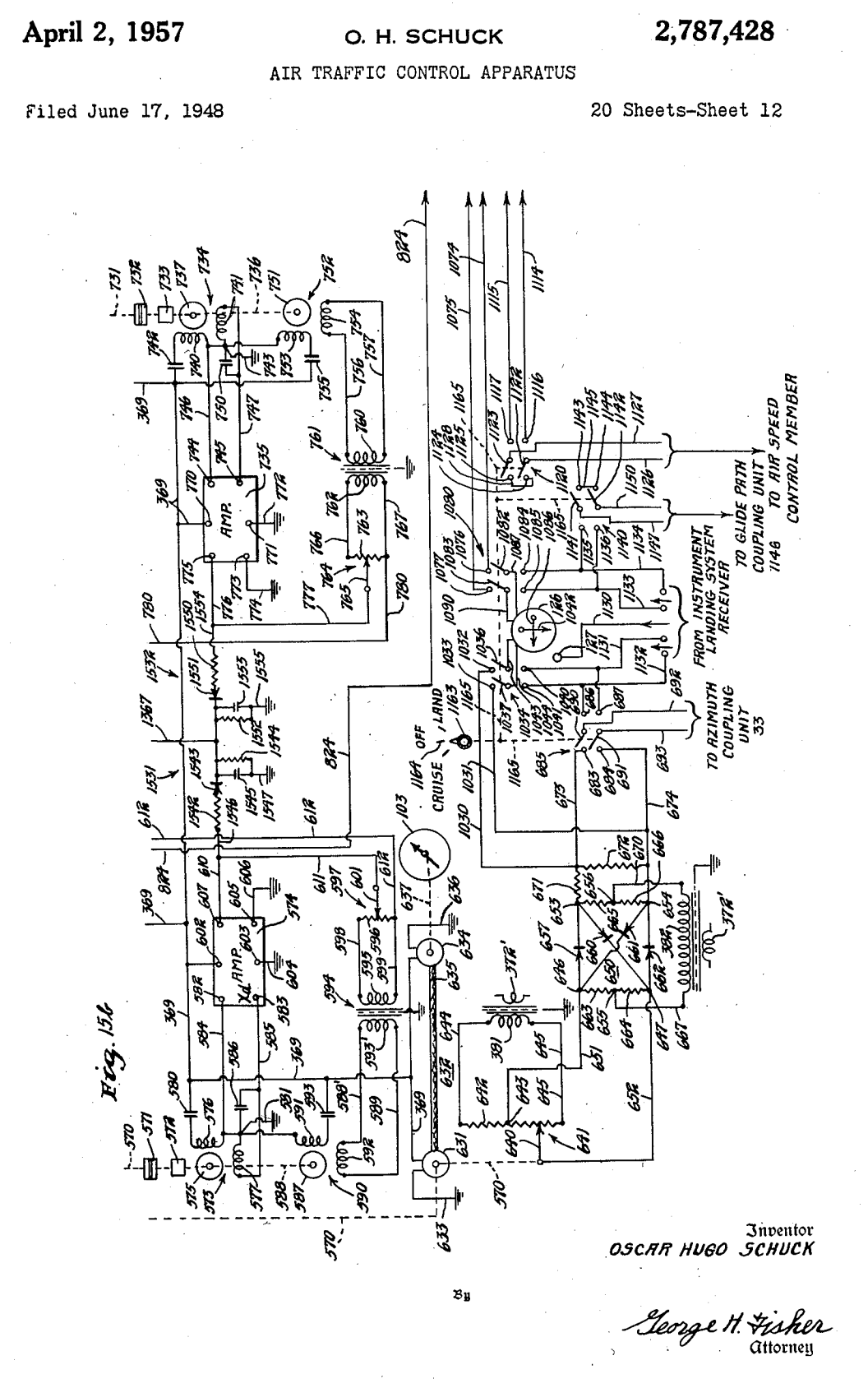
Figure 16:
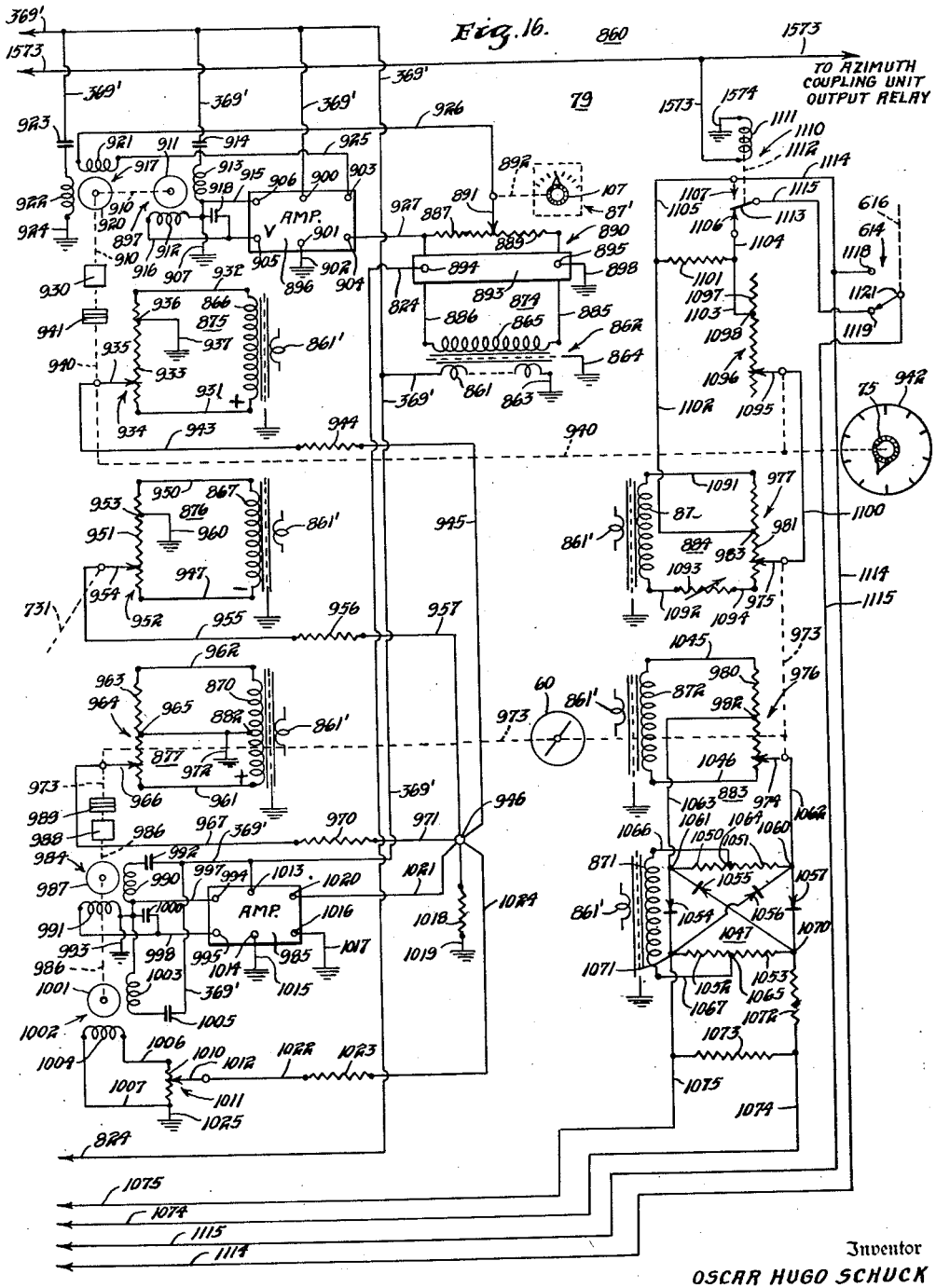
Figure 30:
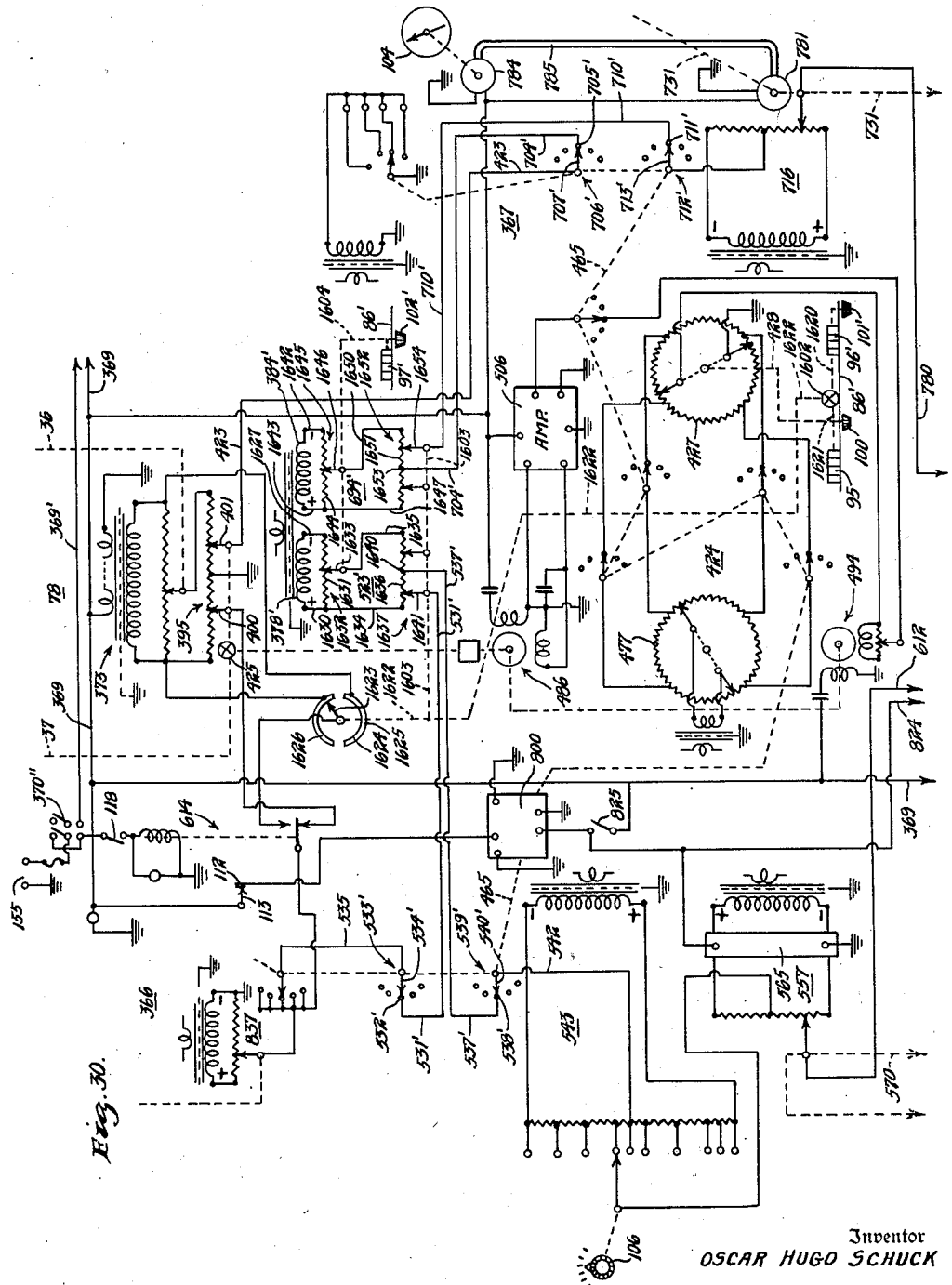

Figures 15a, 15b, and 16 taken together, comprise a wiring diagram of a portion of the system of Figure 12;

Figures 17 and 18 show structural details of a variable resistance unit used in the practice of the invention;

Figure 19 shows schematically the nature and function of a reversible stepping switch adapted for use in the practice of the invention;

Figure 20 is a fragmentary schematic showing of a modification of the invention illustrated in Figure 15;

Figures 21 and 22 show the nature of an automatic pilot suitable for use in the practice of the invention;

Figures 23 and 24 show components of the system of Figure 12 in more detail;

Figure 25 is a view illustrative of a cross country path to be followed according to the invention;

Figure 26 is an enlarged view of a portion of the path shown in Figure 25;

Figure 27 is a fragmentary view similar to Figure 1;

Figure 28 is a fragmentary view similar to Figure 11;

Figure 29 is a fragmentary showing of a modification of Figure 23;

Figure 30 shows a modification of Figure 15a; and

Figure 31 shows a detail of the invention.

It is believed that the invention can most perfectly be explained by successively presenting the various problems which the system is designed to solve, then pointing out the general method of operation of the various subordinate components of the system necessary to enable each problem to be solved, and finally giving the details of construction of all the elements and their operation in a single overall system. By this means it will be possible to present means for performing the necessary functions separately, and to lead gradually to an understanding of the complex inventive system which is disclosed in Figure 12: of this figure the structures of preceding figures must be understood to comprise significant and interrelated portions.

The problem of azimuth control

Figure 1 is in the nature of a map of an area to be traversed by aircraft. A landing strip 10 is shown in the upper lefthand corner of the figure, where the craft are intended to land, and from a study of the terrain and a knowledge of traffic requirements, it is first determined that the center line of a straight ground path between the neighborhood of landing strip 10 and that of some distant air strip is along the line 11. A suitable location 12 is selected roughly midway between the two air strips and within 50 miles of the selected ground path, and a radio ground station $S_n$ is established there. The area is charted, and there is superimposed upon the chart a system of Cartesian coordinates the Y-axis of which coincides with line 11. The origin of the coordinates is spaced an arbitrarily selected distance from the air strip 10 to permit let-down maneuvers as presently to be explained. The geographic bearing $C_n$ of the Y-axis is recorded, and also the coordinates $x_n$ and $y_n$ of the ground station, which will be referred to respectively as the "offset" and "onset" of the station.

A number of ground paths parallel to the center line 11 and spaced therefrom by say 10 miles are now laid out on the chart, in order to permit simultaneous movement of craft at different speeds and, if desired, in different directions. The X-coordinate or scheduled offset in each of these paths remains the same throughout its length: one such path, having an abscissa $x_t$, is shown by line 13, and a second, having an abscissa $x_{t'}$, is suggested at 14.

These lines intersect the X-axis at D and D' respectively: the X-axis is hereafter referred to as the terminus of arrival, since when this line is crossed a change in the operation of the system must be made with the object of bringing the craft to a landing.

For purposes of illustration let it be assumed that the craft is ordered to follow the line 13, and that in fact it is at some moment located at point P, where its coordinates are $x_p$, $y_p$. In such a case its off-track distance $x_d$ has a value $x_p - x_t$.

One function of the invention is to determine the value of $x_p$ from information made available as a result of the radio transmissions from station $S_n$ at 12. This station emits two radiations, from one of which there can be determined the magnitude of $d$, the distance from the station to the craft, and from the other of which there can be determined the geographic bearing B of the position of the craft from the station. There are thus provided sufficient data to determine the value of $x_p$ according to the following mathematical analysis.

$$x_p = x_n + \overline{S_n E}$$
$$\overline{S_n E} = \underline{d} \cos \angle PS_n E$$
$$\angle PS_n E = 90° + C_n - B$$

Hence
$$x_p = x_n + \underline{d} \cos (90° + C_n - B)$$
and
$$x_d = x_n + \underline{d} \cos (90° + C_n - B) - x_t$$
or
$$x_n + \underline{d} \cos (90° + C_n - B) - x_t - x_d = 0 \qquad (1)$$

A negative value for $x_d$ means that the craft is to the left of its desired path. A negative setting of $x_n$ is required if the station is to the left of the Y-axis and a negative setting of $x_t$ is required if the point D is to the left of the origin 0. If an indicator of $x_d$ is provided for the pilot of an aircraft he can maintain the craft on a desired ground path simply by keeping the reading of the $x_d$ indicator at zero.

Means for computing off-track distance

The general relation of instruments functioning to the above end is shown in Figure 2. The equipment at ground station $S_n$ comprises the "responder" 15 of the Distance Measuring Equipment having a receiving antenna system 16 and a transmitting antenna system 17, and the transmitter 20 of an Omnidirectional Range having a transmitting antenna system indicated at 21. The air-borne equipment includes a timer indicator 22, a transmitter 23, and a receiver 24, making up the challenger or interrogator 28 of the Distance Measuring Equipment, and having a transmitting antenna system 25 and a receiving antenna system 26, and an Omnidirectioal Range receiver 27 having a receiving antenna system 30. The terms "Omnidirectional Range" and "Distance Measuring Equipment" refer to specific radio units known in the art by those names, the former being described in the January 1942 issue of the "RCA Review," volume 6, No. 3, pages 344 to 369, and the latter being described in the report of the "Third Commonwealth and Empire Conference on Radio for Civil Aviation, 1945," pages 197 to 205.

In the following specification the initials O. D. R., D. M. E. and I. L. S. will be used to refer respectively to the Omnidirectional Range, the Distance Measuring Equipment, and the Instrument Landing System.

The craft is equipped with an Automatic Pilot 31, and a Directional Computer 32 controls the Automatic Pilot through a suitable Azimuth Coupling Unit 33 in accordance with the Distance Measuring Equipment signal, transmitted through a Distance Converter 34, and the Omnidirectional Range signal, transmitted through a Bearing Converter 35. Converters 34 and 35 are necessary to make the electrical signals of the Distance Measuring Equipment and the Omnidirectional Range available as mechanical motions to affect the computer, and Azimuth Coupling Unit 33 is provided to convert the AC output of the computer to a proper form, when necessary, to influence the particular Automatic Pilot of the craft.

As explained below, the output of Distance Converter 34 is mechanical rotation of a shaft 36 in proportion to the distance $\underline{d}$, and the output of converter 35 is mechanical rotation of a second shaft 37 in proportion to the angle B. These shafts are represented in Figure 3 as influencing the reading of an indicator 40 through a chain of authority which includes further inputs from manual knobs 41, 42 and 43 which are movable with respect to graduated scales. Knob 41 is adjusted in accordance with the magnitude of the X-coordinate $x_n$ of the location of the ground station. Knob 42 is adjusted in accordance with the X-coordinate $x_t$ of the desired ground path. Knob 43 is adjusted in accordance with the value of angle $C_n$ for the path being flown, although its scale is displaced so that its actual influence in the mechanism is in accordance with the sum of that angle and 90°.

The various functions performed in the Directional Computer are suggested by the various blocks in Figure 3, but it will be realized that numerous ways of performing these functions, as electrical, mechanical, hydraulic, and so forth, will occur to those skilled in the art. In connection with Figures 15 and 16, later to be discussed, there will be presented full disclosure of means for performing each of these functions, and for the present only the relation of each to the overall result will be considered.

The difference between the inputs from knob 43 and shaft 37 is taken in a subtracter 44 and applied as at 45 to a sine-cosine device 46, from which it emerges as an output 47 proportional to cos $(90° + C_n - B)$. This and the input from shaft 36 are supplied to a multiplier 50. The output 51 of the multiplier, having the value $\underline{d} \cos (90° + C_n - B)$ is combined in an adder 52 with the input from knob 41, and the difference between the sum $x_n + \underline{d} \cos (90° + C_n - B)$, appearing at 53, and an input from knob 42 is taken in a subtracter 54 and applied as an input 55 to indicator 40, which therefore gives a reading proportional to $x_n + \underline{d} \cos (90° + C_n - B) - x_t$, or $x_d$. The same signal may also be supplied as at 56 to Azimuth Coupling Unit 33, Figure 2, the output of which is connected to cause operation of Automatic Pilot 31, whenever $x_d$ is not zero, so as to cause the craft to return to the desired ground path.

The apparatus described above comprises means for maintaining a craft on a selected ground path and for indicating to a human pilot any departure therefrom as it occurs, so that to a limited extent he is independent of ground landmarks, overcast weather, and variable cross winds. The information is not sufficient, however, to give the pilot his location in space, other than the knowledge that he is on a given line.

Spot supervision of air speed

Referring again to Figure 1, suppose that in some manner it is known that, at the instant when the craft is actually at P, it should be located at $P_t$. The off-track component $x_d$ of this discrepancy may be determined as indicated above, and the azimuth of the craft adjusted accordingly. Following the same line of reasoning, the along track component or off schedule distance $y_d$ may be determined, as follows, and used to adjust the air speed of the craft. For $$y_p = y_n + \underline{d} \sin \angle PS_n E$$
and
$$\angle PS_n E = 90° + C_n - B$$
hence
$$y_n + \underline{d} \sin (90° + C_n - B) - y_p = 0 \qquad (2)$$

and since
$$y_d = y_p - y_t$$
hence
$$y_d = y_n + \underline{d} \sin(90° + \overline{C_n - B}) - y_t \quad (3)$$

A negative value for $y_d$ indicates that the craft is farther from its destination than it should be, and a negative value for $y_n$ means that the station is between the termini rather than beyond the terminus of destination. Onset values are normally negative.

Figure 4:
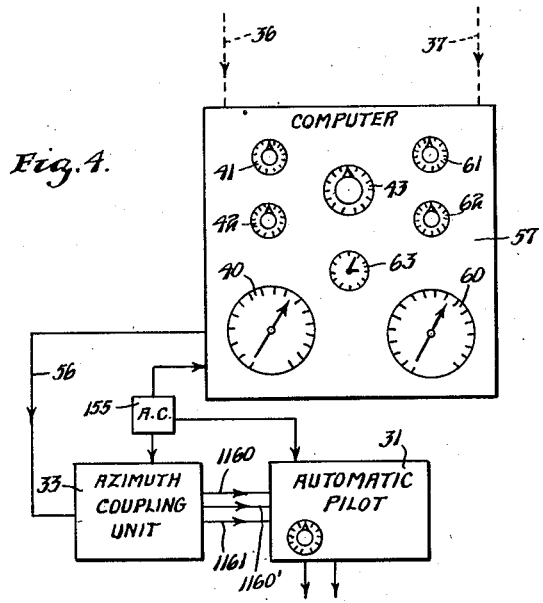
Figure 4 is a schematic showing similar to Figure 2, but including further components of the system comprising the invention.
Figure 5:
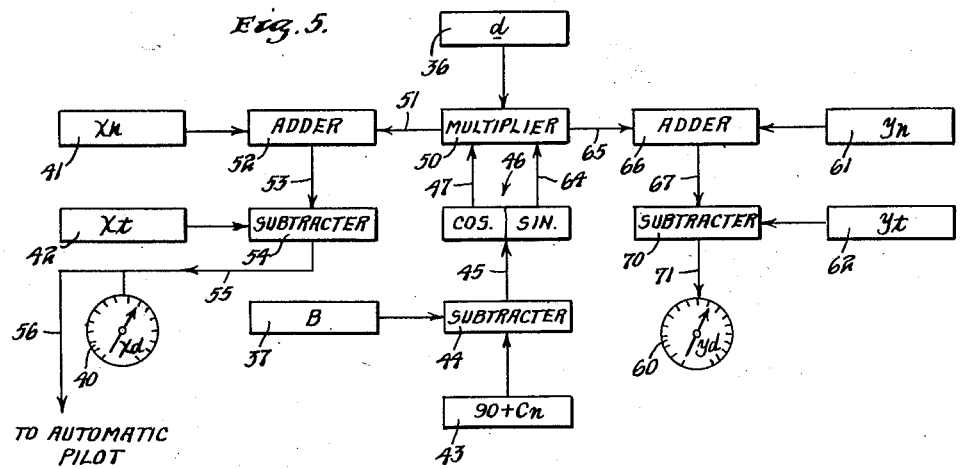
Figure 5 is a block diagram of the structure of Figure 4.

Inspection of Equation 3 above shows it to be of the same form as that for $x_d$, and the structure for performing the computation is very similar, as is shown in Figures 4 and 5. It includes many components identical in construction and function with those previously described: the same reference numerals have been assigned to these elements and their independent functions will not be repeated.

Means for determining off-track and off-schedule distance

In Figures 4 and 5 there is illustrated a computer 57 comprising, in addition to elements previously described, an indicator 60 and a pair of manual knobs 61 and 62. As an accessory to convenient use a clock or elapsed time indicator 63 also forms a part of the computer. Knob 61 is adjusted manually in accordance with the Y-coordinate $y_n$ of the location of the ground station. Knob 62 is adjusted manually in accordance with the Y-coordinate $y_t$ of the position which the craft should be occupying at a particular instant of interest. The difference between the input from knob 43 and shaft 37 is taken in subtracter 44 and applied at 45 to sine-cosine device 46, from which it emerges as an output 64 proportional to $\sin(90° + \overline{C_n - B})$. This is combined in multiplier 50 with the input from shaft 36 to give an output 65 having the value $\underline{d} \sin(90° + \overline{C_n - B})$, which is combined in an adder 66 with the input from knob 61. The sum 67, proportional to $y_n + \underline{d} \sin(90° + \overline{C_n - B})$, is combined in a subtracter 70 with the input from manual knob 62, and the difference is applied as at 71 to indicator 60, which therefore gives a reading proportional to $$y_n + \underline{d} \sin(90° + \overline{C_n - B}) - y_t, \text{ or } y_d$$

The proper setting of knob 62 at any time may, for example, be determined by the pilot from a previously prepared tabulation of Y-coordinate against elapsed time, or one of Y-coordinate against actual time for the particular flight, and is correct only for an instant. At that instant, however, indicator 60 has a reading, under the influence of shafts 36 and 37 and knobs 61 and 62, which is a measure of the distance by which the craft is ahead or behind its scheduled position. The pilot is thus given means for spot checking his progress along the ground path from time to time against that required by his schedule, and he may decrease or increase his air speed accordingly.

Indicator 60 in combination with the rest of the computer may also serve a further useful function. If knob 62 is set to the Y-coordinate of the terminus of departure G, Figure 1, indicator 60 shows the number of along-track miles already traveled, while if knob 62 is set to the Y-coordinate of the terminus of arrival D, that is, to zero, indicator 60 shows the number of along track miles yet to be flown.

Continuous control of air speed to give scheduled ground speed

The fact that the setting of knob 62 is done by hand gives the reading of indicator 60 a discontinuity which makes it ineffective to control the air speed of the craft in the same automatic manner as its azimuth is controlled. Automatic means for maintaining a correct input of $y_t$ to the computer comprise a part of the invention, however, and will now be described, referring once more to Figure 1.

The distance travelled by a craft moving at an instantaneous ground velocity V in a time $t$ is well known to have the value $\int_0^t V dt$. If a craft is scheduled to start at time $t_0$ from a terminus of departure G having a Y-coordinate $y_g$, and to travel at a ground speed V along line 13 toward a terminus of destination D having a Y-coordinate 0, the Y-coordinate $y_t$ of the craft's scheduled position at any time $t$ after departure is given by the expression $$y_t = y_g + \int_0^t V dt \quad (4)$$

For means to perform this operation, in combination with the computer as previously described, reference should now be made to Figures 6 and 7, in which previously identified elements again have the same reference numerals.

Means for continuously determining off-track and off-schedule disdance

In Figures 6 and 7 there is illustrated a computer 72 comprising, in addition to elements previously described, a further indicator 73 and a pair of further manual knobs 74 and 75. Indicator 73 is designed to be influenced by the settings of knobs 43 and 61 and the inputs from shafts 36 and 37 only, as opposed to indicator 60, which is to be influenced by the settings of knobs 74 and 75 as well. Since it controls both the azimuth and the air speed of the craft, computer 72 will be referred to as a Navigating Computer. Of the elements shown in Figure 7, those below and to the right of the dotted line will be referred to as comprising a "Scheduling Computer" 79, while the remaining elements comprise a "Directional Computer" 78.

The output from adder 66 has a value of $y_n + \underline{d} \sin(90° + \overline{C_n - B})$, as previously pointed out. Reference to Figure 1 will make it clear that this is the Y-coordinate of P, the actual position of the aircraft. This is applied as at 76 to indicator 73: the reading of this instrument is therefore proportional to the distance remaining to be flown, or the distance to destination $y_p$. Of the indicators so far discussed indicator 73 is the only one which can be unidirectional: the others must be capable of giving both positive and negative readings from a center zero position.

Knob 75 is manually adjustable in accordance with the total distance to be flown $y_g$. Knob 74 may be manually set in accordance with the scheduled constant ground speed of the craft for the particular flight. This knob adjusts the operation of an integrator 77 in such a fashion that an output is obtained as at 80 which is proportional to the quantity $\int_0^t V dt$. This is combined in an adder 81 with an input from knob 75 to give an output at 82 which has a value $y_g + \int_0^t V dt$, which is $y_t$. Subtracter 70 is thus supplied with the same two inputs in this modification of the invention as it is in that shown in Figure 5, except that in Figure 7 the value of $y_t$ is continuously adjusted to be that corresponding to the schedule. Subtracter 70 can therefore not only actuate indicator 60 as before, through connecting means 71, but it can also act, through a connection 83, to control the throttles of the craft through Automatic Pilot 31 and hence regulate its ground speed.

It should be noted that if a craft is in the middle of a flight and its scheduled speed is changed, as by radio instruction from a traffic control officer, for example, it is only necessary that knob 74 be adjusted to the new value: the output 80 of integrator 77 is still correct, at each instant, for the distance the craft should have traveled.

Problems of extended straight line flight

The foregoing structure provides means for controlling the flight of a craft between two termini so that is moves along a given ground path at a selected speed. The utility of the system as so far described is limited, however, by the fact that at least for the present the reliable range of the transmitters at the ground station is in the neighborhood of 80 to 100 miles. Thus even for a ground path passing directly through the station the maximum distance which can be flown with confidence is 160 miles or so. The problem of more extended flight, and the means resorted to for its solution, are shown in Figure 8.

Suppose it is desired to fly from G to $D_5$, the total distance being 480 miles. For convenience the course is divided into a number of sections, of some standard length less than twice the range of the ground station equipment, and one initial section of a length determined by the remaining distance after the equal sections are taken out. A very convenient standard length is 100 miles, so that in Figure 8 there is an initial section of 80 miles followed by three intermediate sections and one final section, all of 100 miles.

So much having been determined, the course is charted, the terrain examined, and locations determined for a plurality of ground stations like station $S_n$ previously discussed. Each station is located somewhere near the middle of one section, and within perhaps 40 miles of the track center line Y—Y'. These stations are indicated at $S_1$, $S_2$, $S_3$, $S_4$, and $S_5$ in Figure 8, and their X- and Y-coordinates with respect to the center line or Y-axis are shown. For the first section of the flight $D_1$ acts as the destination, and $y_1$ for station $S_1$ is measured with respect thereto. For the second section, $D_2$ is the destination and $y_2$ is measured from $S_2$ to $D_2$, and so on. Since the line is straight, a single value of $C_n$ prevails for all the sections. For stations $S_2$ and $S_3$ the reliable range of transmission is shown by circles: at any point within the shaded area common to the two circles the craft can be guided by either station, and accordingly there is no chance for discontinuity of control. The track to be followed is distant from the center line by an amount $x_t$, which may for example be an odd multiple of 5 miles: the system contemplates a number of such spaced tracks on each side of the center line, to permit overtaking of a slower aircraft by a faster one, or movement of aircraft in opposite directions at the same altitude. The suggested ten mile spacing between tracks is for safety, and permits emergency movement of craft in distress on the tracks halfway between.

Suppose a craft equipped with the apparatus of Figure 6 and the radio equipment of Figure 2 is to fly this course at 175 M. P. H. ground speed. As the point G is approached, knob 41 is set at 40.6 miles, knob 42 at + 5 miles, knob 61 at 44.8 miles, knob 43 at 329.4°, knob 74 at 175 M. P. H., and if the Scheduling Computer is to be used, knob 75 is set at 80 miles. ODR receiver 27 is tuned to 125 mc. and DME interrogator 28 is tuned to 1222 mc. At the moment the craft passes over G, indicators 40 and 60 read zero and indicator 73 reads 80. As long as the craft moves along the line GD, at 175 miles per hour ground speed, indicators 40 and 60 continue to read zero, and the reading of indicator 73 steadily decreases until at $D_1$ it is zero. This is a signal for the pilot to retune DME interrogator 28 to a new frequency of 1225 mc. and ODR receiver 27 to a new frequency of 120 mc. Knobs 42, 43 and 74 need not be adjusted, but knobs 41 and 61 must be set to the values of $x_2$ and $y_2$, say 33.5 miles and 48.2 miles respectively, and knob 75 must be set to 100 miles. Indicators 40 and 60 still read zero if the craft is on the line $GD_5$, and indicator 73 now returns to 100 miles. As the flight continues only the tuning of the radio instruments and the settings of knobs 41, 61, and 75 need be changed as successive sections of the course are traversed.

Knob 75 must be reset by the navigator each time the craft passes from one section of the flight to the next, even though in each case the setting is 100 miles if the craft is on schedule. If the craft is off schedule at that instant, the new setting of $y_6$ by knob 75 must take this into consideration: accordingly knob 75 is set at the algebraic sum of two quantities, the instantaneous value of the off-schedule distance and the actual length of the next section. In a 100 mile section the knob is set at 90 if the craft is 10 miles behind schedule, etc.

In ordinary flights it may be found that the precise determination of off-schedule distance made possible by use of the Scheduling Computer is not required, satisfactory performance of schedule then being accomplished by the normal checking procedure followed by the human pilot. In this case, use of the Scheduling Computer may be limited to the last section of the flight only, to avoid the necessity of periodic resetting and will hereinafter be so considered.

*Means for determining the off-track and off-schedule distance of a craft in extended flight*

The responsibility for changing the settings of knobs 41, 61, and 43 may be lifted from the pilot and placed in an automatic mechanism to great advantage, and Figure 9 shows a computer 85 associated with a Preset Panel 86 and a Pilot's Indicator Panel 87: in these two panels most of the adjustments of the computer are performed. The functions of knobs 41, 61 and 43 are performed in Preset Panel 86 rather than in computer 85: the functions of knob 62 and clock 63 are combined within the computer; and the functions of knob 74 and indicators 40 and 73 are performed on Pilot's Indicator Panel 87. The visible supervisory elements of computer 85 therefore reduce to knob 75 and indicator 60.

The physical arrangement of the components of the system shown in Figure 9 deserves comment. It is obvious that the system is relatively expensive to install and maintain, and that its weight can be tolerated only in larger aircraft. Such craft usually comprise a cockpit and a control room in addition to the pay load compartment.

The instrument panel as well as the walls, ceiling and floor of the cockpit are already crowded with instruments, and the control room is not much less crowded, since it houses the instruments used by navigator, flight engineer and radio operator. A great advantage of the system of Figure 9 is that the only additional space required in the cockpit is that for a single small panel, the Pilot's Indicator Panel 87. Computer 85 and Preset Panel 86, while preferably accessible for emergency adjustment and servicing, need not be located in the cockpit, or even in the control room, although the latter location is a desirable one.

It is to be understood that all the areas to be traversed by craft using the equipment here described are charted, that the frequencies and the X- and Y-coordinates of all the stations with respect to every axis within their effective range are tabulated, together with the geographic bearings of the axes. Computer 85 and panels 86 and 87 have been so arranged that all the controls which may require adjustment during normal flight, and the indications of direct interest to the pilot, are on panel 87, while computer 85 includes nothing requiring adjustment except knob 75. On panel 86 there are mounted all the elements which require readjustment as the craft passes from the influence of one ground station to the next, and it is contemplated that this unit be provided with a quick detachable multi-electrode connector, and that it be mounted in a readily removable fashion, so that while computer 85 and panel 87 comprise semi-permanent portions of the craft, panel 86 is essentially portable.

Any scheduled flight in the area in question is of course related to previously plotted axes, and all the important factors are tabulated. The navigator or radio operator of the craft can therefore report to a central servicing depot and obtain a Preset Panel already adjusted to the various settings required, including if necessary alternative procedures. He need simply plug the panel in and adjust knob 75 if necessary to the length of the final leg, whereafter the entire system is ready for automatic operation as about to be described. This eliminates faulty use of the equipment by air-borne personnel in the stress of flight conditions, while still leaving control of the aircraft in their hands. The functions of panels 86 and 87 will now be considered.

*The basic components of a preset panel*

At each intermediate destination, $D_1$, $D_2$, etc., the tuning of ODR receiver 27 and DME interrogator 28 must be altered to agree with the frequencies of the new ground station equipment, so as to transfer control of shafts 36 and 37 from one station to the next. Remote control of the tuning of radio instruments is taught in such patents as Reinken 2,002,353 and Beers 2,020,275, and it is contemplated that any known method of remote tuning may be resorted to in the practice of the invention, in accordance with the convenience of the user and the nature of the tuning device in the radio equipment.

By way of example only, the tuner of ODR receiver 27, a crystal switching arrangement, may be supplied with a remote control potentiometer and tuning motor as in Beers, wherein the tuning motor adjusts the tuning of the radio instrument upon adjustment of the potentiometer, at the same time that it rebalances the telemetric system including the potentiometer. It is obvious that by providing as many potentiometers as there are sections to be flown, together with switching means for successively substituting the potentiometers in Beers' circuit, the radio equipment can be successively tuned to various frequencies in accordance with the prior settings of the successively connected potentiometers.

The same remote tuning system could, of course, be applied if the radio equipment is tuned by variable capacitors, or is permeability tuned, or, in the Very High Frequency range, if the receiver is tuned by adjusting plugs in resonant chambers, since the problem is simply one of motor-driving an adjusting means previously actuated by hand.

At the intermediate destination the coordinates of the new station and the new bearing of the Y-axis must also be set into the computer. It is possible, as explained below, to use sets of preadjusted potentiometers to determine these quantities as well as those just discussed and by means of a suitable switching mechanism, the substitution of successive sets of potentiometers in the computer can also be made.

The physical arrangement of the Preset Panel 86 is shown to be symmetrical in horizontal and vertical rows. Each horizontal row includes all the variables relating to one station, each variable including a knob for adjusting the variable and a counter type indicator for making its adjustment visible. Each vertical row includes all the elements relating to a particular variable: the first row comprises pilot lights 90 for indicating which action of the course is being flown; the second and third rows comprise counters 91 and 92 and adjusting knobs 93 and 94 related to the tuning of ODR receiver 27 and DME interrogator 28 respectively, and the last three rows include counters 95, 96 and 97 and adjusting knobs 100, 101 and 102 relating to the adjustment of $C_n$, $x_n$, and $y_n$ for the several ground stations. The Preset Panel also includes a suitable multifunction selector switch for performing the switching described above.

It will be evident that the elements in the fourth vertical row on the Preset Panel perform each in turn the function of knob 43, that those in the fifth row perform the function of knob 41, and those in the sixth row perform those of knob 61.

*The basic components of a pilot's indicator panel*

Panel 87 is shown to comprise an off-track distance indicator 103, a distance to destination indicator 104, a pair of manual knobs 106 and 107, a pilot light 110, and a switch 111. Indicator 103 replaces or may duplicate indicator 40 of the Navigating Computer 72, and indicator 104 similarly replaces or may duplicate indicator 73. Likewise knobs 106 and 107 perform respectively the functions of knobs 42 and 74 in computer 72. Indicator 104 is provided with a fixed contact 112 located at the zero of its scale, and a movable contact 113 is carried by pointer 114, so that each time the pointer reaches zero an electrical circuit is completed. The purpose of this contact-making arrangement is to cause operation of the selector switch in Preset Panel 86, and at the same time pilot light 110 is illuminated. Switch 111 is provided to permit manual control of the selector switch if desired.

At the same time that the radio operator or navigator is installing the Preset Panel and adjusting knob 75, the pilot is setting knob 106 in the Pilot's Indicator Panel to select the track along which his flight is scheduled to pass, and is adjusting knob 107 to the ground speed which he is scheduled to make. The system is energized at the moment of take-off, and control of the craft is turned over to this system when straight and level flight at the desired altitude has been obtained. Thereafter the Automatic Pilot of the craft is controlled by Directional Computer 78 through Azimuth Coupling Unit 33 to keep the craft on the desired track, and by Scheduling Computer 79 directly, in the last section of the flight, to keep the craft on schedule. Each time the pointer 114 reaches zero, contact 113 engages contact 112, energizing the selector switch to substitute new variables in the computer, and the flight proceeds. If occasion arises, the pilot need only operate knob 106 to move over to another track either to the right or the left, and if he is required to change his scheduled air speed, a simple manual adjustment of knob 107 keeps the system in perfect accord with the scheduled conditions of flight. In the sections of the flight preceding the last one Scheduling Computer 79 is disabled, and control of the air speed is stabilized by the Automatic Pilot.

*Orbiting*

Under some conditions it becomes desirable to delay the arrival of a craft at its destination, because of overtaxed landing facilities, failure of ground equipment, or some other emergency. Since the craft must maintain air speed or fall, recourse is had under these conditions to back-tracking or orbiting. The latter maneuver consists simply of flying in a circle about a known center, for as long as is necessary before clearance to proceed can be obtained.

This is illustrated in Figure 27, where it is supposed that a craft is traveling along the line $D_1$—$D_2$ to land at a destination near $D_2$ in about an hour, and that, on requesting clearance, the pilot is informed that due to conditions at the destination he cannot be allowed to land for at least an hour and a half. Delay is necessary, and to accomplish this the human pilot resorts to orbiting, making use of special means for maintaining the craft on a known path even during orbiting.

The basic need in orbiting control is a ground station whose location determines the center of the orbit. The equipment required at an orbiting station is simply a DME responder, and hence any of the regular ground stations is equipped to serve as an orbiting station; special ground stations equipped only to control orbiting, and located at positions particularly selected with this function in mind, may be provided if desired.

First suppose that no additional ground equipment is to be supplied, and that the orbiting craft is equipped with the apparatus shown in Figure 7. In this case station $S_2$ is the only available orbiting station, and accordingly the craft must orbit about $S_2$ as a center. Obviously the smoothest transition from straight flight to orbital flight takes place, as shown in Figure 27, at the point of tangency $P_t$ between the linear path $L_p$ and the circular path $C_p$. This point is reached when the craft's distance to destination $y_p$ is equal to the onset $y_2$ of station $S_2$, and when the radius of the circle to be flown is the difference $(x_2-x_t)$ between the station offset $x_2$ and the track displacement $x_t$.

If the computer is to control the craft so that it remains in a circular orbit, the structure of Figure 7 must be modified as shown in Figure 11. It will be seen that this figure shows a selector 128a movable between a first condition, in which multiplier 50 is connected to adder 52 just as in Figure 7, and a second condition, in which adder 52 is disconnected from multiplier 50 and is connected instead, by means 129a, so that it is influenced directly as $d$ changes. The signal $x_d$ to indicator 40 is now the sum of two constants, $x_2$ and $-x_t$, which are preset and do not vary with the position of the craft, and one variable $d$ which does vary as the position of the craft changes. The indication of indicator 40, and therefore the control output 56 to the Automatic Pilot, is determined solely by the relationship between $d$ and $(x_2-x_t)$, according to the equation $$x_d = x_2 - d - x_t$$

When these two quantities are equal indicator 40 is at zero.

Movement of the craft such that $d$ remains constant is a circle about $S_2$ as a center, and the radius of that circle is determined by $(x_2-x_t)$. If the craft moves farther from $S_2$, the value of $d$ is greater than that of $(x_2-x_t)$, and corrective operation of the Automatic Pilot in a first sense is brought about; if the craft moves nearer $S_2$ the value of $(x_2-x_t)$ is greater than that of $d$, and corrective operation of the Automatic Pilot in the opposite sense is brought about.

The arrangement just discussed insures that the craft remains in a circular orbit about station $S_2$. Inputs of $d$ and $90+C_2-B$) are still being supplied to multiplier 50, however, and as the craft circles the reading of indicator 73 continuously changes. If $y_t$ is set to zero, the indicator reading oscillates between the value of $y_2+(x_2-xt)$ and the value of $y_2-(x_2-xt)$, passing through the value of $y_2$ once in an increasing direction and once in a decreasing direction in each complete circle. Each time the value of $y_2$ is approached from below the craft is completing a circle and is returning to the point $P_2$; thus the pilot has an indication of when he can best return to straight flight in the original direction.

The varying output which causes oscillation of indicator 73 is also applied to control of the air speed of the craft, and would be superimposed on a uniformly changing output from adder 81. This is avoided by providing a second selector 128b and connecting it for operation unitary with selector 128a by suitable actuating means 128c, which may include manual operating knob 128d. When knob 128d is in the normal position, multiplier 50 is connected to adder 52 by selector 128a, and subtractor 70 is connected to the Automatic Pilot by selector 128b. When knob 128d is rotated, subtractor 70 is disconnected from the Automatic Pilot by selector 128b, and adder 52 is disconnected from multiplier 50, and connected directly to the $d$ input 36, by selector 128a. Operation of actuator 128c may be made automatic by means presently to be described.

When orbiting is performed, the normal change in $y_p$ does not take place, and indicator 60 begins at once to indicate an increasing departure from schedule. While this departure from schedule is of course the object of orbiting, it nevertheless results in destroying the significance of the reading of indicator 60 for all the rest of the flight. This can be avoided if desired simply by interrupting the operation of integrator 77 when orbiting is begun and reestablishing it when flight along the course is resumed.

Now suppose that it is desired to provide an independent orbiting ground station, shown at $S_0$ in Figure 27 as having an offset $x_0$ and an onset $y_0$. The modification of the air-borne system is shown in Figure 28, which is a fragment of Figure 11, the remainder of the latter figure being unchanged. The equation which must be satisfied in this case is $$d_0 + x_0 - x_t - x_d = 0 \qquad (5)$$

A study of Figure 28 shows that the air-borne equipment for this modification of the orbiting structure must include a second mechanical input 119, proportioned to $d_0$, the distance of the craft from station $S_0$, and in terms of air-borne equipment this means that the craft will have to be provided with a second DME interrogator and a second Distance Converter energized therefrom to give the second output 119.

In Figure 28 a selector 128e is shown as movable, by operation of manual knob 128d, between a first position, in which multiplier 50 is connected to adder 52, and a second position, in which adder 52 is disconnected from multiplier 50 and is connected instead, by means 129b, for actuation directly from the output 119 proportional to $d_0$. Actuator 128c is provided as before, since the operation of this system is the same in all respects as that of the system of Figure 11, except as regards its source of variable input, and air speed control of the craft must again be interrupted during orbiting. If the orbit is to be tangent to the straight path $D_1D_2$, $x_n$ must have the value $x_0$.

It should be pointed out that orbiting is not a practice of universal applicability, since when there are a plurality of tracks in use, the tracks and the orbits have numerous points in common, each of which is a point of possible collision. Moreover, most of the orbits are of prohibitively large radius. Where there is only one track in use, however, orbiting provides a simple and effective way of delaying the arrival of craft at a destination for a desired interval, if there is a conveniently located ground station available. Alternatively, when the needs of the situation demand, any regular track can be provided with its own orbiting station properly located to permit orbiting in a radius not greater than 2.5 miles for a 10 mile track separation.

*Special problems of change of direction of flight*

If it is necessary to change direction during a preset flight, additional complication arises. This is illustrated in Figure 10, where it is supposed that a craft is traveling along the track $D_1D_2$ whose geographic bearing is $C_2$, and it is desired to change to a new track whose geographical bearing is $C_3$. If there is a single track, the change of direction can be made simply by setting into the computer the $x_3$, $y_3$, and $C_3$, values for a track extending from $D_2$ in the desired direction, as suggested by the short line $L_1$ in Figure 10, so that the continuation of the flight in the original direction takes it off the new track, and the computer indicates this departure in terms of an increasing $x_d$ output, which also affects the Automatic Pilot to direct the craft to the new track.

If there is more than one track, however, this is not so easily done. One great advantage of the system thus far disclosed is that the tracks are everywhere equidistant. This means that a setting of $x_t$ to a certain value defines a continuous line from section to section of the chart. In Figure 10 this state of affairs is disturbed if the change of direction path as just described is followed. The center line of this section served by $S_2$ becomes line $L_2$ after the turn is made. The line $L_1$ is not spaced from the line $L_2$ by the distance $x_t$, but by $x_t \cos \Delta C$ while the line $L_3$, displaced from $L_2$ by a distance $x_t$, does not pass through $D_2$.

It is elementary that lines changing in direction but remaining everywhere equidistant are arcs of concentric circles. The problem here posed can be solved by continuing the tracks served by station $S_2$ as concentric circular arcs of an angular length sufficient to cause the desired change in direction, and by then continuing the arcs as straight lines in the new direction. By this means $y_2$ for all tracks will be the same and the $x_t$ setting may remain unchanged throughout the entire flight.

To cause flight in a circular arc requires an orbiting station, and in this case the necessity of a station independent of the regular stations $S_2$, $S_3$, etc., will become apparent. Orbiting station $S_0$ is accordingly provided, and its location on the ground is critical, unlike those of the ordinary ground stations. The line $S_0D_2$ must be perpendicular to line $D_1D_2$; the line $S_0D_0$ must be perpendicular to the new direction of flight $D_0D_3$, and $S_0$ must be further displaced from the Y axis of the old direction of flight than the outermost scheduled track on that side of the axis, by at least the minimum turning radius of a craft using this system.

The circular arc to be followed between $D_2$ and $D_0$ is set up in the Preset Panel as a separate section of the flight. For this section, ODR receiver 27 and the regular DME interrogator are tuned to the frequency of ground station $S_3$. The auxiliary DME interrogator is tuned to the frequency of ground station $S_0$. The cross track channel of the computer is disconnected from control by station $S_3$ and is instead connected for control from station $S_0$. The $y_n$ and $C_n$ adjustments are set to values $y_3$ and $C_3$, and the $x_n$ adjustment is set to $x_0$. When the stepping switch operates, the values just defined are those affecting the computer.

The cross track channel is now set up for orbiting about station $S_0$ in a circle which is tangent to $D_1D_2$ and $D_0D_3$. At $D_2$ the distance to destination $y_p$ of the craft has the value shown as $y_c$; this is greater than 100 miles—say 112 miles—and the pointer of indicator 104 is driven to 112 miles.

The direction of motion of the pointer is that of increasing numerical values of $y_p$, that is, from zero through $-10$, $-20$ miles and so on to $-112$ miles, which value the needle must reach before Equation 2 is satisfied.

As shown in Figure 31, there is provided in addition to fixed contact 112 located at the zero of the mileage scale, a second fixed contact 112' located at 100 miles, or at such other value as is selected for the standard section length. Movable contact 113 engages fixed contact 112' each time the pointer passes 100 miles, thereby completing an electrical circuit, independent of but related to that completed by engagement of contacts 113 and 112, which is also effective to operate the stepping switch.

In performing the balancing movement described above, pointer 114 moves past the 100 mile graduation and contacts 113 and 112 come into momentary engagement. The circuit thus completed includes time delay means, as will presently be described, preventing performance of any function from ensuing as a result of this brief contact interval, and as pointer 114 continues to its reading of $-112$ miles the circuit is again interrupted.

As the craft moves around the circular arc, the distance $y_p$ decreases, and pointer 114 moves back toward zero. When the craft reaches $D_0$, the distance $y_p$ becomes 100 miles, and contact 113 engages contact 112'. This time however, the pointer is moving so slowly that the time delay means does not prevent completion of the circuit to the stepping switch, which accordingly operates to remove the cross track channel of the computer from control by the auxiliary Distance Converter and reestablish normal control by the vector network. At the same time the value of $x_n$ is changed from $x_0$ to $x_3$: the remaining settings on the Preset Panel are the same in section $D_0D_3$ of the flight as in the orbital section $D_2D_0$, and the craft proceeds in the new straight line track.

The time delay structure is described more fully in connection with Figures 15a and 19. Its operation is based on the fact that in normal flight of the craft pointer 114 moves about its scale at a rate—for 200 M. P. H. air speed—of one revolution per hour, or .016 R. P. M. On the other hand, when the system is operating to satisfy Equation 2, the pointer moves at a speed of about 3 R. P. M., or roughly 200 times as fast. Thus the interval during which engagement between contacts 113 and 112' continues is 100 times as long in the one case as in the other. If the contact continues during 2 degrees of rotation of pointer 114, its duration during balancing is about .11 second, while during normal operation it is about 20 seconds. Insertion between contacts 113 and 112' and the stepping switch of an intermediate dash pot relay or other time delay means, requiring continuous energizing for say ¼ second before it operates, thus completes a structure capable of differentiating between the two types of movement of pointer 114. By this means the stepping switch is operated by engagement of contact 113 with contact 112, or contact 112' during normal operation of the pointer, but is not operated during preliminary operation of the pointer when the channel is first becoming balanced.

As previously pointed out, it is not contemplated that the scheduling computer will be used except in the last section of the flight, which is not planned to be circular. For this reason no mention has been made above of controlling selector 128d by the stepping switch. If automatic sequencing of the flight by the contacts of indicator 104 can be foregone, it will be apparent to those skilled in the art that through manual operation of the various controls great flexibility of movement of the craft is made available, such for example as orbital approach in the last section, or change of direction within a single section. These possibilities, while evidencing the versatility of the system, are of only minor importance in the commercially practical system, and will not be discussed in detail.

*Let-down procedures*

As pointed out earlier, coupling units are provided for applying the outputs of the $x_d$ and $y_d$ channels of the computer to the craft's Automatic Pilot. The fact that coupling units adapted to this function are also adapted to applying to the Automatic Pilot the outputs of the Instrument Landing System azimuth receiver, allows designing of a complete cruising and landing system in which duplication of function is substantially eliminated. For an understanding of the principles of this combined system, reference should again be made to Figure 1.

The significance of the elements of Figure 1 relating to the flight of a cruising aircraft have already been described—the Y-axis of the coordinates has been defined as the center line of a set of ground paths between two airports, and the X-axis has been defined as passing through a selected point D. All the parallel tracks end on the X-axis, which has been referred to as the terminus of destination: a similar line $y_gG$ near an originating airport is the terminus of departure.

Craft reaching the terminus of arrival and preparing to land at airport 10 are required to follow prescribed procedures in making the landing. It is assumed that the airport is equipped with the transmitters and other equipment making up a ground installation of an Instrument Landing System. If the "beam" of this system has not been entered by the craft at the time it reaches the terminus of destination, the human pilot must follow whatever is the published procedure for a craft reaching the terminus on his assigned track, and in so doing he will enter and may even pass completely through the beam.

*The instrument landing system*

The Instrument Landing System has been in operation in this country for some time and is familiar to those skilled in the art. In brief review, the system comprises localizer transmitter 116, glide path transmitter 117, and boundary, inner and outer marker beacon transmitters 120, 121 and 122 respectively as previously outlined, all part of the ground installation, and, as shown in Figure 12, a localizer receiver 123, a glide path receiver 124, a marker beacon receiver 125, a cross pointer indicator 126, and a warning light 127, all carried by the craft.

As is customary in such installations, the localizer transmitter 116 of the Instrument Landing System at the airport 10 is located at the far end of the runway, and the glide path transmitter 117 is located at the near end of the runway. The localizer transmitter sends out a directional beam of which the effective extent is 5 degrees, as shown at 123, and the vertical projection 124 of the glide path pattern lies in the center of the localizer beam. Fan shaped beams 125, 126 and 127 are emitted vertically from marker beacon transmitters 120, 121 and 122 which may be spaced 400 yards, 1 mile and 4½ miles, all respectively, from the prospective touch-down point.

The points in space at which the various tracks intersect the terminus of destination are known to the traffic control office at the airport, as well as the special let-down procedures prescribed for craft arriving on each track, to enable them to enter the landing beam and be guided to the touch-down point. In prescribing these procedures, it is planned as a precautionary measure that all craft will be fully within the beam before passing an "Entrance Gate" 128 located, for example, 6 miles from the touch-down point. For example, a craft following the track GD might be required to maintain heading until across the center of the beam, then turn to the left and follow the beam in, as shown in the solid line 130 in Figure 1. A craft following a track ending at D', on the other hand, might be required to proceed straight across the beam, make a 90° procedure turn, fly straight for 2 minutes, make a clockwise 180° procedure turn, fly straight until within the beam, and then follow the beam in, as shown in the dotted line 131. The speed at which the let-down procedures can be followed is standard for craft of the same capacity, and the length of time between the moment at which the craft passes the terminus of destination and the moment at which the field may reliably be considered clear for the next landing is known. Accordingly in a coordinated system for control of air traffic the scheduled ground speed of craft taking off from airports at different distances away can be specified by the tower operator at field 10, so that craft arriving on schedule can immediately land without stacking or delay at the airport of arrival.

The Instrument Landing System provides the pilot with a straight line glide path beam and a runway localizer beam. Indicator 126, best shown in Figure 12, is provided to guide the pilot in following the two beams, and consists of two crossed needles 128 and 129. The normally vertical needle 128 supplies a visual indication of the lateral position of the aircraft with respect to the center of the localizer beam. The normally horizontal needle 129 shows the relationship of the aircraft to the glide path beam. When the aircraft is properly positioned on the approach path, the needles of the indicator are crossed at the center of the instrument.

The three markers provide a check on the distance of the craft from the air strip: the warning light gives a coded flash when the craft passes over each marker, and the code of the flash indicates which of the markers is being flown over.

After homing to the airport by any navigation means available—in this case by the use of the computer and the Automatic Pilot—the craft is flown by prescribed procedure to intersect the runway localizer path, after reaching which the flight is conducted by reference to the localizer needle indication. On final approach the aircraft is flown "on the localizer" at the desired altitude until the glide path is intersected. The pilot then establishes a uniform rate of descent by reference to the output of the glidepath receiver, and maintains glide and direction by keeping both needles centered.

The detailed operation of the Instrument Landing System is not of significance here and it need only be remembered that whenever the craft is on one side of a localizer beam, say the North side of an East-and-West beam, the vertical needle is deflected to the left of its center zero position by a unidirectional voltage of a first polarity, while if the craft is on the other, South, side of the beam the needle is deflected to the right by a voltage of the opposite polarity. This is independent of the heading of the craft. As the craft moves away from the center of the beam the needle displacement becomes greater until at about 2½ degrees, measured at the localizer transmitter, full scale deflection is reached. The useful width of the beam is thus 5 degrees. If the craft continues to diverge from the center of the beam the needle remains at full scale deflection, provided the craft is within the service range of the localizer transmitter. A perceptible indication of approach to the transmitter, together with identification as to which side of the beam is being approached, can usually be obtained as far as 25 miles from the beam. The terminus of destination is preferably so laid out with respect to the localizer beam that craft reaching the destination are within this range of the transmitter and can determine their location with respect to the center of the beam.

Similarly when the craft is above the desired glide path the horizontal needle is deflected upwardly, moving through its full scale deflection during departure of the craft upward from the desired path by an angle measured by .3° at the glide path transmitter. If the craft is below the center of the beam the horizontal needle is deflected downwardly, moving through its full scale deflection when the craft moves to .5°. The useful "width" of the beam in elevation is therefore .8°.

*The distance measuring equipment*

Consideration of details of the components making up the inventive system will begin with converter 34, shown in Figure 13 with the related portions of interrogator 28. The output of the latter is conventionally a voltage applied to a high impedance voltmeter: the purpose of the converter is to derive from this voltage a shaft rotation proportional thereto, without destroying the accuracy of the original system. The interrogator is shown at 28, below and to the left of the dotted line 28'; and the voltage in question is impressed on a meter 132, one side of which is connected to the plate of a pentode 133 and the other side of which is connected to the positive terminal of the source of plate voltage. The resistance of the pentode is varied by voltages impressed on its control electrode by means, not shown, provided therefor, in accordance with the distance being measured, and thus the voltage between the positive terminal of the power supply and the plate is also varied.

*Construction of the distance converter*

The purpose of converter 28 is to obtain a mechanical movement proportional to the reading of indicator 132, which requires the use of an electric motor controlled by the interrogator. The most satisfactory method of motor control is one using a rebalancing or null type of network; such a network must be so designed that the measuring circuit is not loaded down thereby to a point where its accuracy is destroyed. This is accomplished according to the present invention by a comparison arrangement in which first the voltage across the meter and then a comparison voltage are applied to an amplifier of high input resistance, and the amplifier energizes a motor to adjust the comparison voltage to equality with the voltage being measured. The motor shaft rotation also comprises the mechanical output from the converter, since it is a measure of the comparison voltage, which is in turn proportional to the distance being measured.

In order to minimize the effect of change in the supply voltage, the comparison voltage is obtained from the same source. Thus a first conductor 134 is connected to the positive terminal 135 of the power supply and conductor 136 is connected to ground, and the negative terminal of the power supply, at 137. In series between these two conductors there are connected a first variable resistor 140, a potential divider 141 having a slider 142 and a linear winding 143, and a second variable resistor 144. The values of resistors 140 and 144 are adjusted so that when meter 132 gives its maximum reading the slider 142 is at the same potential as the negative terminal of the meter if the slider 142 is at the left hand end of winding 143, and when meter 132 gives its minimum reading, slider 142 is at the same potential as the meter terminal if at the right hand end of the winding: resistors 140 and 144 are thus centering means coordinating the range of slider 142 with the range of voltage available across pentode 133.

The converter includes an interrupter 145 having a winding 146, a movable contact 147, and a pair of fixed contacts 150 and 151. Winding 146 is energized through a conductor 152 and ground connections 153 and 154, from a source 155 of alternating voltage, to cause movable contact 147 to oscillate between fixed contacts 150 and 151 at the frequency of the source. Fixed contact 150 is connected to the negative terminal of meter 132 by a conductor 156, and fixed contact 151 is connected to slider 142 by conductor 157. The potential of movable contact 147 is thus alternated between that of fixed contact 150 and that of fixed contact 151, and if the two fixed contacts are not at the same potential a square wave alternating voltage of the frequency of source 155 appears upon movable contact 147, and is applied to an amplifier 160 through conductors 161 and 162 and ground. Operation of movable contact 147 is maintained in phase with the voltage of source 155 by means of a phasing capacitor 163. Conductor 161 includes a blocking capacitor 161', and a grounded resistor 162' cooperates with capacitor 161 to complete the input circuit to the amplifier for alternating voltage.

Amplifier 160 is of the type in which a voltage is obtained at output terminals 166 and 167 which is of the same phase, positive or negative, and frequency as the voltage applied to input terminals 164 and 165. The output voltage is impressed by conductors 170 and 171 upon one winding 172 of a two phase motor 173 having a second winding 174 and a rotor 175. The power factor of the motor may be improved by the addition of a capacitor 176 across winding 172. Winding 174 is energized from source 155 through ground connections 177 and 154, and conductor 180 and phasing capacitor 181.

Unitary on the shaft 182 of rotor 175 is the rotor 183 of a velocity generator or dynamic transformer 184. This generator has an energizing winding 185 and an output winding 186, the former being energized from source 155 through ground connectors 154 and 187, and conductor 190 and phasing capacitor 191. Winding 186 is connected in the input circuit of amplifier 160, which may be traced from terminal 164 through conductors 162 and 161, capacitor 161', movable contact 147, fixed contact 150 (or 151), pentode 133 (or slider 142, winding 143, and variable resistor 144), ground connections 137 and 187, winding 186, and conductor 192 to input terminal 165.

The shaft 182 of motor 175 is connected through reduction gearing 193 to a shaft 194 which actuates slider 142 along winding 143. Input shaft 36 to the computer is also coupled to rotor shaft 182, through reduction gearing 195.

A further feature of the structure of the unit is to be found in a network 196 including resistors 197 and 198, a rectifier 199, and a capacitor 200. Capacitor 200 and resistor 198 are connected in parallel between a pair of terminals 201 and 202, the latter being grounded, and the former being connected to terminal 164 of amplifier 160 through rectifier 199, resistor 197, and conductor 162. The purpose of this arrangement will be explained when reference is made to the "lockout" circuit in the computer.

*Operation of the distance converter*

So long as fixed contacts 150 and 151 are at the same potential, regardless of its actual magnitude, no square wave alternating voltage is impressed on the input of amplifier 160. Winding 172 of motor 173 remains unenergized, and neither shaft 194 nor shaft 36 is rotated. This is the normal or balanced condition of the converter, and at this time no voltage appears between terminals 201 and 202.

If the potential at the plate of pentode 133 changes, as by reason of a change in the distance being measured, the potential of fixed contact 150 varies while that of fixed contact 151 remains the same. A square wave alternating voltage is impressed on amplifier 160, and a unidirectional voltage appears between terminals 201 and 202. The amplifier applies the amplified fundamental component of the square wave, which is of the same frequency as the source 155 and in phase or 180° out of phase with it, to winding 172 of motor 173. An alternating voltage of the same frequency but in phase quadrature is continuously impressed on winding 174 through conductor 180. Under these conditions a rotating field is set up, as is well known to those skilled in the art, and rotor 175 begins to turn, its direction of rotation being determined by the phase of the voltage applied to winding 172. Shaft 194 is driven to adjust the position of slider 142 in a direction to make the potential of fixed contact 151 equal to that of fixed contact 150. Simultaneously rotor 183 of velocity generator 184 is driven, inductively supplying in the input circuit to the amplifier a voltage of the frequency of the source and of an amplitude dependent upon the rate of movement of rotor 183. This voltage is phased to oppose that causing the operation of the motor, to give antihunt action. When fixed contact 151 assumes the same potential as fixed contact 150, the input to amplifier 160 returns to zero and operation of motor 173 ceases.

It is obvious that if fixed contact 150 takes a higher potential than fixed contact 151, the square wave impressed on amplifier 160 is of a first phase relation, while if the potential of fixed contact 150 decreases, the square wave is of the opposite phase. After passing through the amplifier the resulting voltage on winding 172 leads or lags the quadrature voltage on winding 174, and hence operation of motor 173 is reversible. From this and the foregoing explanation it follows that the rotated position of shaft 36 is proportional to the distance being measured, and that this proportionality is maintained, regardless of change in the distance, without influencing the accuracy of the distance measurement.

*The omnidirectional range*

The Omnidirectional Range comprises in effect a transmitter and a receiver for emitting and responding to a high frequency carrier upon which are impressed a sinusoidal low frequency modulation and a keyed impulse voltage. At the transmitter an antenna array is so energized that the maxima of intensity of the carrier rotate about the antenna at the low frequency. The impulse voltage is transmitted when the positive maximum of the carrier is due North of the transmitter, so that in any other direction from the transmitter there is an interval between the instant of reception of the pulse and the instant when the carrier reaches its peak value. The function of the Omnidirectional Range receiver is to respond to this interval by giving an indication of the direction of the receiver from the transmitter.

Such portions of the structure of the Omnidirectional Range receiver as are necessary to an understanding of the present invention are shown above the dotted line 201' in Figure 14. The principal components of the receiver are a phase splitting bridge 203, a universal phase shifter 204, a pair of pentodes 205 and 206, and an indicator 207 which is essentially a D. C. voltmeter with a center zero reading. The receiver, not shown, demodulates the carrier and the low frequency modulation is fed to an automatic gain control circuit and a filtering amplifier. The output of the filtering amplifier, representing the sinusoidal modulation of the carrier at the transmitter, appears between conductors 210 and 211 in Figure 14. The received impulse voltage appears between conductors 212 and 213, the latter being grounded.

Coupling capacitors 214 and 215 and conductors 216 and 217 impress the filtered low frequency modulation signal upon the input terminals 220 and 221 respectively of phase splitting bridge 203, which comprises a pair of fixed capacitors 222 and 223 forming opposite arms of the bridge, and a pair of resistors 224 and 225 forming the remaining arms of the bridge. In order to permit adjusting the bridge so that the voltage at its output terminals 226 and 227 is 90° out of phase with the voltage on its input terminals, resistors 224 and 225 are made adjustable as at 230. Voltages from terminals 220, 221, 226 and 227 of the phase splitting bridge are made available to the other portions of the system not here described by conductors 231 and 232, 233 and 234, 235, and 236, respectively.

The output of phase splitting bridge 203 is impressed upon universal phase shifter 204 in order to provide a voltage which may vary in phase through 360 degrees. Phase shifter 204 comprises an endless resistance winding 237 tapped at four equally spaced points 240, 241, 242 and 243. Input terminal 220 of bridge 203 is connected to tap 240 of phase shifter 204 by conductor 244 and resistor 245, terminal 221 to tap 241 by conductor 246 and resistor 247, and terminals 226 and 227 to taps 242 and 243 by conductors 250 and 251.

Movable unitarily with respect to winding 237 are a pair of mutually insulated sliders 252 and 253 carried by a suitable member 254 driven by a shift 255 for rotation by operation of a manual knob 256: a scale 257 is provided for indicating the rotated position of knob 256. The arrangement is such that when slider 252 is in contact with tap 240 and slider 253 is in contact with tap 241, the voltage between sliders 252 and 253 is in phase with the voltage between conductors 210 and 211. When the sliders are rotated from this position by 180 degrees the phase of the voltage between them is 180 degrees from the input voltage, and as they are rotated clockwise or counterclockwise from the zero position, the voltage between the sliders correspondingly leads or lags the input voltage. Accordingly, as member 254 rotates clockwise from the position where slider 252 contacts tap 240, the voltage between sliders 252 and 253 varies in phase from a phase angle of 0 continuously through 360 degrees of phase angle.

This continuously variable voltage is supplied to pentodes 205 and 206, comprising respectively cathodes 260 and 261, control grids 262 and 263, screen grids 264 and 265, suppressor grids 266 and 267, and plates 270 and 271. Slider 252 is connected to suppressor grid 266 of pentode 205 by conductor 272, resistor 273, and conductor 274: similarly, silder 253 is connected to suppressor grid 267 of pentode 206 by conductor 275, resistor 276 and conductor 277. Plate 270 of pentode 205 is connected to plate 271 of pentode 206 by conductor 280, a resistor 281, a voltage divider 282, a resistor 283, and conductor 284, and positive plate potential is applied to the slider of voltage divider 282, and to screen grids 264 and 265, from a suitable source 285, the negative terminal of which is grounded at 286, as are cathodes 260 and 261. Bias voltage from a source 287 is supplied to the control grids 262 and 263 through a pair of resistors 290 and 291, and to the suppressor grids 266 and 267 through phase shifter 204, bridge 203, conductors 298 and 298', a pair of resistors 292 and 293 and conductor 299.

The impulse voltage is applied to control grids 262 and 263 of the pentodes through ground connections 213 and 286 and through conductor 212, capacitor 294, and resistor 291, and is also made available to other portions of the system by a conductor 239. The impulse voltage provides a fixed point in time with which comparison of the output voltage of the phase shifter 204 is to be made; the latter voltage is applied to the pentode suppressor grids in opposite phase relation, while the impulse voltage is applied on the control grids of the pentodes in the same phase relation. When the phase shifter is set at zero the pulse coincides with the positive peak of voltage on one suppressor grid, say that of pentode 205, and the negative peak of voltage on the other grid. If the phase shifter is rotated through 180 degrees the pulse coincides with the positive peak of the voltage on the suppressor grid of pentode 206, and the negative peak of the voltage on the suppressor grid of pentode 205. With a unidirectional anode voltage and with suitable grid bias voltages, the arrangement causes the pentodes to discharge equally when the phase shifter is at 90 and 270 degrees, moving from a maximum discharge of pentode 205 and a minimum discharge of pentode 206 when the phase shifter is at zero through a maximum discharge of pentode 206 and a minmum discharge of pentode 205 when the phase shifter is at 180 degrees.

Indicator 207 is connected between the plates of the pentodes by conductors 280, 295, 296, 297, 300 and 284. When the pentodes discharge equally the indicator is at its central zero position: if pentode 205 discharges more than pentode 206, the needle of the indicator swings to the left while if pentode 206 discharges more than pentode 205, the needle swings to the right. In other words, the voltage between conductors 295 and 300 is a unidirectional voltage of variable magnitude and reversible polarity.

If the craft is North of the transmitter, the pulse and the voltage peak occur at the same time. For indicator 207 to give an on course or center zero indication, phase shifter 204 must be set to give a 90 degree phase shift between input and output. This corresponds to the "North" indication of knob 256 on scale 257. If the craft is East of the transmitter the impulse precedes the voltage peak by an interval corresponding to 90 degrees of the low frequency. Adjustment of phase shifter 204 to delay the voltage peak by 90 degrees causes the pentodes to again discharge equally. The instrument was designed to be used by setting the phase shifter knob to the angle from which it is desired to approach the station, and then to fly the craft so that the indicator reading remains zero.

*Construction of the bearing converter*

If means can be provided whereby shaft 255 is driven always to such a position that indicator 207 reads zero, the position of the shaft is then a measure of the bearing of the craft's position from the transmitter. This adaptation of the Omnidirectional Range receiver is what converter 35 is designed to perform, and to this end the converter is electrically and mechanically connected to receiver 27 and computer 85.

Converter 35 comprises a pair of input terminals 302 and 303 connected to the indicator by conductors 308 and 296, and 297 and 309, a pair of power terminals 304 and 305 of which the former is grounded as at 306, and a pair of output terminals 307 and 310, the latter also grounded as at 311, as well as a pair of output shafts 301 and 37 connected respectively to knob 256 with the Omnidirectional Range receiver and to computer 85. The principal components of the converter are an inverter 312, a motor control amplifier 313, a motor 314, and a network 315.

Inverter 312 comprises input terminals 316 and 317, output terminals 320 and 321, and power terminals 322 and 323. Alternating voltage from the source 155 which energizes Distance Converter 34 is applied to terminals 304 and 305 and hence by ground connections 306 and 324 and conductor 318 to inverter 312, which functions to convert unidirectional voltage applied to input terminals 316 and 317 into alternating voltage appearing at output terminals 320 and 321, the alternating voltage being of the frequency of source 155, and varying in amplitude and reversing in phase with variation in the magnitude and reversal of the polarity of the applied unidirectional voltage: such devices are known. Inverter 312 is connected to input terminals 302 and 303 by conductors 325 and 326.

Motor 314 comprises a rotor 327 and a pair of stator windings 330 and 331. Rotor 327 is mounted on a shaft 332 and unitary therewith is the rotor 333 of a velocity generator 334 having a primary winding 335 and a secondary winding 336. Output shafts 301 and 37 are respectively connected to shaft 332 through suitable reduction gearing 337 and 340. Quadrature capacitor 341 and phasing capacitor 342 are provided in the circuits of windings 330 and 335, which are continuously energized from source 155. A capacitor 343 is connected across winding 331 of motor 314 to improve its power factor: this winding is energized from the output terminals 344 and 345 of amplifier 313 by conductors 346 and 347, the former being grounded as at 350.

A voltage divider 351 comprising a slider 352 movable with respect to a winding 353, is connected across secondary winding 336 of velocity generator 334, and the output of this divider is applied in series with the output of unit 312 to the input terminals 354 and 355 of amplifier 313, through conductors 356 and 357 and ground connections 321' and 359. Amplifier 313 is of the type in which a voltage output is obtained which is of the same phase and frequency as the voltage applied to its input.

Network 315 is shown to include a capacitor 360 and a resistor 361 connected in parallel across terminals 307 and 310. In series with these units are a rectifier 362 and a resistor 363, the series circuit being connected to conductor 356 by a conductor 364. This circuit is the same as circuit 196 in the Distance Converter.

*Operation of the bearing converter*

Suppose the craft is at the location P, with respect to the transmitter $S_n$, shown in Figure 1; here the bearing of the craft from the transmitter is 80 degrees measured clockwise from North. If phase shifter 204 is set at 80 degrees, pentodes 205 and 206 discharge equally, conductors 295 and 300 are at the same potential, and no voltage is applied to input terminals 302 and 303 of converter 35. The output from unit 312 is zero, and motor 314 is not energized for rotation.

If phase shifter 204 is set at some other value, the pentodes discharge unequally, indicator 207 gives a reading, and a unidirectional voltage is impressed on input terminals 302 and 303. This voltage is converted to alternating voltage in inverter 312, and impressed upon amplifier 313, whose output energizes motor 314 to operate in one direction or the other, according to the polarity of the input voltage. Operation of motor 314 readjusts knob 256 through shaft 301 until it reads 80 degrees, the adjustment simultaneously altering the phase of the pentode suppressor voltages to make them discharge equally, at which point the voltage to the inverter disappears, and the motor stops running. Velocity generator 334 serves to give the circuit antihunt properties. The function of circuit 315 will be explained later.

By this means the position of shaft 37 is always a measure of the bearing of the craft from the transmitter: as the craft moves the phase relation between the pulse and the phase shifter output changes, and operation of motor 314 to correct the position of shaft 37 immediately results.

*The navigating computer*

Figures 15 and 16 together show details of the structure of Navigating Computer 85, and include such portions of other components of the complete system shown in Figure 12 as are necessary to an understanding of the manner in which the various computations and adjustments necessary to proper control of a craft are performed. The Navigating Computer is energized at power terminals 365 and 365' through a main fuse 368 by alternating voltage from source 155, the latter terminal being grounded as at 371 and the former being connected through a main switch 370" to power busses 369 and 369'. Switch 370" is of the double pole, double throw, center off type, and both its movable blades are connected to fuse 368. Blade 370' controls energization of Scheduling Computer 79 through bus 369', when closed in a downward direction as seen in Figure 15a, and blade 370 controls energization of Directional Computer 78 through bus 369 when closed in either direction. A pilot light 368' is energized whenever switch 370" is closed in either direction. Directional Computer 78 is the primary subject matter of Figure 15, and Scheduling Computer 79 is the primary subject matter of Figure 16.

*The directional computer*

As has been pointed out above, Directional Computer 78 performs two functions, both based on inputs from Distance Converter 34 and Bearing Converter 35. The cross track channel 366 of the Directional Computer functions to solve Equation 1 by varying a component representative of $x_d$, components representative of $x_n$ and $x_t$ being manually set and a component representative of $d \cos(90° + C_n - B)$ being automatically adjusted.

The along track channel 367 of the Directional Computer functions to solve Equation 2 by varying a component representative of $y_p$, a component representative of $y_n$ being manually set and a component representative of $d \sin(90° + C_n - B)$ being automatically adjusted.

The Directional Computer is energized from power bus 369. Closing of switch 370" in either direction energizes the primary winding 372 of a transformer 373 through fuse 368, switch blade 370, bus 369 and ground connections 374 and 371. Maintained electrostatically independent of winding 372 by a grounded shield 375 are a plurality of mutually shielded secondary windings, which are located at various positions in Figures 15a and 15b for simplicity of illustration. In order to make clear the interrelation between these windings, primary winding 372 is shown as broken away, and each secondary winding is shown as associated with a core and a portion 372' of winding 372. The secondary windings are indicated by reference numerals 376, 377, 378, 379, 380, 381, 382, 383, 384, 385 and 386 in the order in which they appear going counterclockwise around Figures 15a and 15b.

Winding 376 of Figure 15a provides voltage for a vector network 387 which is effective both in cross track channel 366 and along track channel 367 of the Directional Computer. Winding 377 provides voltage for an auxiliary distance circuit effective in cross track channel 366 only when heading is being changed as will be described later. Windings 378, 379 and 380 respectively provide voltages for the $x_n$, $x_t$ and $x_d$ circuits of the cross track channel. Windings 381 and 382 of Figure 15b provide voltages for the control circuit of the cross track channel. Windings 383 and 384 of Figure 15a provide voltages for the $y_p$ and $y_n$ circuits respectively of the along track channel 367. Winding 385 provides voltage for the pilot lights on Preset Panel 86'. Winding 386 provides voltage for the telemetric system associated with setting of angle $C_n$ for various track bearings. The cross track channel of the Directional Computer will now be considered in detail.

The vector network in the cross track channel

Vector network 387 functions to derive, from mechanical inputs provided by shafts 36 and 37 which are proportional to the magnitude $d$ and direction B of a vector quantity relative to selected coordinates, a pair of voltages varying in amplitude and determined in sign by the values of the $x$ and $y$ components of the vector quantity. The vector quantity is the position of the craft from the station, and the vector network comprises a distance circuit 388 influenced by shaft 36 in accordance with the value of $d$, and an angle circuit 389 influenced by shaft 37 in accordance with the value of B.

The distance and angle circuits are so interconnected that they provide a single output voltage, for each component of the vector, which is the product of a linear factor and a trigonometric factor. To this end distance circuit 388 is directly energized, while angle circuit 389 is energized through distance circuit 388.

The distance circuit

Distance circuit 388 is concerned with the linear factor of the vector, and comprises a series electrical circuit including conductor 390, secondary winding 376, conductor 391 and the winding 392 of a voltage divider 393 having a slider 394. Slider 394 is actuated by shaft 36 in accordance with the distance $d$ from the transmitter to the craft, under the control of the motor in Distance Converter 34. Slider 394 is moved from the end of winding 392 connected to conductor 391, when $d=0$, to the end of winding 392 connected to conductor 390, when $d$ increases to 100 miles. The output voltage of winding 376 is 200 volts, and therefore each change of 1 mile in the position of the craft causes a change of 2 volts in the potential of slider 394, compared to conductor 391.

The angle circuit

Angle circuit 389 is concerned with the trigonometric factor of the vector, and comprises a "resolver" or variable resistor 395 including a winding 396 having a center tap 397, which is grounded as at 398, and a pair of sliders 400 and 401. Winding 396 is connected to slider 394 and conductor 391 of the distance circuit by conductors 403 and 402 respectively.

The voltage between conductor 402 and ground connection 398 is of the same phase as and of half the amplitude of that between conductor 391 and slider 394, while the voltage between conductor 403 and ground connection 398 is of the opposite phase to and of half the amplitude of that between conductor 391 and slider 394. Thus although the "scale" of voltage divider 393 is 2 volts per mile, that of the available outputs from variable resistor 395 is 1 volt per mile as far as the distance factor of that output is concerned: this scale of 1 volt per mile is retained throughout the rest of the computer.

The resolver

Slider 400 supplies a "cosine" output voltage from resistor 395, and slider 401 supplies a "sine" output voltage from the resistor. The structure provided in this connection is best shown in plan and elevation in Figures 17 and 18, to which reference should now be made. Resistor 395 is seen to comprise a sheet 404 of insulating material carrying winding 396 and supported on a suitable base member 405 by angle brackets 406. A bearing bracket 407 is also mounted on base member 405 and pivotally supports a shaft 410 for rotation about an axis normal to the center of winding 396. Shaft 410 bears at its end a disc 411 carrying sliders 400 and 401, which comprise respectively spring metal arms 412 and 413 equipped with contacting pins 414 and 415 and insulated from disc 411 and from each other. Pins 414 and 415 make contact with winding 396 in a circle about the axis of shaft 410 as a center, and are spaced by 90° about that circle. The ends of winding 396 are connected to terminals 416 and 417.

Center tap 397 is aligned with the axis of shaft 410, that is, with the center of the contact circle, and the wires of winding 396 between the terminals and the points of tangency with the circle are short circuited by solder as at 418 and 419. At the instant when slider 401 extends upwardly in alignment with center tap 397, it is substantially at ground potential, while slider 400 is at the potential of terminal 417. As shaft 410 is turned in a clockwise direction the potential of slider 401 increases and that of slider 400 decreases with respect to ground.

Winding 396 is made up of many turns of fine wire, so that the vertical component of any movement of a slider around the circle, as seen in Figure 18, is accompanied by a change in potential which is insignificant compared with that due to the horizontal component of the movement. The potential between slider 400 and center tap 397 accordingly varies as the cosine of the angle of rotation of slider 400 counterclockwise from a zero position, in which it extends horizontally to the right, and that of slider 401 varies as the cosine of $(\alpha+90)$ or as the sine of $\alpha$. In Figure 18 the arrangement is shown in a condition where the value of angle $\alpha$ is 45 degrees: $+1$ of the trigonometric relation, corresponding to sin 90 or cos 0, comprises the voltage between center tap 397 and terminal 417, and the voltage between the center tap and terminal 416 is accordingly $-1$.

Since a voltage equal to $2d$ is impressed between terminals 416 and 417, half of this voltage is impressed between each of the terminals and center tap 397. The voltages between sliders 400 and 401 respectively and ground are hence equal to $d \cos \alpha$ and $d \sin \alpha$.

The angle drive

Returning to Figure 15a, the significance of angle $\alpha$ in terms of the bearings known in the present case will now be explained. A shaft 410 is shown as driven by the output of a mechanical differential 420, having as a first mechanical input the rotation of shaft 37 which, it will be recalled, is driven by the motor of Bearing Converter 35 to angle B, the bearing of the craft from the transmitter. A second mechanical input to differential 420 is supplied by a second shaft 421: as will presently be explained, the rotated position of this shaft has an angular magnitude of $90+C_n$. The two inputs are combined in differential 420, and the initial adjustment is such that the rotated position of shaft 410, or angle $\alpha$ as defined above, has a value $(90°+c_n-B)$.

From the foregoing it follows that the vector network gives a pair of output voltages having the magnitudes $d \cos (90°+C_n-B)$ and $d \sin (90°+C_n-B)$. The construction is universal in that the comparison of the slider potentials with that of the center tap enables the phase of either or both to reverse as $(90°+C_n-B)$ passes through the various quadrants, so there is no limit to the value of any of the angles concerned.

The voltage determined by $d \cos (90°+C_n-B)$ is applied to cross track channel 366 of the directional computer through ground connection 398 and an output conductor 422, and will be referred to as the "cosine" voltage. Similarly a "sine" voltage is determined by $d \sin (90°+C_n-B)$ and is applied to along track channel 367 of the directional computer by ground connection 398 and an output conductor 423.

Construction of the track bearing telemetric system

Input shaft 421 to differential 420 is to take the angle $(90°+C_n)$. Since differential 420 is located in Navigating Computer 85', while the setting means for angle $C_n$ are located on Preset Panel 86', operation of shaft 421 must take place by means of a telemetric system. Moreover, since any one of a plurality of knobs 100 must be able to influence the system, means must be included for transferring control from one knob to another. Structure for accomplishing these ends is shown in Figure 15a.

The telemetric system is identified by reference numeral 424; the input to the system is manual rotation of knob 100, and its output is powered rotation of shaft 421. Indicator 95, actuated by knob 100 through a shaft 428, is arranged for a maximum reading of 359.9, after which, if operation of knob 100 continues in the same direction, the reading becomes 000.0. The indicator operates in either direction, and is mounted, together with knob 100, on Preset Panel 86'.

Shaft 428 also moves a pair of mutually insulated sliders 425 and 426 with respect to an endless resistance winding 427, tapped at four equidistant points 430, 431, 432 and 433. Slider 426 is grounded as at 434. Slider 425 is connected through a conductor 435 and a portion of the winding 436 of a voltage divider 437 determined by the setting of its slider 440, to a conductor 441. Winding 427 is energized through conductors 442, 443, 444 and 445 connected respectively to taps 430, 431, 432 and 433.

Conductors 441, 442, 443, 444 and 445 are connected to fixed contacts 446, 447, 450, 451 and 452 of a plurality of tap switches 453, 454, 455, 456 and 457 having switch arms 460, 461, 462, 463 and 464, all respectively. These switch arms, and others presently to be mentioned, are actuated by a mechanical driving means 465 to move unitarily with respect to their fixed contacts, of which each switch is provided with a plurality.

Arm 460 is connected to conductor 466, and arms 461, 462, 463 and 464 are respectively connected to conductors 467, 470, 471 and 472 leading to equally spaced taps 473, 474, 475 and 476 on another endless resistance winding 477. Movable with respect to winding 477 are a pair of mutually insulated sliders 480 and 481 actuated by a shaft 482. Sliders 480 and 481 are energized from secondary winding 386 of transformer 373 through connections 483 and 484 which may include slip rings. Operation of means 465 selects one of a plurality of voltage dividers like 427 and connects it to be energized from winding 477, through switches 454, 455, 456 and 457, and to energize an amplifier through switch 453.

Shaft 482 is driven through reduction gearing 485 by a motor 486 comprising a rotor 487 carried by a shaft 492 and a pair of windings 490 and 491. Shaft 492 also carries the rotor 493 of a velocity generator 494 having a primary winding 495 and a secondary winding 496. Windings 490 and 495 are energized from power bus 369 through quadrature capacitor 500 and phasing capacitor 501, the circuits being completed through ground connections 502 and 503, all respectively.

Winding 491 of motor 486 is energized from the output terminals 504 and 505 of a motor control amplifier 506 through conductors 507 and 510, the former being grounded at 502; a capacitor 511 is shunted across winding 491 to improve its power factor. Electrical energy is applied to power terminals 512 and 513 of amplifier 506 through power bus 369 and ground connections 514 and 371. Signal voltage is supplied to input terminals 515 and 516 of amplifier 506 through a circuit which may be traced from slider 426 through ground connections 434 and 517 to terminal 516, and from slider 425 through conductor 435, a portion of winding 436, slider 440, conductor 441, fixed contact 446, switch arm 460, and conductors 466 and 520 to terminal 515. From this circuit it is evident that the voltage input to the amplifier is the series sum of the voltage between sliders 425 and 426 and the voltage across the included portion of winding 436.

Endless resistance windings 427 and 477, together with transformer secondary winding 386 and sliders 425, 426, 480 and 481, comprise telemetric system 424, which functions, as is well known to those skilled in the art, to supply between sliders 425 and 426 an alternating voltage from winding 386 which varies in magnitude with disagreement between the position of the sliders on their respective windings, each being measured with respect to a selected zero of position, and which reverses in phase with reversal in the sense of the positional disagreement. The voltage between sliders 425 and 426 is used to control the operation of motor control amplifier 506.

Amplifier 506 is of the type in which, when an alternating voltage of a selected frequency and phase is impressed between its input terminals, an amplified voltage of the same frequency and phase appears at its output terminals. The output voltage is applied to winding 491 of motor 486. Since the frequency of the input voltage to the amplifier is that of source 155, and since the input voltage is either in phase with or 180 degrees out of phase with that of the source, the output voltage energizing winding 491, the "amplifier phase" of the motor, is either in phase with the source or 180 degrees out of phase with it.

The voltage energizing winding 490, the "line phase" of motor 486, is fixed in quadrature with the source by the action of capacitor 500, and therefore the energization of the amplifier phase leads or lags that of the line phase by about 90 degrees, resulting according to well-known principles of motor operation in rotation of the motor, in the one case in a forward direction and in the other case in a reverse direction.

Operation of motor 486 drives shaft 492 to adjust the position of sliders 480 and 481, thus varying the distribution of potentials to conductors 467, 470, 471, and 472. In the initial setting up of the system the arrangement is made such that the motor operation reduces the voltage across sliders 425 and 426, to a point where no signal reaches amplifier 506, and operation of motor 486 therefore ceases.

Velocity generator 494 functions to furnish, and add to the signal reaching amplifier 506 from sliders 425 and 426, a second alternating voltage of the frequency of the source, which varies in amplitude in accordance with the speed with which motor 486 operates, and which reverses in phase when motor 486 reverses. The output of generator 494 is connected to oppose the voltage reaching the amplifier and causing operation of motor 486. Thus, if the telemetric system is approaching a condition of balance, and the inertia of motor 486 causes it to continue rotating rapidly when the signal to the amplifier is disappearing, the velocity generator voltage is larger than the signal voltage, thus electrodynamically opposing further rotation of the motor and quickly reducing its speed. By this means the circuit is given highly gratifying antihunt properties.

*Operation of the track bearing telemetric system*

The operation of this part of the invention is as follows. It is first determined from the chart of the flight that angle $C_n$ for a particular section is for example 250 degrees. Knob 100 of the horizontal row on Preset Panel 86 associated with this section of the flight is adjusted so that its indicator 95 reads 250.0. The initial adjustment of shaft 428 and sliders 425 and 426 is such that when indicator 100 reads zero the sliders are 90 degrees from zero: thus the setting of indicator 95 simultaneously sets sliders 425 and 426 to their 340.0 degree position. When the section of the flight corresponding to this setting of knob 100 is reached, switch arms 460, 461, 462, 463 and 464 complete the circuit including slider 425 and winding 427 as shown; voltage is supplied to taps 430, 431, 432 and 433 and amplifier 506 is connected to slider 425. If sliders 480 and 481 are not at the position 340.0 on winding 477, a voltage appears between sliders 425 and 426, and operation of motor 486 takes place to adjust sliders 480 and 481 to the correct angle. This operation is made approximately dead beat by velocity generator 494, and when it is complete the motor is deenergized and the system comes to rest with conductor 466 at ground potential.

Shaft 492 of motor 486 is connected, through reduction gearing 522, with input shaft 421 of differential 420. Thus as motor 486 operates to rebalance telemetric system 424 it also adjusts the positions of sliders 400 and 401 of resistor 395, to vary the voltage relation between the sliders and ground. Reduction gearing 485 has the same ratio as reduction gearing 522, so that the angle through which shaft 421 is rotated is the same as that through which shaft 482 is rotated.

From the foregoing discussion it should now be apparent that the vector network, in combination with the track bearing telemetric system, provides a pair of voltages determined by $d \cos(90° + C_n - B)$ and $d \sin$ $$(90° + C_n - B).$$

The first of these voltages is supplied to cross track channel 366 of the directional computer through conductor 422.

The offset circuit ($x_n$)

Cross track channel 366 includes, in normal straight-line flight of the craft, the $x_n$ circuit, the $x_t$ circuit, the $x_d$ circuit, and an antihunt circuit, in addition to the voltage supplied from the vector network. The first of these circuits is concerned with supplying a voltage manually adjustable throughout a range of values, to have an amplitude and phase angle determined by the actual value of $x_n$ in the territory being traversed.

The offset circuit 523 comprises a series electrical circuit including conductor 524, secondary winding 378 of transformer 373, conductor 525, and the winding 526 of a voltage divider 527 having a slider 528 and a center tap 529. Slider 528 is actuated by a shaft 530 carrying knob 101 and indicator 96, both mounted on Preset Panel 86'. Center tap 529 is connected by a conductor 531 to one of the fixed contacts 532 of a tap switch 533 having a switch arm 534. Slider 528 is connected by a conductor 537 to one of the fixed contacts 538 of a tap switch 539 having a switch arm 540.

When slider 528 is at the center of winding 526, fixed contacts 532 and 538 are at the same potential, and indicator 96 is set to read zero. As the slider is displaced in opposite directions from the center tap, voltages of opposite phase appear between the fixed contacts.

Switch arm 534 is connected to conductor 535 and switch arm 540 is connected to conductor 542. The switch arms are actuated by means 465 previously mentioned. Operation of this means selects one of a plurality of $x_n$ circuits like that described, and connects it between conductors 535 and 542 to supply a voltage in the cross track channel of the directional computer determined by the previously adjusted setting of knob 101 for the section of the course then in control of the computer.

Secondary winding 378 supplies 100 volts to the $x_n$ circuit. This means that on the scale of 1 mile per volt indicator 96 can vary by 50 miles in either direction about a central zero value.

The track selection circuit ($x_t$)

Cross track channel 366 also includes the $x_t$ circuit 543, which is a series electrical circuit including conductor 544, secondary winding 379 of transformer 373, conductor 545 and a resistor 546 having a center tap 547 and a plurality of intermediate taps 548 equally spaced on each side of the center tap. The taps are connected by conductors 549 to the fixed contacts 550 of a tap switch 552 having a switch arm 551 actuated by a shaft 553 carrying knob 106, which is manually adjustable with respect to a scale 554 carried by Pilot's Indicator Panel 87'. Electrical connection is made to switch arm 551 by conductor 555, and to center tap 547 by conductor 542. In practice subordinate taps 556 are provided on resistor 546 and are connected to contacts 556' on tap switch 552, but since they are not used except in an emergency only two such taps are shown in the drawing to avoid confusion: one of these subordinate contacts 556' is connected to center tap 547.

When knob 106 is at the center of scale 554, arm 551 makes contact with the fixed contact 556' connected to center tap 547, and conductors 542 and 555 are at the same potential. The output of secondary winding 379 is 70 volts: as knob 106 is turned to successive graduations on its scale, arm 551 moves from one tap 550 to the next, thus changing by 10 volt steps the voltage between conductors 542 and 555: on the scale of one volt per mile this corresponds to setting over the track to be followed in 10 mile steps. The total available range is 35 miles on either side of the center line, giving 8 parallel tracks to choose from. If flight in a given direction is permitted only on one side of the center line, this is of course reduced: if opposite directions of flight take place at different altitudes, this makes the full 8 tracks available. Each normal adjustment of switch 551 advances slider 552 from one contact 550 past a contact 556' and to the next contact 550.

A craft sometimes has engine trouble or for other reasons cannot complete its flight in the usual fashion. If such a craft remained on its usual track, the capacity of that track would be reduced, since no other craft could go faster than the distressed craft. The purpose of intermediate taps 556 is to enable the pilot to move over onto an "emergency" track, half way between the scheduled tracks, where his possibly erratic progress to a safe landing would not constitute either a hazard or a delay to other craft. Slider 551 is accordingly set on a contact 556' only during emergency operation.

The importance of this arrangement should be emphasized. Changes in selected track, to be made at the direction of the control tower at the airport of destination, must be provided for in any system of this nature, but critical adjustment of the resistance of resistor 546 which is in the circuit should not be the pilot's responsibility, because such adjustments made under the pressure of flight conditions could easily be inaccurate, and result in the craft following some intermediate track of unscheduled offset. A tap switch, on the other hand, is provided with detent means for causing it to always take the same position, and exact location of any selected one of the spaced tracks is much more surely accomplished in this fashion.

The off-track distance circuit ($x_d$)

Cross track channel 366 further includes the $x_d$ circuit 557 which is a series circuit including conductor 558, secondary winding 380 of transformer 373, conductor 560, and the winding 561 of a voltage divider 562 having a center tap 563 and a slider 564. A phase reversing device 565 is inserted in conductors 558 and 560 for a purpose later to be described: this can be in the form of a simple reversing switch having a normal position from which it can be energized into a "reverse" position upon suitable energization of its control terminals 566 and 567, the latter being grounded as at 568.

Slider 564 and center tap 563 are at the same potential when the slider is at the center of winding 561. For other positions the amplitude of the voltage between the slider and the center tap varies with the amount of displacement of slider 564 from center, and the phase of the voltage reverses as the slider passes from one side of the center to the other. Center tap 563 is connected to conductor 555. Slider 564 is actuated by a shaft 570 which is driven through a slip clutch 571, Figure 15$b$, and reduction gearing 572 from a motor 573 whose operation is controlled by an amplifier 574 having input terminals 605 and 607, output terminals 582 and 583, and power terminals 602 and 603.

The off-track distance drive

Motor 573 is shown to comprise a shaft 588 carrying a rotor 575, and a pair of windings 576 and 577. Winding 576 is continuously energized from source 155 through bus 369, quadrature capacitor 580, and ground connections 581 and 371. Winding 577 is energized from the output terminals 582 and 583 of amplifier 574 through conductors 584 and 585, the former being grounded at 581. A capacitor 586 is connected across winding 577 to improve its power factor.

Shaft 588 also carries the rotor 587 of a velocity generator 590 having a primary winding 591 and secondary winding 592. Primary winding 591 is energized from source 155 through bus 369, phasing capacitor 593 and ground connections 581 and 371. Secondary winding 592 is connected by conductors 588' and 589 to the primary winding 593' of a transformer 594, whose secondary winding 595 energizes the winding 596 of a potential divider 597, having a slider 601, through conductors 598 and 599.

Power terminals 602 and 603 of amplifier 574 are energized from source 155 through bus 369 and ground connection 604 and 371. Input terminal 605 of amplifier 574 is grounded as at 606. Input terminal 607 of amplifier 574 is connected to slider 601 of voltage divider 597 by conductors 610 and 611. One terminal of winding 596 of the voltage divider is connected to slider 564 of the $x_d$ circuit by conductor 612.

The orbiting relay

Switch arm 534 in the $x_n$ (Figure 15a) circuit is connected by conductors 535 and 541, normally connected together by means presently to be described, to the movable contact 613 of a relay 614 having a winding 615 which actuates an armature 616 to move contact 613 between a pair of fixed contacts 617 and 620: in its de-energized condition the relay completes the circuit between contacts 613 and 617, which latter is connected to slider 400 by conductor 422. Relay 614 is energized from source 155 through bus 369, switch 118, and ground connections 623 and 371, and at the same time an indicating or pilot light 622 is also energized. When the relay is energized by closing switch 118, the normal circuit including slider 400 is interrupted, and instead connection is made between arm 613 and fixed contact 620, which is connected by conductor 624 to the blade 625 of a switch 626 having fixed contacts 627 and 628, connected to the opposite ends of winding 395 by conductors 621 and 630 respectively. Thus the full voltage between conductor 402 or conductor 403 and ground connection 398 appears at contact 620 of relay 614, rather than a voltage determined by the position of slider 400. Switch 626 is operated in opposite directions by shaft 530 as knob 101 is turned in opposite directions from its center position.

By the foregoing arrangement closing of switch 118 results in operation of relay 614 to cut off from the cross track channel 366 of Directional Computer 78 any effect of shaft 37 as it influences slider 400, and to supply in that channel a voltage determined in magnitude by the magnitude of the distance voltage and in phase by the position of switch 626: the phasing is such that the voltage in question is of the opposite phase to that from the $x_n$ circuit 523.

The amplifier input circuit for off-track distance

The normal input circuit for amplifier 574 may now be traced, assuming that the various adjustments are in positions shown in Figures 15a and 15b. From the input terminal 607 the circuit proceeds through conductors 610 and 611, slider 601, the portion of winding 596 below the slider, conductor 612, slider 564, the portion of winding 561 between the slider 564 and center tap 563, the center tap 563, conductor 555, switch arm 551, fixed contact 550, conductor 549, tap 548, the portion of winding 546 between tap 548 and center tap 547, the center tap, conductor 542, switch arm 540, fixed contact 538, conductor 537, slider 528, the portion of winding 526 between slider 528 and center tap 529, the center tap, conductor 531, fixed contact 532, switch arm 534, conductors 535 and 541, arm 613, fixed contact 617, conductor 422, slider 400, the portion of winding 396 between the slider and center tap 397, the center tap, and ground connections 398 and 606 to input terminal 605 of the amplifier.

In this input circuit there are in series five different alternating voltages. Since they are derived from secondary windings having a common primary and since they include no reactive impedances, these voltages are all either in phase or in 180 degree phase relation. The voltages may be referred to for reference as (398—400), (529—528), (551—547), (564—563) and (612—601), the order being negative to positive polarity, at a particular instant. In each case the sense of graduations associated with the respective manual or automatic inputs is in agreement with the electrical polarities defined above. In order for the voltage impressed on the amplifier to be zero, the sum of these voltages must be zero. Voltage (612—601), the velocity generator output, is zero when motor 573 is stationary, and then voltage (563—564) must be equal to the sum of voltages (398—400), (529—528), and (551—547). Expressed as an equation for the balance condition, the relation is $$+(398-400)+(529-528)-(551-547)-(564-563)=0$$

or $$+d \cos (90°+C_n-B)+x_n-x_t-x_d=0$$

which is Equation 1 rearranged. Under this balance condition the voltage (564—563) represents, on a scale of 1 volt per mile, the off-track distance $x_d$. Since winding 561 of voltage divider 562 is linear, the rotation of its actuating shaft 570 also directly represents this distance.

Operation of the cross track channel of the directional computer

In using the Directional Computer switch 370" is closed upwardly energizing transformer 373, motors 486 and 573, and velocity generators 494 and 590, as well as amplifiers 506 and 574. Suppose the instantaneous distance d to be 65.13 miles, and the bearing B to be 30.0 degrees. Suppose further that the track angle $C_n$ is 329.4 degrees, $x_t$ is +15 miles and $x_n$ is —40.60 miles as indicated for the first section in Figure 8. Shaft 36 sets slider 394 so that the voltage between it and conductor 402 is 130.26 volts, slider 394 being instantaneously negative. Shaft 37 rotates to an angle of 30.0 degrees, and shaft 421 rotates, under the influence of knob 95 and telemetric system 424, to 329.4 plus 90 degrees, or 59.4 degrees. As a result, shaft 410 rotates to 29.4 degrees. The ratio of the resistance between ground connection 398 and slider 400 to the resistance between ground connection 398 and conductor 402 is equal to cos 29.4° or 0.871, and the voltage between slider 400 and ground connection 398 is 56.74 volts, slider 400 being instantaneously positive. The voltage between center tap 529, instantaneously negative, and slider 528 is 40.60 volts through manual setting by knob 101 read on counter 96. The voltage between center tap 547 and tap 550, the latter instantaneously negative, is 15.0 volts through manual setting of knob 106 read on scale 554. Assuming motor 573 to be held stationary, with slider 564 at center tap 563, the voltage at the input of amplifier 574 is 56.74—40.60—15.0, or plus 1.14 volts, with terminal 607 positive: the craft is accordingly 1.14 miles to the right of its course. Operation of motor 573 follows, moving slider 564 downward as shown until it is 1.14 volts negative with respect to center tap 563. The voltages then add up to zero, no input is supplied to amplifier 574, and operation of motor 573 ceases. At the same time, the heading of the craft may be changed, by means presently to be described, to cause it to turn toward the desired path.

Whenever motor 573 runs, velocity generator 590 supplies to winding 596 a voltage of a phase to oppose that which is applied to the amplifier to cause the motor rotation. This gives the overall circuit antihunt properties, since if the motor goes too fast the velocity generator voltage opposes the signal and causes the motor to slow down again.

Indication of off-track distance

The structure thus far described in connection with Figure 15 is capable of functioning to operate slider 564 so that its position is a measure of the craft's departure from the desired path, but no means have been disclosed for performing any useful function whether of indication or of control. An indicating arrangement forms a part of the invention, and takes the form of a telemetric system, since for convenience motor 573 is located in Navigating Computer 85', while the indication is desired at the Pilot's Indicator Panel 87'.

To this end, shaft 570 driven by motor 573 is also connected to the transmitter 631 of a telemetric system 632 which is shown in Figure 15b to be of the type known as a Selsyn system, although a system of the resistance type like system 424, or of any other selected type, may be used. Transmitter 631 is energized from source 155 through bus 369 and ground connections 633 and 371, and is connected with a receiver 634 by a suitable multi-conductor cable 635. Receiver 634 is energized from source 155 through bus 369 and ground connections 636 and 371, and has a shaft 637 which operates the pointer of indicator 103. By this means the rotation of shaft 570 is repeated at the Pilot's Indicator Panel, to give an indication of the amount of departure of the craft from the desired course.

Control in accordance with off-track distance

Telemetric systems such as 632 are useful for transmission of information in the form of indications where power demand is slight, but are not satisfactory where appreciable power is demanded, or where, as in the present case, a unidirectional control voltage is desirable. A control network supplying a unidirectional voltage which reverses in polarity and varies in magnitude with reversal in the direction and variation in the amount of the craft's deviation from its scheduled track comprises a further portion of this invention.

Shaft 570 driven by motor 573 is further extended to operate the slider 640 of a voltage divider 641 having a winding 642 with a center tap 643. Winding 642 is energized from secondary winding 381 of transformer 373 through conductors 644 and 645. Center tap 643 and slider 640 of voltage divider 641 are connected by conductors 651 and 652 respectively to the input terminals 646 and 647 of a phase sensitive demodulator bridge 650 of known construction; having a pair of output terminals 653 and 654, and a pair of power terminals 655 and 656. Bridge 650 comprises a plurality of rectifiers 657, 660, 661 and 662, and first and second pairs of equal resistors, 663 and 664, and 665 and 666. Power terminals 655 and 656 are energized from secondary winding 382 of transformer 373 through conductors 667 and 670. The voltage available at power terminals 655 and 656 must always be greater than that supplied at input terminals 646 and 647.

As is well known to those skilled in the art, the voltage applied to power terminals 655 and 656 is effective to block certain of the rectifiers in each half cycle of the source, so that there appears at terminals 653 and 654 a pulsating unidirectional voltage of which the magnitude varies with the amplitude of the input voltage and the polarity reverses with the phase of the input voltage. The output voltage is applied to a voltage divider made up of resistors 671 and 672, and a portion thereof is thence connected by conductors 673 and 674 to two adjacent fixed contacts 683 and 684 of a double pole double throw switch 685, having two further adjacent fixed contacts 686 and 687 and two switching contacts 690 and 691, the latter being connected by conductors 692 and 693 to the input of azimuth coupling unit 33.

Slider 640 is adjusted so as to be at its center position when slider 564 (of Figure 15a) is at its center position, so that no voltage is applied to bridge 650 when the craft is on its proper course. If the craft departs from its course in either direction, switch 685 being thrown to the left, as shown in Figure 15b, a voltage of either of two opposite phases is impressed by slider 640 upon bridge 650 and appears at the output of the bridge as a pulsating unidirectional voltage having either of two opposite polarities. The amplitude of the alternating voltage, and therefore the average magnitude of the unidirectional voltage, depends upon the amount of departure of the craft from the desired path.

The vector network in the along track channel

The principal components of the cross track channel 366, as used in normal flight, having been discussed, attention will now be directed to the along track channel 367. This channel functions to solve Equation 2 as pointed out above, and has three subordinate circuits supplying voltages which are added in series to give the relation of Equation 2. As previously pointed out, the vector network, in combination with the track bearing telemetric system, provides voltage not only for cross track channel 366 but for along track channel 367, the latter voltage being determined by $d \sin (90° + C_n - B)$, and appearing between conductor $\overline{423}$ and ground connector 398.

The onset circuit ($y_n$)

The first subordinate circuit in along track channel 367 is the $y_n$ circuit 694 (Figure 15a), which is concerned with supplying a voltage manually adjustable throughout a range of values to have an amplitude and phase angle determined by the actual value and sense of $y_n$ in the territory being traversed.

The $y_n$ circuit comprises a series electrical circuit including conductor 695, secondary winding 384 of transformer 373, conductor 696, and the winding 701 of a voltage divider 697 having a slider 700 and a center tap 702. Slider 700 is actuated by a shaft 703 carrying knob 102 and indicator 97, both mounted on Preselector Panel 86'. Center tap 702 is connected by conductor 704 to one of the fixed contacts 705 of a tap switch 706 having a switch arm 707. Slider 700 is connected by conductor 710 to one of the fixed contact points 711 of a tap switch 712 having a movable contact arm 713.

When slider 700 is at center tap 702, fixed contacts 705 and 711 are at the same potential and indicator 97 reads zero. As the slider is increasingly displaced in opposite directions from the center tap, the voltage between fixed contact 705 and 711 increases in opposite phases. The output voltage of secondary winding 384 is 200 volts: this means that $y_n$ can have values within a range of plus or minus 100 miles.

Switch arm 707 is connected to slider 401 of the vector network by conductor 423, and switch arm 713 is connected to a conductor 715. Tap switches 706 and 712 are actuated by shaft 465: operation of this shaft selects one of a plurality of circuits similar to that just described and connects it between switch arms 707 and 713 to supply in sequence various voltages preselected by prior adjustment of knobs 102.

The actual distance to destination circuit ($y_D$)

The second subordinate circuit in the along track channel of Directional Computer 78 is the $y_p$ circuit 716, which is concerned with supplying a voltage which varies in phase and amplitude with the magnitude of $y_p$, the distance between the present location of the craft and its destination. To this end $y_p$ circuit 716 comprises a series electrical circuit including conductor 717, secondary winding 383 of transformer 373, conductor 718, and the winding 720 of a voltage divider 721 having a slider 722 and a tap 723. Tap 723 and slider 722 are at the same potential when the slider is in contact with the tap. For other positions the amplitude of the voltage difference between the slider and the tap varies with the amount of displacement of slider 722 from tap 723, and the phase of the voltage reverses as the slider passes from one side of the tap to the other. The output voltage of secondary winding 383 is 200 volts, so that on a scale of 1 volt per mile $y_p$, the distance from the destination to the craft. may have any value between $-150$ miles and $+50$ miles.

Tap 723 is connected to conductor 715. Slider 722 is actuated by a shaft 731, which is driven through a slip clutch 732, Figure 15b, and a gear reduction 733 from a motor 734 whose operation is controlled by an amplifier 735 having input terminals 773 and 775, output terminals 744 and 745, and power terminals 770 and 771.

The actual distance to destination drive

Motor 734 is shown to comprise a shaft 736 carrying a rotor 737, and a pair of windings 740 and 741. Winding 740 is continuously energized from source 155 through bus 369, quadrature capacitor 742 and ground connections 743 and 371. Winding 741 is energized from the output terminals 744 and 745 of amplifier 735 through conductors 746 and 747. the former being grounded as at 743. A capacitor 750 is connected across winding 741 to improve its power factor.

Shaft 736 also carries the rotor 751 of a velocity generator 752 having a primary winding 753 and a secondary winding 754. Primary winding 753 is energized from source 155 through bus 369, phasing capacitor 755, and ground connections 743 and 371. Secondary winding 754 is connected by conductors 756 and 757 to the primary winding 760 of a transformer 761 whose secondary winding 762 is connected by conductors 766 and 767 to the winding 763 of a voltage divider 764 having a slider 765. Amplifier 735 is energized at power terminals 770 and 771 from source 155, through bus 369 and ground connections 772 and 371. Input terminal 773 of amplifier 735 is grounded as at 774. Input terminal 775 is connected to slider 765 of voltage divider 764 by conductors 776 and 777. One terminal of winding 763 of the voltage divider is connected to slider 722 (Figure 15a) by conductor 780.

The amplifier input circuit for actual distance to destination

The input circuit for amplifier 735 may now be traced, assuming that the various adjustments are in positions shown in Figure 15. From the input terminal 775 the circuit may be traced through conductors 776 and 777, slider 765, the portion of winding 763 below the slider, conductor 780, slider 722, the portion of winding 720 between slider 722 and tap 723, the tap, conductor 715, switch arm 713, fixed contact 711, conductor 710, slider 700, the portion of winding 701 between slider 700 and center tap 702, the center tap, conductor 704, fixed contact 705, switch arm 707, conductor 423, slider 401, the portion of winding 399 between the slider and center tap 397, the center tap, and ground connections 398 and 774 to input terminal 773 of the amplifier.

In this input circuit there are in series four different alternating voltages. Since they are derived from secondary windings having a common primary winding, and since they include no reactive impedances, these voltages are all either in phase or 180° out of phase. The voltages may be referred to for reference as (401—398), (700—702), (723—722), and (780—765), the order being negative to positive polarity at a particular instant. In each case the sense of graduations associated with the respective manual or automatic inputs is in agreement with the electrical polarities defined above. In order for the voltage impressed on the amplifier to be zero, the sum of these voltages must be zero. Voltage (780—765), the velocity generator output, is zero when motor 734 is stationary, and then voltage (723—722) must equal the sum of voltages (401—398) and (700—702). Expressed as an equation for the balance condition, the relation is $$(401-398)+(700-702)-(723-722)=0$$

or $$d \sin (90°+C_n-B)+y_n-y_p=0$$

which is Equation 2 rearranged. Under this balance condition the voltage (723—722) represents, on a scale of 1 volt per mile, the actual distance to destination $y_p$. Since winding 720 of voltage divider 721 is linear, the rotation of its actuating shaft 731 also directly represents this distance.

Operation of the along track channel of the directional computer

In using the Directional Computer switch 370 is closed upwardly, energizing transformer 373, motors 486 and 734, and velocity generators 494 and 752. Suppose the instantaneous distance $d$ to be 65.13 miles, and the bearing B to be 30.0 degrees. Suppose further that the track angle $C_n$ is 329.4 degrees, and $y_1$ is 44.8 miles as indicated for the first section in Figure 8. Shaft 36 sets slider 394 so that the voltage between it and conductor 402 is 130.26 volts, slider 394 being instantaneously negative. Shaft 37 rotates to an angle at 30.0 degrees, and shaft 421 rotates under the influence of knob 95 and telemetric system 424 to 329.4 plus 90 or 59.4 degrees. As a result, shaft 410 rotates to 29.4°. The ratio of the resistance between ground connection 398 and slider 401 to the resistance between ground connection 398 and conductor 403 is equal to sin 29.4 degrees or .491 and the voltage between slider 401 and ground connection 398 is 31.97 volts, slider 401 being instantaneously negative. The voltage between center tap 702 and tap 700, the latter instantaneously negative, is 44.8 volts through manual setting by knob 102 read on counter 97. Assuming motor 734 to be held stationary, and slider 722 to be at tap 723, the voltage at the input to amplifier 735 is $-44.80+31.97$ or $-12.83$ volts, with terminal 775 positive. The craft accordingly has 12.83 miles to travel before reaching its destination $D_1$. Operation of motor 734 follows, moving slider 722 downward as shown until it is 12.83 volts positive with respect to tap 723. The voltages then add up to zero, no input is supplied to amplifier 735, and operation of motor 734 ceases.

Whenever motor 734 runs, velocity generator 752 supplies to winding 763 a voltage of a phase to oppose that which is applied to the amplifier to cause the motor rotation. This gives the overall circuit antihunt properties, since if the motor goes too fast the velocity voltage generator opposes the signal and causes the motor to slow down again.

Indication of actual distance to destination

The structure thus far described in connection with Figure 15 is capable of functioning to operate slider 722 so that its position is a measure of the craft's displacement from its destination, but no means has been described for performing any useful function either of indication or control. An indicating arrangement forms a part of the invention, and takes the form of a telemetric system, since for convenience the motor 734 is located in Navigating Computer 85', while the indication is desired at Pilot's Indicator Panel 87'.

To this end shaft 731 driven by motor 734 is also connected to the transmitter 781 (Figure 15a) of a telemetric system 782 which is shown to be of the type known as a Selsyn system, although a system of the resistance type like system 424, or of any other selected type, may be used. Transmitter 781 is energized from source 155 through bus 369 and ground connections 783, and 371 and is connected with a receiver 784 by a multiconductor cable 785. Receiver 784 is energized from source 155 through bus 369 and ground connections 786 and 371, and has a shaft 787 which operates the pointer of the indicator 104. By this means the rotation of shaft 731 is repeated at the Pilot's Indicator Panel 87' to give an indication of the amount of departure of the craft from its destination.

*Section selection indication*

One terminal of secondary winding 385 is grounded as at 790. The other terminal is connected by a conductor 791 to one terminal of each of a plurality of signal lamps 90. Each of these lamps is connected at its other terminal, as by conductors 792, to one of the fixed contacts 793 of a tap switch 794 whose switch arm 795 is grounded as at 796, and is driven by means 465 together with the contact arms of other switches previously discussed.

By means of this arrangement the proper signal lamp indicating which of the various horizontal rows of controls is actually in charge of the flight of the craft may be illuminated.

*The automatic advance switch*

It has been pointed out that switches 453, 454, 455, 456, 457, 533, 536, 539, 706, 712 and 794 are operated by a mechanical actuating member or shaft 465, to select the appropriate voltages representing those quantities which change from section to section of the flight, but which remain constant while any particular section is being traversed. Member 465 is operated by an actuator 800, best shown in Figure 19, to which reference should now be made.

Actuator 800 is shown to include a first ratchet motor 801 comprising a solenoid winding 802 having an armature 803 formed at its end portion in a pawl 804 and normally maintained in inoperative position by a spring 805, and a second ratchet motor 806 comprising a solenoid winding 807 having an armature 808 formed at its end portion in a pawl 809 and normally maintained in inoperative position by a spring 810. Windings 802 and 807 are grounded as at 811 and 812, respectively, and their ungrounded ends are connected respectively to fixed contacts 815 and 816 of an alternating current relay 817 having a movable contact 820 actuated by an armature 821 upon energization of a winding 822. Winding 822 is energized from source 155 through ground connections 823 and 371, and through bus 369 and conductor 824, when a switch 825 is closed.

The movable contact 820 is connected to bus 369 through a conductor 826 which includes the switching contacts of a slow acting relay 826', whose energization is controlled by manual switch 111 and contacts 113, 112 and 112' through a circuit including a pole changer 808' and a further stepping switch 809' having a switch arm 818 and a plurality of contacts indicated by reference numerals 819 and 820'. Pole changer 808' may conveniently be like reversing switch 565 for example, and functions when deenergized to connect fixed contacts 112 and 112' to conductors 838 and 839 respectively: when energized the interconnection is reversed. Energization of pole changer 808' occurs through conductor 824 when reversing switch 825 is closed.

Switch 111 is shown as a single pole double throw switch normally making contact in the downward direction as seen in Figure 19. The switching contact of this switch is connected to conductor 369, the lower fixed contact to switch arm 818, and the upper fixed contact to movable contact 113 and to the operating winding of time delay relay 826', the other end of which is grounded.

In the normal condition of switch 111 and pole changer 808 a circuit is completed from bus 369 to energize slow acting relay 826' whenever contacts 113 and 112 engage. This circuit can be traced from bus 369 to the movable contact and the lower fixed contact of switch 111, switch arm 818 and one of fixed contacts 819 of switch 809, conductor 838, pole changer 808', fixed contact 112, and movable contact 113 to relay 826'. Under these conditions contact 112' is not energized and engagement with movable contact 113 can have no result.

As discussed above, relay 826' does not move into actuated position immediately when it is energized. If the energization continues for a sufficiently long interval, however, relay 826' completes a circuit from bus 369 to movable contact 820 of relay 817, and one of the solenoid windings of actuator 800 is accordingly energized.

Shaft 465 carries a first ratchet wheel 827, arranged to cooperate with pawl 804 for causing stepwise rotation of the shaft in a first direction, and a second ratchet wheel 828, arranged to cooperate with pawl 809 for causing stepwise rotation of the shaft in the opposite direction. The direction in which shaft 465 rotates depends on which of the solenoids is energized through relay 826', which in turn depends on whether relay 817 is in its deenergized position, as shown, or in its energized position. Each time one of the actuator solenoids is energized the amount of forward or reverse rotation of shaft 465 resulting is that required to advance the respective switch arms from one set of contacts to an adjacent set. Detent means not shown may be provided for positively determining the position of the switch arms after any operation of the solenoids.

To avoid needless complication of the drawing only switches 536, 794, and 809' are shown in detail in Figure 19. The remaining switches are represented by arrows, each bearing a reference numeral identifying it with the function it performs in the computer. Six additional switches are identified by reference numerals 831, 832, 833, 834, 835, and 836. These two sets of switches perform the function of controlling the tuning of the Distance Measuring Equipment interrogator and the Omnidirectional Range receiver, as previously described.

*The course change circuit*

As pointed out in connection with Figure 11, it is necessary, when a change in course is made to orbit about an auxiliary Distance Measuring Equipment ground station while also observing distance from a principal Distance Measuring Equipment ground station. This function is accomplished by a course change circuit 837 shown in the upper left hand portion of Figure 15a to comprise a series electrical circuit including conductor 840, secondary winding 377 of transformer 373, conductor 841, and the winding 842 of a voltage divider 843 having a slider 844. Slider 844 is actuated by a shaft 119, to give an output voltage determined by $d_0$, the distance of the craft from the orbiting station, through an auxiliary interrogator and Distance Converter. One end of winding 842 of voltage divider 843 is grounded as at 845: the other end is connected by a conductor 846 to one fixed contact 847 of a tap switch 536 whose switch arm 851 is connected to conductor 535 and is operated by actuating means 465. For a course with only one change in heading all the remaining fixed contacts 850 of switch 536 are connected to conductor 541. If the course has two turns the proper two contacts 847 are connected to conductor 846, and the remaining fixed contacts 850 are connected to conductor 541 and so on.

Whenever switch arm 851 engages a fixed contact connected to conductor 541, the cross track channel of the computer functions normally as indicated above. When switch arm 851 engages a fixed contact connected to conductor 846, all effect of the $\bar{d}$ and $B$ inputs from the principal station, through vector network 387, is cut off: under these conditions the cross track channel comprises the voltages determined by $d_0$, $x_0$, $x_t$, $\overline{x_d}$, and the velocity generator output. None of these voltages is affected by the bearing of the craft from the control station, so the control output $x_d$ from cross track channel 366, appearing at conductors 692 and 693 of Figure 15$b$, is determined by the relation between $x_0-x_t$ and $\underline{d_0}$.

Operation of the course change circuit

Suppose the craft to be at point $D_2$ in Figure 10, when switch contact 113 engages contact 112, thus actuating member 465. The switch arms of the tap switches are all advanced, a new principal station being tuned in for control of the $d$ and $B$ shafts 36 and 37, new $x_n$, $y_n$, and $C_n$ values being fed into the computer, and the appropriate pilot light 99 being energized. It should be remembered that during the course change period, $x_n$ is $x_0$, the offset of the orbiting station $S_0$, while $y_n$ and $C_n$ are $y_3$ and $C_3$ respectively. At the same time switch arm 851 is advanced to engage fixed contact 847, thus interrupting the connection making the cross track channel a part of the vector network, and substituting the voltage $\overline{d_0}$ between slider 841 of the course change circuit and ground 845. Simultaneously switch arm 818 is advanced to engage fixed contact 829, thus interrupting the circuit energizing fixed contact 112 of indicator 104 and instead energizing fixed contact 112'.

Since the craft is on the proper course, the conditions satisfy Equation 5:

$$\underline{d_0} + x_0 - x_t - x_d = 0$$

For any other conditions the left hand portion of the equation has some positive or negative value, and motor 573 is energized as described before, to adjust $x_d$ until the input to the amplifier is zero, at the same time altering the heading of the craft. A circular orbit about $S_0$ is thus followed.

Although Equation 5 is satisfied and $x_d$ is zero when the stepping switch operates, $y_d$ is not zero, and the along track channel of the computer operates to balance the channel, until a value of $y_p=y_c$ appears on indicator 104. This is more than the normal length of a section of the flight, and pointer 114 moves past contact 112': the interval of engagement therebetween is not sufficient to cause operation of relay 826' although contact 112' is energized through switch 111, switch arm 818 and fixed contact 829, and pole changer 868'. However, as the flight continues the distance $y_p$ decreases, approaching the standard 100 miles. When this value of $y_p$ is reached, contacts 113 and 112' remain in engagement long enough to actuate relay 826', actuator 800 advances the stepping switches, and the conditions for straight line flight are reestablished. No change in the setting of $y_n$ takes place here, and energization of fixed contact 112 replaces energization of fixed contact 112', by operation of stepping switch 809, so that automatic advance at the end of the straight line section now being flown with respect to station $S_3$, may take place as previously described.

In brief review, the structure discussed thus far in connection with Figure 15 functions to provide remote indication of the distance of a craft from a predetermined destination and of the distance by which the craft is displaced from a selected course, and to provide an output voltage usable to cause the craft to return to the course. The arrangement is also capable of causing the craft to follow a circular path for changing the direction of the course, and of causing continued orbiting of the craft about a selected point at a desired radius from it. Means for automatically transferring control of the craft from one ground station to the next are also described.

Function of the scheduling computer

As has been pointed out previously, the Scheduling Computer 79 performs a single function, based on a mechanical input from the along track channel 367 of the Directional Computer. This function is to solve Equation 3, to derive a component representative of $y_d$, a component representative of $y_p$ being supplied by the along track channel of Directional Computer 78, and a component representative of $y_t$ being automatically derived, according to Equation 4, from manual settings of $y_g$ and V.

The Scheduling Computer 79 is energized by power bus 369' from source 155 through switch 370" and main fuse 368 when the switch is closed downwardly as seen in Figure 15$a$: the Directional Computer is also energized in this position of the switch. Closing of switch 370" downwardly energizes the primary winding 861 of a transformer 862 (Figure 16) through bus 369' and ground connections 863 and 371. Maintained electrostatically independent of winding 861 by a grounded shield 864 are a plurality of secondary windings, which are located at various positions in Figure 16 for simplicity of illustration. In order to make clear the interrelation between these windings, primary winding 861 is shown as broken away, and each secondary winding is shown as associated with a core and a portion 861' of winding 861. The secondary windings are indicated by reference numerals 865, 866, 867, 870, 871, 872 and 873, in the order in which they appear going counterclockwise around Figure 16.

Winding 865 provides voltage for a velocity circuit 874. Windings 866, 867 and 870 respectively provide voltages for $y_t$, $y_p$ and $y_d$ circuits 875, 876 and 877: winding 870 is provided with center tape 882. Windings 871 and 872 provide voltages for the indicating circuit 883 of the Scheduling Computer, and winding 873 provides voltage for the control circuit 884 of the Scheduling Computer.

The velocity circuit

The velocity circuit 874 functions to supply a voltage determined in amplitude in accordance with the along track velocity or ground speed which is called for by the craft's schedule. Circuit 874 comprises a series electrical circuit including conductor 885, secondary winding 865 of transformer 862, conductor 886, a dropping resistor 887, and the winding 889 of a voltage divider 890 having a slider 891. Slider 891 is actuated by shaft 892 in accordance with the setting of knob 107 relative to a scale on Pilot's Indicator Panel 87'. A phase reversing device 893 is inserted in conductors 885 and 886 for a purpose later to be described: this device can be in the form of a simple reversing switch having a "normal" position from which it can be actuated into its "reverse" position upon suitable energization of its control terminals 894 and 895, the latter of which is grounded as at 898. Slider 891 is manually adjusted from a position at the end of winding 889 connected to resistor 887, when V equals 100 miles per hour, to a position at the end of winding 889 connected to conductor 885, when V increases to 400 miles per hour. The output voltage of winding 865 is 40 volts, and the resistances of winding 889 and resistor 887 are 3,000 ohms and 1,000 ohms respectively; therefore, each change of 1 mile per hour in the setting of knob 106 causes the change of 10 millivolts in the potential of slider 891 compared to conductor 886, until a minimum value is reached. This "velocity" voltage may vary from a maximum of 4 volts to a minimum of 1 volt, over the available range of motion of slider 891 along winding 889.

The velocity integrator

The velocity voltage is made use of in solving the equation $y_p = \int V_d t$. To this end it is included in the input circuit of an amplifier 896 which controls the operation of a motor 897. Amplifier 897 has a pair of power terminals 900 and 901, energized from source 155 through bus 369' and ground connections 902 and 371, a pair of input terminals 903 and 904, and a pair of output terminals 905 and 906, the latter grounded as at 907. The nature of amplifier 896 is such that any alternating voltage impressed when input terminals 903 and 904 appears at the output terminals without phase angle distortion but with greatly increased amplitude, and this voltage is supplied to motor 897.

Motor 897 includes a shaft 910 carrying a rotor 911 for rotation with respect to an amplifier phase winding 912 and a line phase winding 913, the latter being energized from source 155 through bus 369', quadrature capacitor 914, and ground connections 907 and 371. Amplifier phase winding 912 is energized from the output terminals 905 and 906 of amplifier 896 through conductors 915 and 916, the former being grounded at 907. A condenser 918 is connected across winding 912 to improve its power factor. Motor 897 includes a velocity generator 917 whose output is combined in the amplifier input circuit with the voltage from velocity circuit 874 so that the speed of the motor is closely regulated according to the setting of knob 107. Velocity generator 917 includes a rotor 920 carried on shaft 910 for rotation with respect to a secondary winding 921 and a primary winding 922 energized from source 155 through bus 369', phasing capacitor 923, and ground connections 924 and 371. The output of secondary winding 921 is connected, in series with the voltage from velocity circuit 874, to input terminals 903 and 904 of amplifier 896 by conductors 925, 926 and 927. Shaft 910 is also connected to the input of reduction gearing indicated at 930.

The output voltage characteristic of velocity generator 917 is substantially linear with respect to its speed of rotation. Hence if knob 107 is set, for example, at 200 miles per hour, where slider 891 has a potential of 2.0 volts, and if the generator is driven at a speed of 5,000 R. P. M. where its output voltage is 2.0 volts, the input to the amplifier is zero. Motor 897 is then deenergized, and begins to slow down. As soon as this happens, the voltage of velocity generator 917 becomes smaller than the voltage from velocity circuit 874, and when this difference becomes greater than the voltage sensitivity of the amplifier which may perhaps be 10 mv. for full torque, the motor is fully energized and the speed increases again. If the acceleration is such that the speed temporarily exceeds 5,000 R. P. M., the velocity generator voltage exceeds the velocity circuit voltage, and the motor is electrodynamically decelerated.

The speed of motor 897 is thus regulated in accordance with V, the setting of knob 107. If the motor is started at the same time the flight is started, the rotated position of its shaft for any small interval $dt$ has a value proportional to $Vdt$, and for the whole flight its value is $\int Vdt$, or $Vt$, which is of course proportional to the distance traveled.

The schedule distance to destination circuit ($y_t$)

The velocity circuit and the velocity integrator therefore coact to provide rotation of shaft 910 proportional to the distance which should have actually been travelled. This proportionality is converted to an identity on the scale of 1 volt per mile by a suitable distance circuit 875, which comprises a series circuit including conductor 931, secondary winding 866, conductor 932, and the winding 933 of a linear voltage divider 934 having a slider 935 and a tap 936 grounded as at 937. Tap 936 is conveniently located at one quarter of the resistance of winding 933 from conductor 932, so that voltages representing values of $y_t$ between —150 miles and +50 miles can be furnished.

Slider 935 is actuated by a shaft 940, which is driven by shaft 910 of motor 897 through a friction clutch 941 and reduction gearing 930. The voltage across secondary winding 866 is 200 volts, the scale equivalent of 200 miles, and reduction gearing 930 has such a ratio that when shaft 910 is rotating at 5,000 R. P. M. corresponding to $V=200$ M. P. H., slider 935 moves at a speed that will carry it from one end to the other of winding 933 in one hour.

Knob 75 is also connected to shaft 940, and is manually adjustable with respect to a scale 942. By rotation of knob 75 the friction of clutch 941 is overcome and slider 935 can be independently adjusted. In use, this knob is set to $y_g$, so that slider 935 is not at tap 936 at the beginning of operation of motor 897, but for example, at a point 100 volts, or 100 miles from it. The direction in which motor 897 normally drives shaft 940 is such as to reduce this voltage as the motor operates, so that the voltage at any time during a flight is that originally set less the change caused by motor operation. The schedule distance to destination circuit, the velocity circuit, and the velocity integrator therefore combine with the setting of knob 75 to produce a voltage between slider 935 and ground which is equal, on the scale of one volt per mile, to the along track component of distance to the destination at any time. This voltage is applied through conductor 943, summing resistor 944, and conductor 945 to a summation terminal 946, which is connected to ground at 1019 through load resistor 1018.

The actual distance to destination circuit

It is desired to compare the voltage just described with a voltage corresponding to the actual along track distance of the craft from its destination. This voltage is supplied by actual distance circuit 876, which is shown to comprise a series electrical circuit including conductor 947, secondary winding 867 of transformer 862, conductor 950, and the winding 951 of a voltage divider 952, having a tap 953 and a slider 954. Tap 953 of voltage divider 952 is grounded as at 960. Slider 954 is connected to summation terminal 946 by conductor 955, summing resistor 956, and conductor 957.

Slider 954 is actuated by a continuation of shaft 731, which has been described as driven by the motor 734 (Figure 15a) of the along track channel of the Directional Computer so that its rotated position is a measure of $y_p$. The output voltage of secondary winding 867 is 200 volts, so that the voltage between slider 954 and ground may vary through a range from 150 volts of one phase to 50 volts of the opposite phase. The distance $y_p$ from the destination to the craft can accordingly vary over a range from —150 miles to +50 miles. The ratio of change in voltage to change in position of shaft 731 is the same in both voltage divider 721 and voltage divider 952.

The off schedule distance circuit

The off schedule distance circuit 877 is concerned with supplying a voltage equal to the distance by which the craft has deviated from its scheduled position. To this end there is provided a series electrical circuit including conductor 961, secondary winding 870 of transformer 862, conductor 962, and the winding 963 of a voltage divider 964 having a center tap 965 and a slider 966. Center tap 965 of winding 963 and center tap 882 of secondary winding 870 are grounded as at 972. Slider 966 is connected to summation terminal 946 by conductor 967, summing resistor 970 and conductor 971.

Slider 966 is actuated by a shaft 973 which is also extended to operate the pointer of indicator 60, and also to operate the sliders 974 and 975 of voltage dividers 976 and 977 having windings 980 and 981 center tapped as at 982 and 983, and forming portions of indicator circuit 883 and control circuit 884, all respectively. The sliders are simultaneously moved with respect to the windings by operation of a motor 984 under the control of an amplifier 985 having input terminals 1016 and 1020, output terminals 994 and 995, and power terminals 1013 and 1014.

The off schedule distance drive

Motor 984 is shown to comprise a shaft 986, carrying a rotor 987, and a pair of windings 990 and 991. Winding 990 is continuously energized from source 155 through bus 369', quadrature capacitor 992 and ground connections 993 and 371. Winding 991 is energized from the output terminals 994 and 995 of amplifier 985 through conductors 997 and 998, the former being grounded at 993. A capacitor 1000 is connected across winding 991 to improve its power factor.

Shaft 986 also carries the rotor 1001 of a velocity generator 1002 having a primary winding 1003 and a secondary winding 1004. Primary winding 1003 is energized from source 155 through bus 369', phasing capacitor 1005, and ground connections 993 and 371. Secondary winding 1004 is connected by conductors 1006 and 1007 to the winding 1010 of a voltage divider 1011 having a slider 1012.

Power terminals 1013 and 1014 of amplifier 985 are energized from source 155 through bus 369' and ground connections 1015 and 371. Input terminal 1016 of amplifier 985 is grounded as at 1017. Input terminal 1020 of amplifier 985 is connected to summation terminal 946 by conductor 1021, and slider 1012 is connected to summation terminal 946 by conductor 1022, summing resistor 1023, and conductor 1024. One terminal of the winding 1010 of voltage divider 1011 is grounded as at 1025.

The amplifier input circuit for off schedule distance

In the Directional Computer the input to the amplifier in the $x_d$ channel is shown as a series summing circuit. In the Scheduling Computer, on the other hand, the input to the $y_d$ amplifier is shown as a parallel summing network, in which four voltages are connected between summation terminal 946 and ground. The voltages added are those across the summing resistors 944, 956, 970 and 1023. Let the resistances of these resistors be $R_t$, $R_p$, $R_d$ and $R_v$, and let the voltage drops across them be $e_t$, $e_p$, $e_d$ and $e_v$, all respectively. Now if the resistance of load resistor 1018 and the voltage across it are defined as $R_r$ and $e_r$, it can be shown from network theory that $$e_r = R_r \ (e_t/R_t + e_p/R_p + e_d/R_d + e_v/R_v) \quad (10)$$

assuming that $R_r$ is small compared to the other resistances. Discussion of this theory is to be found at page 179 of the June 1947 issue of "Electronic Engineering," volume 20, Number 232, and at page 444 of the May 1947 issue of "Proceedings of the I. R. E," volume 35, Number 5, if further elaboration is desired.

A voltage of magnitude $e_r$ acts on amplifier 985 to cause operation of motor 984, which changes the value of $e_d/R_d$ until $e_r$ becomes zero, neglecting the antihunt effect of $e_v/R_v$. When this condition is reached operation of motor 984 ceases. Equation 10 can now be expressed as $$e_r/R_r = e_t/R_t + e_p/R_p + e_d/R_d = 0 \quad (11)$$

from which it follows that, in the balance condition of the system the actual value of the resistance of resistor 1018 is of no significance. If the summing resistors are of equal resistance, Equation 11 may be rewritten as $$e_d = -e_t - e_p \quad (12)$$

In first wiring the system the phase of $e_p$ is reversed from that of $e_t$ and $e_d$, as indicated by signs of instantaneous polarity in Figure 16. Equation 12 is hence really $$e_d = e_p - e_t$$

or $\quad (13)$ $$y_d = y_p - y_t$$

which is a relation used in deriving Equations 2 and 3.

The assumption above that $e_r = 0$ does not invalidate the conclusions reached, because this is the normal value of $e_r$ to which the system tends, and from which it seldom deviates appreciably.

From the foregoing discussion it is apparent that means have been provided for producing a rotation of shaft 973, connected to shaft 986 by reduction gearings 988 and clutch 989, determined by $y_d$: this motion is transmitted through shaft 973 to indicator 60 which is located on the panel of the Navigating Computer, and which indicates whether the craft is ahead of schedule, on schedule, or behind schedule.

Remote indication of deviation from schedule

As thus far described, information is made available by the computer as to two factors connected with the along track progress of the craft—these are the distance to destination $y_p$ and the off schedule distance $y_d$. To the pilot it is of primary importance that he know where he is, and the question of relation of that position to his schedule position is secondary. Indicator 104 showing $y_d$ is therefore the one which is located on the Pilot's Indicator Panel, indicator 60 being located where it is accessible to the navigator or radio man, thus reducing the instrument panel space required in the cockpit. It is possible, however, to give the pilot a somewhat less accurate indication of $y_d$, by making use of the cross pointer indicator 126 (Figure 12) of the Instrument Landing System during periods when it is not being used for its normal purpose. Indication of $x_d$ may also be given on the cross pointer indicator at the same time. This is accomplished by disconnecting the indicator from the localizer and glide path receivers, and energizing the deflecting coils from $x_d$ and $y_d$ circuits in the computer. The vertical needle of the indicator will then show whether the craft is on the scheduled path, or to the left or the right of it, and the horizontal needle will show whether the craft is on schedule, or ahead of or behind schedule.

The readings of indicator 126 are in terms of "dots" or arbitrary scale units, rather than in miles, although a rough calibration of course is apparent to the pilot. Inasmuch as the cross pointer indicator is one with which many pilots are familiar, the use of this instrument to give indications of the computer outputs has the additional advantage of requiring a minimum amount of pilot training if the system is to be used for example as a supervisory system rather than as a controlling system.

This arrangement is practical since automatic flight under the control of the computer is never undertaken at the same time that a landing approach is being made, and vice versa. The use of a single indicator, which must in any case be provided in the cockpit, for two different functions is a conservation of panel space, and indeed if this is done, indicator 103 can be omitted from Pilot's Indicator Panel 87'. On the other hand the accuracy of indicator 103 is definitely superior to that obtainable using only the vertical needle of the cross pointer indicator, and for that reason its use is recommended in the normal practice of the invention.

Cross pointer indication of off-track distance

Referring to Figure 15b, it will be recalled that a unidirectional voltage pulsating at twice the frequency of source 155 appears across resistor 672; its magnitude and polarity are determined by $x_d$. This voltage is connected by conductors 1030 and 1031 to two adjacent fixed contacts 1032 and 1033 of a double pole double throw switch 1034 having switching contacts 1036 and 1037 and two further adjacent fixed contacts 1040 and 1041. Switching contacts 1036 and 1037 are connected to actuate the vertical needle 1042 of cross pointer indicator 126 through conductors 1043 and 1044. When switch 1034 is thrown in an upward direction as seen in Figure 15b, the pulsating voltage supplied across resistor 672 actuates the vertical needle 1042 to an average value reading which is a measure of $y_d$, being zero when the craft is on the desired course.

Cross pointer indication of off schedule distance

In connection with Figure 16 it was pointed out that rotation of shaft 973 takes place determined by $y_d$, and that the shaft drives slider 974 of voltage divider 976. This voltage divider is a part of the $y_d$ indicating circuit 883, and is connected in series with winding 872 of transformer 862 by conductors 1045 and 1046.

Indicating circuit 883 also includes a phase sensitive demodulating bridge 1047 like bridge 650 of Figure 15, and comprising pairs of equal resistors 1050 and 1051, and 1052 and 1053 and rectifiers 1054, 1055, 1056 and 1057. Slider 974 and center tap 982 of voltage divider 976 are connected to input terminals 1060 and 1061 of bridge 1047 by conductors 1062 and 1063 respectively. Secondary winding 871 of transformer 862 is connected to power terminals 1064 and 1065 of bridge 1047 by conductors 1066 and 1067 respectively. The voltage appearing at output terminals 1070 and 1071 of bridge 1047 is impressed across a voltage divider comprising resistors 1072 and 1073: the voltage drop across resistor 1073 is a unidirectional voltage pulsating at twice the frequency of source 155, and reversing in polarity as the phase of the input voltage to the bridge reverses.

The pulsating voltage is applied as shown in Figure 15$b$ by conductors 1074 and 1075 to two adjacent fixed contacts 1076 and 1077 of a double pole double throw switch 1080 having switching contacts 1082 and 1083 and two further adjacent fixed contacts 1084 and 1085. Switch arms 1082 and 1083 are connected to actuate the horizontal needle 1086 of cross pointer meter 126 by conductors 1087 and 1090 respectively. Thus whenever switch 1080 is thrown upwardly the voltage across resistor 1073 of Figure 16, whose average value is a measure of $y_d$, actuates the horizontal needle to give an indication of the deviation of the craft from its schedule, being zero when the craft is on schedule.

Automatic control of air speed

If a craft deviates from its schedule, running slow for instance, so that $y_t$ is physically smaller than $y_p$ and $y_d$ is negative, the speed of the craft must be increased over its scheduled value $V$ by such an amount $\Delta V$ that at the new ground speed $V+\Delta V$ the craft will have traveled $y_t+y_d$ miles in the same time for arrival at the destination exactly on schedule as it would travel $y_t$ miles at scheduled ground speed $V$.

$$\frac{y_t+y_d}{V+\Delta V}=\frac{y_t}{V}$$

or $$\frac{y_d}{y_t}=\frac{\Delta V}{V} \quad (6)$$

This, however leaves no margin for error. It is preferable to plan to achieve schedule position before reaching the destination in which case $\Delta V$ must be increased so that $$\frac{\Delta V}{V}=K\frac{y_d}{y_t} \quad (7)$$

If schedule position is to be reached at a point half way from the present position of the craft to the destination, the $K=2$. It will be apparent that the closer the craft is to the destination—that is, the smaller $y_t$ is—the greater $$\frac{\Delta V}{V}$$

must be to make the equation balance. If the craft is ahead of schedule, $y_d$ becomes positive and hence correction must be made by a decrease in speed.

Expressed in words, whenever the craft falls behind schedule its actual velocity must be increased over its schedule velocity by an amount proportional to the quotient of the deviation from schedule divided by the schedule distance to destination at that instant. The constant of proportionality is never less than 1, and represents the denominator of the fraction of the distance $y_p$ within which the correction must take place.

Air speed control circuit

The invention includes means supplying a voltage whose magnitude is determined by the expression $$K\frac{y_d}{y_t}$$

the phase of the voltage being determined by the polarity of $y_d$. This is accomplished by energizing the air speed control members of the craft in accordance both with its deviation from schedule position, as reported by shaft 973, and with the schedule distance to destination, as reported by shaft 940.

Shaft 973 has already been described as actuating slider 975 of voltage divider 977 in the control circuit 884: in this circuit winding 981 of the voltage divider is energized from secondary winding 873 of transformer 862 through conductor 1091 and conductor 1092, variable resistor 1093, and conductor 1094.

Shaft 940 is shown to actuate slider 1095 of a further variable resistor 1096 having a winding 1097 tapped as at 1098: slider 1095 is at tap 1098 when slider 935 is at tap 936 of voltage divider 934 in the schedule distance to destination circuit 875. Winding 1097 is not energized from any source of voltage, and therefore acts not as a voltage divider, but simply as a variable resistor whose resistance is varied by the $y_t$ motor 897.

Sliders 1095 and 975 are connected by conductor 1100. A load resistor 1101 is connected between center tap 983 and tap 1098 by conductors 1102 and 1103 respectively. Resistor 1101 is connected by conductors 1104 and 1105 to the fixed contacts 1106 and 1107 of a relay 1110 whose winding 1111 energizes an armature 1112 to actuate a movable contact 1113 between the fixed contacts. In the normal position of relay 1110 movable contact 1113 engages fixed contact 1106.

As long as $y_d$ is zero, conductors 1100 and 1102 are at the same potential: no voltage therefore appears across resistor 1101. Under these conditions the setting of slider 1095 is without significance. Slider 1095 is driven by motor 897 along winding 1097 as time elapses, approaching tap 1098 from the displaced position in which it was set by adjustment of knob 75.

Now suppose resistor 1093 is set at its maximum resistance, and let $y_d$ have a value of $-2$ miles and $y_t$ a value of $-50$ miles. Then a voltage $E_1$ appears between conductors 1100 and 1102 which is proportional to 2 miles. Across resistor 1101 this voltage is proportional to $-2$ miles divided by $-50$ miles. This is the speed correction voltage which is sufficient to bring the aircraft back on schedule at the destination.

If it is the policy of the pilot to bring about return to the scheduled position at a point half way to the destination, resistor 1093 is not set at its maximum value but at an intermediate value which doubles the voltage $E_1$, and hence the speed correction voltage, which is now proportional to $-4$ miles divided by $-50$ miles.

If the same deviation occurs when the craft is 10 miles from the destination, the air speed correction voltage with the same setting of resistor 1093 is proportional to $-4$ miles divided by $-10$ miles, or is 5 times as large as it was when the craft was 50 miles away. The correction in the craft's speed is accordingly much greater, for the same deviation, when the craft is nearer the destination.

Fixed contact 1107 and movable contact 1113 of relay 1110 are connected by conductors 1114 and 1115 to two adjacent fixed contacts 1116 and 1117 (Figure 15$b$) of a double pole double throw switch 1120 having switch-

47 ing contacts 1122 and 1123 and two further adjacent fixed contacts 1124 and 1125, the latter being joined by conductor 1128. The circuit through conductor 1115 is normally completed by further elements of orbiting relay 614 including a fixed contact 1119 which is normally engaged by a movable contact 1121 actuable by armature 616 into engagement with a second fixed contact 1118 connected to conductor 1114. Switching contacts 1122 and 1123 are connected by conductors 1126 and 1127 to the air speed control portion or throttle channel of the Automatic Pilot. Thus when switch 1120 is closed to the right as seen in Figure 15b, a control voltage of magnitude proportional to $$K\frac{y_d}{y_t}$$

is applied to the Automatic Pilot to change the air speed of the craft. No particular means of supervising the altitude of the craft, which would also be affected, is shown, since this can be done manually by the human pilot or automatically by known expedients.

*Polar station data presentation*

Under some conditions it may be desirable to determine $x_n$ or $y_n$, not directly from the specially prepared chart on which the Y-axis has been drawn, but from other data more readily obtained when only a general map is available. The geographic bearing $C_n$ of the Y-axis, and the location on the ground of the origin of the axes, will always be known. From the ground station $S_n$ the bearing $C_s$ and the distance L of the origin 0, as shown in Figure 1, can be measured on any map. Inspection of the figure shows that the following relations prevail between $x_n$ and $y_n$, the unknowns, and the known constants $C_s$, $C_n$ and L:

$$x_n = L \cos \Delta XOS_n$$

and $$y_n = L \sin \Delta XOS_n$$

when $\Delta XOS_n$ is measured in a counterclockwise direction, and since $$\Delta XOS_n = (270° + C_n - C_s)$$

it follows that $$x_n = L \cos (270° + C_n - C_s)$$

(8)

and $$y_n = L \sin (270° + C_n - C_s)$$

(9)

The problem thus becomes one of converting from polar to Cartesian coordinates, in order to derive from L and $C_s$, which the computer of Figure 15 cannot handle, values of $x_n$ and $y_n$ which are necessary to operation of the computer.

Means for performing this conversion are shown in block diagram in Figure 20, and more explicitly in Figure 30, which is to be considered as a modification of Figure 15a. In Figure 20 there is shown means 1600 supplying a first pair of mechanical inputs 1604 proportional to the distance L from the station to the origin of the coordinates, and a second mechanical input 1601 proportional to $(C_s - 180°)$, the difference between the bearing $C_s$ of the origin, from the station, and 180 degrees. A third mechanical input 43 is that already provided in the computer and previously described, proportional to the sum $(90° + C_n)$ of the bearing $C_n$ of the Y-axis, from geographic north, and 90 degrees. In measuring $C_s$ and $C_n$ an angle is positive if measured in a clockwise direction. The 90 and 180 degree components are introduced by offsetting knobs with respect to scales by the required amounts, as has been mentioned in connection with input 43.

The second and third inputs are combined in a subtracter 1602 which gives a pair of equal outputs 1603 proportional to $(270° + C_n - C_s)$, which are applied to a cosine resolver 1637 and a sine resolver 1652. The output 1607 from resolver 1637 is proportional to cosine $(270° + C_n - C_s)$ and is combined in a multiplier 1632 with an input proportional to L: the output 1611 from multiplier 1632 is $L \cos (270° + C_n - C_s)$, or $x_n$ as previously established. The output 1612 from resolver 1652 is proportional to $\sin (270° + C_n - C_s)$ and is combined in a multiplier 1645 with an input proportional to L: the output 1614 from multiplier 1645 is $L \sin (270° + C_n - C_s)$, or $y_n$ as previously established. The input into subtracter 1602 proportional to $(C_n + 90°)$ is in addition to the usual input provided by 43 to the angle circuit of the computer.

Subtracter 1602 can in practice be a mechanical differential with inputs properly sensed. Such an arrangement is shown in Figures 29 and 30, to the latter of which reference should now be made.

Figure 30 is a modification of Figure 15a, and the greater number of parts in the two figures are the same and have been given the same reference characters. The purpose of the modification is to give $x_n$ and $y_n$ voltages, in the cross track and along track channels 366 and 367 of computer 78, from settings of L and $C_s$ on the Preset Panel. For simplification no part of the lockout system is reproduced in Figure 30, the automatic advance system is greatly simplified, and in general only entirety numbers are repeated.

In Figure 30 the knob setting L into Preset Panel 86' is shown at 102' in cooperation with a counter type of indicator 97'. Similarly the knob setting $C_s$ into the computer is show nat 101' in cooperation with a counter type of indicator 96'. Knob 100 and indicator 95 are as before, except that instead of supplying mechanical input only to the sliders of telemetric receiver 427, there is this time a second mechanical connection to a differential 1602 suggested by the dotted line in Figure 29 and explicitly shown in Figure 30. Knob 101' drives differential 1602 through a shaft 1620, and knob 100 drives differential 1602 through a shaft 1621. The output of differential 1602 is connected by a shaft 1622 to operate the movable contact 1623 of a switch 1624, having a pair of semicircular contacts 1625 and 1626 engageable by movable contact 1623 as shaft 1622 rotates.

Operation of computer 78 from data presenting the relative position of the ground station and the origin of the axes in polar form requires a pair of vector networks like network 387 previously described, one for solving Equation 8 and the other for solving Equation 9: these networks are respectively indicated by the reference numerals 523' and 694' in Figure 30.

Vector network 523' comprises a first series electric circuit including conductor 1627, secondary winding 378' of transformer 373, conductor 1630, and the winding 1631 of a voltage divider 1632 having a slider 1633, and a second series circuit including a conductor 1634, the portion of winding 1631 between conductor 1634 and slider 1633, the slider, conductor 1635, and the winding 1636 of resolver 1637 which has a center tap 1640 and at least one slider 1641. Slider 1633 is moved from a position at the end of winding 1631 connected to conductor 1630, when $L=0$, to a position at the end of winding 1631 connected to conductor 1627, when $L=150$ miles, by connection to shaft 1604. The output voltage of winding 378' is 300 volts, and therefore each difference of one mile in the distance between the station $S_n$ and the origin 0 is represented by a difference of two volts in the potential of slider 1633 with respect to conductor 1630.

The voltage between conductor 1634 and center tap 1640 is of the same phase as, and of half the amplitude of, that between conductors 1630 and slider 1633, while the voltage between conductor 1635 and center tap 1640 is of the opposite phase to, and of half the amplitude of, that between conductor 1630 and slider 1633. Thus although the "scale" of voltage divider 1632 is two volts per mile, that of the available output from resolver 1637 is one volt per mile.

Resolver 1637 is constructed as described in connection with resolver 395, and this description will not be repeated. Slider 1641 is moved with respect to winding 1636, by means 1603 which here comprises mechanical connection 1622 from differential 1602, in accordance with the value of $(270°+C_n-C_s)$, and is arranged to have a maximum displacement from center tap 1640 when $(270°+C_n-C_s)$ is zero degrees. There appears slider 1641 and center tap 1640 a voltage proportional on a scale of one volt per mile to $L \cos(270°+C_n-C_s)$, and this voltage is supplied by conductors 531' and 537' to fixed contacts 532' and 538' of stepping switches 533' and 539'.

Vector network 694' comprises a first series electrical circuit, including conductor 1642, secondary winding 384', conductor 1643, and the winding 1644 of a voltage divider 1645 having a slider 1646, and a second series circuit including a conductor 1647, the portion of winding 1644 between conductor 1647 and slider 1646, the slider, conductor 1650, and the winding 1651 of resolver 1652, which has a center tap 1653 and at least one slider 1654. Slider 1646 is moved from a position at the end of winding 1644 nearest conductor 1643, when $L=0$, to a position at the end of winding 1644 nearest conductor 1642, when L equals 150 miles, by connection to shaft 1604. The output voltage of winding 384' is 300 volts, and therefore each difference of one mile in the distance L between the station $S_n$ and origin 0 is represented by a difference of two volts in the potential of slider 1646 with respect to conductor 1643.

The voltage between conductor 1650 and center tap 1653 is of the opposite phase to, and of half the amplitude of, that between conductor 1643 and slider 1646, while that between conductor 1647 and center tap 1653 is of the same phase as, and of half the amplitude of, that between conductor 1643 and slider 1646. Thus although the "scale" of voltage divider 1645 is two volts per mile, that of the available output from resolver 1652 is one volt per mile.

Resolver 1652 is constructed as described in connection with resolver 395, and this description will not be repeated. Slider 1654 is moved with respect to winding 1651, simultaneously with movement of slider 1641, by means 1603 which here comprises mechanical connection 1622 to differential 1602, in accordance with the value of $(270°+C_n-C_s)$ and is arranged to have maximum displacement from center tap 1653 when $(270°+C_n-C_s)$ is 90 degrees. There appears between slider 1654 and center tap 1653 a voltage proportional, on a scale of one volt per mile, to $L \sin(270°+C_n-C_s)$, and this voltage is supplied by conductor 704' and 710' to fixed contacts 705' and 711' of stepping switches 706' and 712'.

It will be appreciated that the Preset Panel must include a knob 101', a knob 102', a knob 100, a differential 1602, and a pair of vector networks 523' and 694' for each section of a flight to be made with the modification of the invention. Switches 533' and 539' select in order the successive $x_n$ outputs, and switches 706' and 712' select in order the successive $y_n$ outputs, just as in Figure 15a, the only difference being that in Figure 30 these outputs are automatically computed rather than manually set directly.

In using this modification of the invention, the tabulation from which the Preset Panel is set up presents the station frequencies and track angles, as well as the orbiting station data, as before, but instead of listing station offsets and onsets $x_n$ and $y_n$, the station angle $C_s$ and station distance L are listed for the various stations.

For the first section of the flight shown in Figure 8, for example $C_s$ is 11.6 degrees and L is 60.43 miles. The voltage between slider 1633 and conductor 1634 is then 120.86 miles. The angle $(270°+C_n-C_s)$ has a value of $(270°+329.4°-11.6°)$ or 227.8°, whose cosine is $-.6715$, so that the voltage between slider 1641 and center tap 1640 is $$\frac{(120.86)(.6715)}{2}$$

or 40.58 volts. By reason of proper interconnection of winding 378', Figure 30, and 1631, the instantaneous polarity of switch arms 534' and 540' is the same as that of arms 534 and 540 in Figure 15a, and the cross track channel of the computer functions as before.

The voltage between slider 1646 and conductor 1643 is the same in phase and amplitude as that between slider 1633 and conductor 1634, that is, 120.86 volts. The sine of angle $(270°+329.4°-11.6°)$ or 227.8°, is .7410, and the voltage between slider 1654 and center tap 1653 is $$\frac{(120.86)(.7410)}{2}$$

or 44.78 volts. The interconnection between windings 384' and 1644 is such as to give switch arms 707' and 713' the same polarity as in the previous embodiment of the invention, and the along track channel of the computer functions as before.

*Interconnection with the instrument landing system*

As previously pointed out, the invention contemplates combining the use of a Navigating Computer with the Instrument Landing System to control the automatic flight of a craft. In Figure 15b there are shown means for connecting to the system shown therein outputs from the receivers of the Instrument Landing System. Connection 1130 is a multiconductor cable, and permits operation of signal lamp 127 from the marker beacon receiver. This is exactly as in the conventional Instrument Landing System.

Conductors 1131 and 1132 are connected to the localizer receiver of the Instrument Landing System. In normal operation of the system these conductors lead to the vertical needle of cross pointer indicator 126, and it will be seen that when switch 1034 is thrown in its downward position this connection is still completed.

Conductors 1133 and 1134 are connected to the glide path receiver of the Instrument Landing System. In normal operation of that system these conductors lead to the horizontal needle of cross pointer indicator 126, and it will be seen that when switch 1080 is thrown in its downward position this connection is still completed.

Conductors 1131 and 1132 are also connected to fixed contacts 687 and 686 of switch 685. When the switch is thrown to the right, the voltage supplied to vertical needle 1042 is also supplied to conductors 692 and 693 to energize azimuth coupling unit 33, to cause operation of the craft so that it seeks and follows the center of the localizer beam.

Similarly, conductors 1133 and 1134 are connected to fixed contacts 1136 and 1135 of a double pole double throw switch 1140, having switching contacts 1141 and 1142 and two further adjacent fixed contacts 1143 and 1144, joined by a conductor 1145. Switching contacts 1141 and 1142 are connected to a glide path coupling unit 1146 (Figure 12) by conductors 1147 and 1150.

*Coupling units*

In the Instrument Landing System the deflection of each of the needles of cross pointer indicator 126 is caused by a unidirectional voltage of variable magnitude and reversible polarity. The Automatic Pilot 31, on the other hand, is designed for actuation in accordance with alternating voltages of the frequency of source 155. The two unidirectional voltages supplied to the indicator may however be made use of to control the craft through the Automatic Pilot by suitable coupling means known to those skilled in the art. One such means is clearly disclosed in the copending application of Carpenter and Alderson, Serial No. 49,442, filed September 15, 1948, and assigned to the assignee of the present application. For the purpose of completeness the structure and functional relations in a suitable coupling unit are schematically shown and briefly discussed here: the azimuth and glide path components are shown physically separated in Figure 12 to simplify the disclosure, although in practice they form part of a single physical unit.

Azimuth Coupling Unit 33 comprises four principal components, best shown in Figure 2. The unidirectional voltage from computer 32 is fed by means 56 to a rate network 1154 which modifies it by adding a further component proportional to the rate of change of the computer voltage. The modified voltage is changed in an inverter 1155 to alternating voltage of the frequency of source 155, varying in amplitude and reversing in phase with the variation in the magnitude and reversal in the polarity of the modified voltage. The alternating voltage is applied to an amplifier 1156 which increases its amplitude without introducing appreciable phase angle distortion. Coupling unit 33 also includes a control section 1157 which controls the distribution of signal and controlling outputs 1160 and 1160' to the directional gyroscope and output 1161 to the servo systems of Automatic Pilot 31. Control section 1157 includes a control member or knob 1158 which is effective both in Azimuth Coupling Unit 33 and in Glide Path Coupling Unit 1146 (Figure 12): it is shown to have five positions; and regulates the energization of the Automatic Pilot 31 from the coupling units.

The Glide Path Coupling Unit 1146, shown in Figure 12, is of the same nature as coupling unit 33 just described, and in practice is included in the same physical structure therewith, as is set forth in the copending application of Carpenter and Alderson referred to, for control by knob 1158 simultaneously with control of the Azimuth Coupling Unit.

In the "Navigate," most counterclockwise position of knob 1158, any signal applied to the input of the Azimuth Coupling Unit is supplied to the servo systems and the directional gyroscope of the Automatic Pilot: no signal from the Glide Path Coupling Unit is permitted to affect the servo systems of the Automatic Pilot. In the central "off" position of the knob 1158 the Automatic Pilot is placed in full control of the control surfaces of the craft. In the "in" position of knob 1158, next clockwise to the "off" position, any signal applied to the input of the Azimuth Coupling Unit is supplied only to the servo systems of the Automatic Pilot, and the directional gyroscope is caged: no signal from the Glide Path Coupling Unit is permitted to affect the servo systems of the Automatic Pilot. In the "Glide," or most clockwise, position of knob 1158, any signal applied to the Azimuth Coupling Unit is supplied to the servo systems of the Automatic Pilot, and to the precessing motor of the directional gyroscope, which is no longer caged, and any signal from the Glide Path Coupling Unit is supplied to the throttle control system of the Automatic Pilot.

The output of Scheduling Computer 79 is applied to the Automatic Pilot directly without an intermediate coupling unit.

It is to be remembered that the application of the invention to a craft having for example a hydraulic Automatic Pilot may require slight modifications, evident to those skilled in the art, but the overall invention is exactly the same.

*Selection of craft control*

In normal flight of the craft it is desired that it be under the control of the Navigating Computer. At the end of the flight, where the craft is landing—and sometimes at the beginning of the flight, where the craft is taking off—it is desired that it be under the control of the Instrument Landing System. Selection of the control for the craft is made by a manual knob 1163 movable between "Cruise" and "Land" positions on a scale 1164, through a central "off" position. Knob 1163 is connected by means 1165 to actuate switches 685, 1034, 1080, 1120, and 1149. Since it is a matter of choice whether all these switches are mounted on the Pilot's Indicator Panel, where knob 1163 and scale 1164 are located, or at separate locations, the showing is to be considered schematic to the extent that it may include either direct mechanical operation of the switches or remote actuation thereof through a relay system energized by knob 1163.

Control of the direction of movement of the craft is brought about through Azimuth Coupling Unit 33, whose effect is superimposed on the ordinary stabilizing control exerted by the Automatic Pilot, either in response to signals from the Directional Computer or in response to signals from the Instrument Landing System receiver.

Control of the altitude of the craft for making instrument landings is accomplished by Glide Path Coupling Unit 1146, which is ineffective when the Scheduling Computer is in control of the craft.

Control of the air speed of the craft is accomplished by the Scheduling Computer, and this control is ineffective when the Instrument Landing System is in control of the craft.

The interconnections joining the Glide Path and Localizer receivers, the Azimuth and Glide Path Coupling Units, the Navigating Computer, and the cross pointer indicator, are determined by the position of knob 1163. In the "off" position of this knob, all the units are disconnected from one another. In the "Land" position of knob 1163 the various switches controlled thereby are closed so as to energize the cross pointer indicator and the coupling unit from the Instrument Landing receiver, and to interrupt the air speed control system. In the "Cruise" position of knob 1163 the various switches are closed so as to energize the cross pointer indicator and the Azimuth Coupling Unit from the Directional Computer, and to energize the air speed control system from the Scheduling Computer: the Glide Path Coupling Unit is simultaneously rendered ineffective.

*The automatic pilot*

The Automatic Pilot for use with which the present system is particularly adapted comprises a plurality of control channels by which the air speed of the craft as well as its attitude about its turn, roll and pitch axes may be stabilized by suitable servo systems operating to move the control surfaces and the throttles. As is shown in Figures 21 and 22, an air speed sensing device 1166, a vertical gyroscope 1167, and a directional gyroscope 1170 comprise the units responsive to departure of the craft from the selected state. The aileron channel 1171, rudder channel 1172, and elevator channel 1173 of the Automatic Pilot, shown in Figure 21, control the attitude of the craft about its roll axis 1174, yaw axis 1175, and pitch axis 1176 respectively, and the throttle channel 1177, shown in Figure 22, controls its air speed.

For reasons inherent in the characteristics of a craft in flight, the aforementioned channels of the Automatic Pilot are not independent. By way of recapitulation of known principles it may be stated that, starting with a craft in straight, level, directed flight at a constant altitude and air speed, each of the control channels has certain effects on the craft. If the ailerons alone are operated, the craft initially yaws slightly toward the wing which is rising, then rolls, noses down, and turns toward the lower wing, changing direction as well as heading, meanwhile sideslipping toward the lower wing.

If the rudder alone is operated, the heading of the craft changes immediately without immediate change in its direction of motion, and the craft noses down slightly and also rolls in a direction to lower the wing toward which the heading changes.

If the elevators alone are operated, the attitude of the craft about its pitch axis changes, thus changing the attack angle and hence the drag-to-lift ratio. Since power setting and weight of the craft are constant this results in gain or loss in altitude and a change in air speed.

If the throttle alone is operated the thrust changes. Since the drag-to-lift ratio and the weight of the craft are constant, this results in a change in air speed; there is also an accompanying change in pitch attitude.

It should be emphasized that the attack angle and thrust do not independently affect the elevation and air speed of the craft, but rather that each has an effect on both these variables. Full automatic control of a craft to climb or glide at a predetermined rate would therefore require simultaneous automatic control both of elevators and of throttle. For the sake of simplicity the present application shows a semiautomatic system wherein one of the control members is used to control each one of the variables: in cruising at a constant altitude the human pilot must make such residual corrections in the elevator setting as are necessary to maintain constant altitude at the controlled air speed, and in instrument landing he must control air speed by correcting the throttle setting to obtain the desired rate of descent.

Coordination of the control surfaces of the craft in a turn is necessary, however, to any control system which attempts to accurately control the attitude of the craft for comfort of its passengers, or to insure that the craft is under full attitude control at all times and follows the desired path. A "coordinated" turn is one in which apparent gravity is at all times normal to the floor of the craft; it is also desirable that no loss or gain of elevation occurs. To bring about such a turn interrelation of the aileron, rudder, and elevator channels of the Automtaic Pilot in a required relationship must be brought about: means for accomplishing this are shown in Figure 21.

*Construction of the aileron channel of the automatic pilot*

The aileron channel 1171 of the Automatic Pilot is shown in Figure 21 to comprise a pair of resistance bridges 1180 and 1181 whose outputs are connected in series by a conductor 1182. Bridge 1180 is energized at input terminals 1183 and 1184 from the secondary winding 1185 of a transformer 1186 whose primary winding 1187 is connected to source 155 by suitable means not shown. The output terminals of bridge 1180 are the sliders 1190 and 1191 of a pair of voltage dividers 1192 and 1193 having windings 1194 and 1195. Windings 1194, 1195 and 1185 are connected in parallel by conductors 1196 and 1197. Slider 1190 is arranged for operation by a manual knob 1200.

Bridge 1181 is energized at input terminals 1202 and 1203 from the secondary winding 1204 of a transformer 1205 whose primary winding 1206 is connected to source 155 by suitable means not shown. The output terminals of bridge 1181 are the sliders 1207 and 1210 of a pair of voltage dividers 1211 and 1212 having windings 1213 and 1214. Windings 1213, 1214 and 1204 are connected in parallel by conductors 1215 and 1216.

Slider 1207 is stabilized by vertical gyroscope 1167 so that it remains stationary: winding 1213 moves with respect thereto with movement of the craft about the roll axis. Similarly slider 1210 is stabilized by directional gyroscope 1170 so that it remains stationary, winding 1214 moving with respect thereto with movement of the craft about the yaw axis.

*The directional gyroscope*

Directional gyroscope 1170 is of the type which is provided with a precessing motor for applying torque about one of the gimbal axes of the gyroscope to cause it to precess about its vertical axis. This motor is conventionally a two-phase motor, one phase being continuously energized from source 155, as indicated at 1168, and the other being energized in a reversible phase and variable amplitude from Azimuth Coupling Unit 33, as at 1160, under conditions later to be explained. It is capable of precessing the gyroscope at the same rate as that at which the craft turns.

Directional gyroscope 1170 is also provided with means for caging the rotor about the stabilized axis, that is, for bringing it to a normal position and locking it there. Since the details of such a device are not necessary to an understanding of the present invention, Figure 21 merely shows a pair of terminals 1169, energization of which causes the gyroscope to be caged, and deenergization of which causes the gyroscope to be uncaged. Terminals 1169 are energized from source 155 through conductors 1258 and 1259, the latter including a single pole double throw switch 1249 including a switching contact 1168' and a pair of arcuate fixed contacts 1169' and 1170': means for actuating movable contact 1168' are included in a turn control circuit 1225 presently to be described. Conductors 1259 are extended as at 1259' and 1160' for connection to switching means in Azimuth Coupling Unit 33, as described in the copending application referred to, which under certain conditions performs the same function as switch 1249.

*The turn control circuit*

Aileron channel 1171 includes a portion of turn control circuit 1225, shown to comprise a voltage divider 1226 having a slider 1227 and a winding 1230 center tapped as at 1231. Winding 1230 is energized from the secondary winding 1232 of a transformer 1233 whose primary winding 1234 is connected to source 155 by a suitable means not shown. Center tap 1231 is connected by conductor 1235 to one end of each of the windings 1236 and 1237 of a pair of variable resistors 1240 and 1241 having sliders 1242 and 1243. Slider 1227 is arranged for operation by a manual turn control knob 1244, and is connected by a conductor 1245 to the switching contact 1246 of a single pole double throw switch 1247 having fixed contacts 1250 and 1251. Switch 1247 normally completes the circuit between movable contact 1246 and fixed contact 1250. Fixed contact 1250 of switch 1247 is connected by conductor 1252 to the ends of windings 1236 and 1237. Slider 1243 is connected to slider 1191 by conductor 1255.

Switch 1247 is shown as cooperating with a portion of a relay 680 to determine the effectiveness in the turn control circuit of signals from Azimuth Coupling Unit 33: in practice switch 1247 may be made a phyiscal part of unit 33 and operated by knob 1158 (Figure 2) in control section 1157 if desired. Relay 680 may also be preferably a physical part of the Azimuth Coupling Unit, but for convenience of illustration has here been shown in Figure 21: the relay comprises a winding 682 actuating an armature 675 to displace movable contacts 676 and 677 from normal engagement with fixed contacts 678 and 679 into engagement with fixed contacts 678' and 679'.

Connection 1161 of Figures 2, 4, 6, 9 and 12 is shown in Figure 21 as comprising a pair of conductors 1253 and 1254. Conductor 1253 is connected to fixed contact 1250 of switch 1247, and to fixed contact 679' of relay 680. Conductor 1254 is shown as connected to fixed contact 679 of relay 680. Movable contact 677 of relay 680 is shown as connected to fixed contact 1251 of switch 1247.

Relay 680 also functions to control the energization of the precessing motor of directional gyroscope 1170. To this end connection 1160 is shown to comprise a pair of conductors connected to fixed contacts 678 and 678' of relay 680. Fixed contact 678' and movable contact 676 are connected to the precessing motor by conductors 1168". Thus when relay 680 is in its normal position the precessing motor is energized through connection 1160, and the turn control circuit is energized through connection 1161. When the relay is energized, both the turn control circuit input and the precessing motor input are interrupted and their input leads are short circuited.

Knob 1244 is arranged to operate movable contact 1168' through a mechanical connection 1248. The arrangement is such that when slider 1227 is at the center of its winding, neither of the fixed contacts 1169' and 1170' is engaged by switching contact 1168', but that as soon as slider 1227 is displaced the swtiching contact engages one or the other of the fixed contacts, thus energizing the caging mechanism of directional gyroscope 1170 through conductors 1258 and 1259.

Aileron channel 1171 includes a motor control amplifier 1256 having input terminals 1257 and 1260, power terminals 1261 and 1262, and output terminals 1263, 1264 and 1265. Center tap 1231 of voltage divider 1226 is connected to input terminal 1257 by conductor 1235. Slider 1210 of voltage divider 1212 is connected to input terminal 1260 by conductor 1266. Power terminals 1261 and 1262 are energized from source 155 through suitable means not shown. Output terminals 1263, 1264 and 1265 are connected to a servomotor 1267 to reversibly control operation thereof in a fashion well known to those skilled in the art.

Motor 1267 is connected by suitable means 1270, including a normally disengaged electromagnetic clutch 1271 energized from source 155 through switch 1269, to operate the drum 1272 driving the cables 1273 which position the ailerons 1274 of the craft: motor 1267 also drives slider 1191 with respect to winding 1195. The ailerons may be operated independently of motor 1267 by the usual control stick, suggested at 1268 in its aileron control function.

*Construction of the rudder channel of the automatic pilot*

Rudder channel 1172 of the Automatic Pilot is shown to comprise a pair of resistance bridges 1280 and 1281 whose outputs are connected in series by a conductor 1282. Bridge 1280 is energized at input terminals 1283 and 1284 from the secondary winding 1285 of a transformer 1286 whose primary winding 1287 is connected to source 155 by suitable means not shown. The output terminals of bridge 1280 are the sliders 1290 and 1291 of a pair of voltage dividers 1292 and 1293 having windings 1294 and 1295. Windings 1294, 1295 and 1285 are connected in parallel by conductors 1296 and 1297. Slider 1290 is arranged for operation by a manual knob 1300.

Bridge 1281 is energized at input terminals 1302 and 1303 from the secondary winding 1304 of a transformer 1305 whose primary winding 1306 is connected to source 155 by suitable means not shown. The output terminals of bridge 1281 are the sliders 1307 and 1310 of a pair of voltage dividers 1311 and 1312 having windings 1313 and 1314. Windings 1313, 1314 and 1304 are connected in parallel by conductors 1315 and 1316. Slider 1242 of turn control circuit 1225 is connected to slider 1291 by conductor 1355.

Slider 1310 is stabilized by vertical gyroscope 1167 so that it remains stationary: winding 1314 moves with respect thereto with movement of the craft about the roll axis. Similarly, slider 1307 is stabilized by directional gyroscope 1170 so that it remains stationary: winding 1313 moves with respect thereto with movement of the craft about the yaw axis.

Rudder channel 1172 includes a motor control amplifier 1356 having input terminals 1357 and 1360, power terminals 1361 and 1362, and output terminals 1363, 1364 and 1365. Center tap 1231 of voltage divider 1226 is connected to input terminal 1357 by conductor 1235. Slider 1310 of voltage divider 1312 is connected to input terminal 1360 of amplifier 1356 by conductor 1366. Power terminals 1361 and 1362 are energized from source 155 through suitable means not shown. Output terminals 1363, 1364 and 1365 are connected to a servomotor 1367 to reversibly control the operation thereof in a fashion well known to those skilled in the art.

Motor 1367 is connected by suitable means 1370, including a normally disengaged, electromagnetic clutch 1371 energized from source 155 through switch 1369, to operate the drum 1372 driving the cables 1373 which position the rudder 1374 of the craft: motor 1367 also drives slider 1291 with respect to winding 1295. The rudder may be operated independently of motor 1367 by the usual pedal controls suggested at 1268' in Figure 21.

*Construction of the elevator channel of the Automatic Pilot*

Elevator channel 1173 of the Automatic Pilot is shown to comprise a pair of resistance networks 1380 and 1381 whose outputs are connected in series by a conductor 1382. Network 1380 is a resistance bridge energized at input terminals 1383 and 1384 from the secondary winding 1385 of a transformer 1386 whose primary winding 1387 is connected to source 155 by suitable means not shown. The output terminals of bridge 1380 are the sliders 1390 and 1391 of a pair of voltage dividers 1392 and 1393 having windings 1394 and 1395. Windings 1394, 1395 and 1385 are connected in parallel by conductors 1396 and 1397. Slider 1390 is arranged for operation by a manual knob 1400.

Network 1381 is energized at input terminals 1402 and 1403 from the secondary winding 1404 of a transformer 1405 whose primary winding 1406 is connected to source 155 by suitable means not shown. The output terminals of network 1381 are the sliders 1407 and 1416 of a pair of voltage dividers 1411 and 1415 having windings 1413 and 1417, the latter center tapped as at 1420. Center tap 1420 is connected to input terminal 1402 through conductor 1421, resistor 1422, and conductor 1423. Both ends of winding 1417 are connected to input terminal 1403 by conductor 1424. Winding 1413 is connected to terminals 1402 and 1403 by conductors 1410 and 1414.

Relative motion of slider 1416 and winding 1417 takes place when the craft moves with respect to vertical gyroscope 1167 about the roll axis. Slider 1407 is stabilized by vertical gyroscope 1167 so that it remains stationary: winding 1413 moves with respect thereto with movement of the craft about the pitch axis.

Slider 1416 is connected by a conductor 1427 to fixed contact 1451 of a single pole double throw switch 1447 having a switching contact 1446 and a second fixed contact 1450. Switch 1447 normally completes a circuit between movable contact 1446 and fixed contact 1451. To fixed contacts 1450 and 1451 are also connected conductors 1147 and 1150 leading from the Guide Path Coupling Unit and comprising connection 1162 of Figure 12. Switch 1447 may comprise a physical part of Glide Path Coupling Unit 1146, if desired, and operated by knob 1158 simultaneously with switch 1247 of the Azimuth Coupling Unit.

Elevator channel 1173 includes a motor control amplifier 1456 having input terminals 1457 and 1460, power terminals 1461 and 1462, and output terminals 1463, 1464 and 1465. Switching contact 1446 of switch 1447 is connected to input terminal 1457 of amplifier 1456 by conductor 1466. Slider 1391 is connected to input terminal 1460 by conductor 1468. Power terminals 1461 and 1462 are energized from source 155 through suitable means not shown. Output terminals 1463, 1464 and 1465 are connected to a servomotor 1467 to reversibly control the operation thereof in a fashion well known to those skilled in the art.

Motor 1467 is connected by suitable means 1470, including a normally disengaged electromagnetic clutch 1471 energized from source 155 through switch 1469, to operate the drum 1472 driving the cables 1473 which position the elevators 1474 of the craft: motor 1467 also drives slider 1391 with respect to winding 1395. The elevators may be operated independently of motor 1467 by the usual control stick, suggested at 1368 in its elevator control function.

A main switch 1469' is provided to control energization of clutches 1271, 1371 and 1471 through switches 1269, 1369 and 1469. As elsewhere pointed out, switches 1247 and 1447 may be actuated by knob 1158 in the coupling units.

*Construction of the throttle channel of the automatic pilot*

The throttle channel 1177 is shown in Figure 22 to comprise a switch 1480, throttle networks 1481 and 1481' connected by a conductor 1479, an amplifier 1482 having input terminals 1503 and 1504, power terminals 1505 and 1506, and output terminals 1507, 1510 and 1511, and a servomotor 1483, the channel controlling the position of throttles 1484 in accordance with signals from an air speed responsive device 1166. Network 1481 is a resistance bridge energized at input terminals 1485 and 1486 from the secondary winding 1487 of a transformer 1490 whose primary winding 1491 is energized from source 155 by suitable means not shown. The bridge comprises the winding 1492 of a first voltage divider 1493 having a slider 1494, and the winding 1495 of a second voltage divider 1496 having a slider 1497. Conductors 1500 and 1501 connect the two windings in parallel with the secondary winding 1487. Sliders 1494 and 1497 comprise the output terminals of the bridge 1481, the latter terminal being grounded as at 1502.

Network 1481' is shown to comprise a voltage divider 1493' having a slider 1494' and a winding 1492' center tapped as at 1489, and a transformer 1490' having a primary winding 1491', energized from source 155 by suitable means not shown, and a secondary winding 1487' connected to energize winding 1492' of voltage divider 1493' by conductors 1500' and 1501'. Slider 1494' is operable by a manual knob 1498 movable with respect to a fixed scale 1498'.

Switch 1480 is shown to have a single switching contact 1512 and a pair of fixed contacts 1513 and 1514. When contacts 1512 and 1514 are in engagement, the bridge is connected to the input of amplifier 1482 by a circuit which may be traced from input terminal 1504 through ground connections 1515 and 1502, slider 1497, bridge 1481, slider 1494, conductor 1479, slider 1494', some portion of winding 1492' unless slider 1494' is at center tap 1489, the center tap, conductor 1516, fixed contact 1514, switching contact 1512 and conductor 1517 to input terminal 1503 of amplifier 1482. Engagement of contact 1512 and 1513 opens the circuit just traced and adds thereto a voltage supplied on conductors 1126 and 1127 concurrently with indication by Scheduling Computer 79 that the craft has departed from schedule.

Amplifier 1482 is connected in controlling relation to motor 1483 through conductors 1520, 1521 and 1522 connected to output terminals 1511, 1510 and 1507: power terminals 1505 and 1506 of the amplifier are energized from source 155 by suitable means not shown. The amplifier is of such a nature as to cause operation of motor 1483 in a forward direction when the voltage applied at input terminals 1503 and 1504 is of a first phase relation, and in a reverse direction when the phase of the input voltage reverses. The voltage from the Scheduling Computer is either in phase or 180° out of phase with that from bridge 1486.

Motor 1483 actuates throttle 1484 through a drive shaft 1526 which may include reduction gearing 1527, and a shaft 1528. The motor also actuates slider 1497 through shaft 1526, gear train 1527 and a shaft 1527', thus affecting the balance of bridge 1481. The balance of the bridge is also affected by air speed sensing device 1166, which actuates slider 1494 through a mechanical connection 1499. Throttles 1484 may also be operated by a manual lever 1484' through a mechanical connection 1529, which may include slip friction, override, or motor disengage means if desired.

*Normal operation of the automatic pilot*

It must be pointed out that servomotors 1267, 1367 and 1467 do not completely replace the normal control stick 1268 and rudder pedals 1268' of the craft, but are provided in addition thereto. In putting the Automatic Pilot into operation, it is necessary to properly coordinate it with the actual attitude of the craft. To do this the human pilot energizes the bridges and amplifiers of the Automatic Pilot, and after equilibrium conditions have been established he brings the craft into straight level flight at a desired altitude and in a desired direction, by operation of the control stick and the rudder pedals. He next adjusts the trim tabs so that the craft is in aerodynamic balance. In so doing he has determined the positions of sliders 1191, 1291 and 1391, which move with the control surfaces, and of windings 1211, 1214, 1311, 1314, 1413 and 1417, whose sliders are stabilized by the directional and vertical gyroscopes. At this time there is no connection between motors 1267, 1367 and 1467 and sliders 1191, 1291 and 1391, so that if channels 1171, 1172 and 1173 are not balanced, continuous operation of the respective motors takes place.

Mechanical trim of the shaft having been established as just described, the human pilot next establishes electrical trim of the Automatic Pilot, by closing switch 1469' and adjusting knobs 1200, 1300 and 1400 until channels 1171, 1172 and 1173 are balanced, as indicated when motors 1267, 1367 and 1467 cease operation: any other suitable means of indicating balance of the respective channels may be provided if desired. As soon as motor 1267 ceases running switch 1269 can be closed, and the same is true for motors 1367 and 1467 and switches 1369 and 1469 respectively. No particular order need be followed in operating these switches: as soon as all are closed the Automatic Pilot is in full control of the craft, as will now be described.

Taking aileron channel 1171 as an example, and assuming switch 1247 closed in an upward direction as seen in Figure 21, it will be at once apparent that if sliders 1190 and 1191 are equally displaced from the centers of their windings, in the same direction, they are at the same potential, and that if sliders 1207 and 1210 are equally displaced from the centers of their windings, in the same direction, they also will be at the same potential. Then, if slider 1227 is at center tap 1231, there is no potential difference between input terminals 1257 and 1260 of amplifier 1256 and motor 1267 is not energized. The input circuit for amplifier 1256 may be traced from terminal 1257 through conductor 1235, center tap 1231, some portion of winding 1230 unless slider 1227 is at center tap 1231, slider 1227, conductor 1245, switching contact 1246, fixed contact 1250, conductor 1252, the portion of winding 1237 between conductor 1252 and slider 1243, the slider, conductor 1255, slider 1191, bridge 1180, slider 1190, conductor 1182, slider 1207, bridge 1181, slider 1210, and conductor 1266 to input terminal 1260.

The system is set up initially so that with the craft level about its roll axis, slider 1207 is at the center of winding 1213; with the craft heading in the desired direction slider 1210 is at the center of winding 1214; and with the ailerons streamlined, the slider 1191 is at the center of winding 1195. Then if sliders 1227 and 1190 are manually set at the centers of their windings, the input circuit is completely balanced.

If the craft rolls, winding 1213 is displaced so that its center does not coincide with the position of slider 1207; bridge 1181 is unbalanced, voltage appears across the input to amplifier 1256 and motor 1267 is energized. The motor is connected so that it operates to drive slider 1191 in such a direction as will unbalance bridge 1180 to give an output voltage equal in amplitude and opposite in phase to that due to unbalance of bridge 1181; when this condition is reached the input terminals of amplifier 1256 are again at the same potential and operation of motor 1267 ceases. The motor has however adjusted ailerons 1274 concurrently with slider 1191, and correction of the roll of the craft follows. This return winding 1213 toward its normal position, reducing the unbalance voltage from bridge 1181. That from bridge 1180 is now the greater and results in an opposite signal at the input terminals of amplifier 1256, initiating reverse operation of motor 1267 to rebalance bridge 1180 and return the ailerons to streamline position.

It will be evident that the displacement of winding 1214 with respect to slider 1210, while occurring on change in the heading of the craft as sensed by directional gyroscope 1170, has exactly the same sort of action in the aileron channel, and that as a matter of fact both of these sliders can be displaced at the same time, in the same or opposite directions, depending on movement of the craft, the resulting operation of the motor 1267 being determined by their relationship. Since this channel of the Automatic Pilot controls the ailerons, the structure is arranged so that roll of the craft as sensed by vertical gyroscope 1167 has greater effect on the amplifier than change of heading of the craft as sensed by the directional gyroscope; such requirements are not necessary to an understanding of the present invention, and are not given in detail.

Under some conditions the craft may not be symmetrically loaded, for example if one wing tank is full and the other empty. In such cases it is necessary that the control surface—here the ailerons—be maintained in a condition other than the normal streamlined state, and this may be accomplished by manual operation of knob 1200, which moves slider 1190 away from its central position, unbalancing bridge 1180 and supplying voltage to amplifier 1256. Operation of motor 1267 results, moving slider 1191 to rebalance the bridge and simultaneously setting ailerons 1274 at a new position. The human pilot sets knob 1200 as the occasion demands at any time after flight under control of the Automatic Pilot is established.

Rudder channel 1172 of the Automatic Pilot is constructed like the aileron channel, and operates in exactly the same fashion, except that in this channel the primary control is exerted by the directional gyroscope instead of by the vertical gyroscope.

Turn control circuit 1225 is effective in both the aileron and rudder channels. When knob 1244 is rotated slider 1227 is displaced from its central position, and a voltage appears across windings 1236 and 1237 determined in amplitude and in phase by the amount and direction of the displacement of the slider. A first portion of this voltage, determined by the setting of slider 1243, appears in the input to amplifier 1256 and may be rebalanced by motor operation of slider 1191 concurrent with adjustment of ailerons 1274. A second portion of this voltage, determined by the setting of slider 1242, appears in the input to amplifier 1356, and is rebalanced by motor operation of slider 1291 concurrent with adjustment of rudder 1374.

As a result of the adjustment of rudder 1374 and the ailerons 1274 the craft begins to turn, and this turn would normally cause movement of sliders 1307 and 1210, which would nullify the signal from slider 1227 and cause the craft to stop turning. This is prevented by the engagement of switching contact 1168' with one of fixed contacts 1169' and 1170', which occurs as soon as knob 1244 is rotated. The caging mechanism of the directional gyroscope is accordingly energized, returning sliders 1307 and 1210 to their central positions and holding them there as long as knob 1244 is displaced. When knob 1244 is returned toward its central position, channels 1171 and 1172 are unbalanced, motors 1267 and 1367 operate in the opposite sense, and when the streamline position—or such other position as is required by the settings of knobs 1200 and 1300—is achieved, the human pilot operates knob 1244 to disengage switching contact 1168' from engagement with either of fixed contacts 1169' and 1170', and the rudder and aileron channels are once again under control of the directional and vertical gyroscopes.

Caging of the vertical gyroscope to prevent it from stabilizing slider 1207 to wipe out the aileron displacement resulting from adjustment of slider 1227 is not necessary, because it is in fact desired that the ailerons be streamlined when the desired bank has been achieved. By properly proportioning the speed of operation of motor 1267 to the speed at which the craft can respond to control surface displacement, vertical gyroscope 1167 may be caused to streamline the aileron—by operation of slider 1207—at exactly the right intervals.

The effect of vertical gyroscope 1167 on slider 1310 in the rudder bridge is secondary, as previously pointed out, and at most results only in reduction of the effect of the signal from slider 1227 in the turn control circuit, not in completely eliminating this signal.

The operation of the elevator channel 1173 of the Automatic Pilot is slightly different, in that network 1381 is not a bridge circuit in the ordinary sense of the word, since the fourth arm of the bridge is not a simple resistance but a parallel combination of resistances. When slider 1416 is at center tap 1420, the resistance between terminal 1403 and center tap 1420 is equal to the resistance of resistor 1422. The voltage drop in each half of winding 1417 is the same, so that the unbalance of network 1381 by displacment of slider 1416 from center tap 1420 is of the same sense, regardless of the direction of the displacement. This is needed because the craft tends to nose down when it rolls, regardless of whether it rolls to the left or to the right.

With this exception in mind, and asssuming that switch 1447 is closed toward the right as seen in Figure 21, the operation of the elevator channel is the same as that recited in detail in connection with the aileron and rudder channels. The pitch axis control of slider 1407 is arranged to have a greater effect on the position of elevators 1474 than the roll axis control of slider 1416, and no modification of the elevator channel results from operation of the turn control knob 1244.

The operation of the throttle channel of the Automatic Pilot is no different in principle from that of the channels just described. Scale 1498' is so graduated that the amount of displacement of slider 1494' along winding 1492', and therefore the voltage from secondary winding 1487', added in the input to the throttle channel amplifier is the same in value and opposite in sense, for a given setting, such as 150 miles per hour air speed, as the voltage from bridge 1481 due to movement of slider 1494 by air speed responsive member 1166 when the craft is actually moving at 150 miles per hour with respect to the air, and so on. When the craft has achieved uniform flight at the desired air speed, the human pilot closes switch 1480 downwardly as seen in Figure 22, after setting knob 1498 to this speed. Since throttle 1484 is at this time in a position such as to cause motion of the craft at the air speed called for by knob 1498, the system is in balance.

If for any reason the air speed of the craft changes, slider 1494 is moved by air speed responsive member 1166, unbalancing bridge 1481 and so applying a voltage to amplifier 1482. Motor 1483 is energized, operating throttle 1484 and moving slider 1497 to rebalance the bridge. The change in position of throttle 1484 causes a corresponding change in the air speed of the craft, resulting in opposite unbalance of the bridge and hence in movement of the throttle in the opposite direction, at least partially reversing the condition previously recited. The system achieves a new balance in which the actual air speed differs from its former value by an amount called the "droop" of the system: this type of operation is inherent in systems of this sort, and is well known to those skilled in the art.

61

The lock out circuit

One safety feature of the system as a whole requires special discussion. In Figures 13 and 14 there are shown two networks 196 and 315, which are of identical structure. Networks of the same structure are shown in Figure 15a at 1530, associated with amplifier 506, and in Figure 15b at 1531, associated with amplifier 574, and at 1532, associated with amplifier 735.

Network 1530 comprises a series circuit including a resistor 1533, a rectifier 1534, and the parallel combination of a resistor 1535 and a capacitor 1536: the series circuit is connected across the circuit to amplifier 506 by conductors 520 and 1537 and ground connections 1540 and 517. The network acts as a rectifier and filter to energize a conductor 1367 with unidirectional voltage whenever the circuit controlled by amplifier 506 is not balanced.

Network 1531 comprises a series circuit including a resistor 1542, a rectifier 1543, and the parallel combination of a resistor 1544 and a capacitor 1545: the series circuit is connected across the input to amplifier 574 by conductors 610 and 1546 and ground connections 1547 and 606. The network acts as a rectifier and filter to energize conductor 1367 whenever the circuit controlled by amplifier 574 is not balanced.

Network 1532 comprises a series circuit including a resistor 1550, a rectifier 1551 and the parallel combination of a resistor 1552 and a capacitor 1553: the series circuit is connected across the input to amplifier 735 by conductor 776 and 1554 and ground connections 1555 and 774. The network acts as a rectifier and filter to energize conductor 1367 with unidirectional voltage whenever the circuit controlled by amplifier 735 is not balanced.

In the upper right corner of Figure 15a there is shown a lock out amplifier 1560 having power terminals 1561 and 1562 energized from source 155 through bus 369 and ground connections 1563 and 371. The amplifier also has input terminals 1564 and 1565, the latter grounded as at 1566. The other input terminal 1564 of the lock out amplifier is connected to all the networks just described by conductor 1367. Accordingly, whenever there is an alternating voltage unbalance in one or more of the distance converters, the bearing converter, the angle telemetric system the $x_d$ network or the $y_p$ network, pulsating unidirectional voltage is supplied by conductor 1367 to the input of lock out amplifier 1560. The polarity of this voltage does not reverse with reversal in the phase of the alternating voltage.

Amplifier 1560 has a pair of output terminals 1570 and 1571, the latter being grounded as at 1572. Terminal 1570 is connected by conductor 1573 to one end of winding 1111 of relay 1110 (Figure 16), the other end of the winding being grounded as at 1574, and to one end of winding 682 of relay 680 (see Figure 21), the other end of the winding being grounded at 1575.

Whenever amplifier 1560 supplies an output voltage, in response to voltage from any of the rectifying and filtering networks, relay 1110 is energized: movable contact 1113 engages fixed contact 1107, bringing conductors 1114 and 1115 to the same potential and thus reducing to zero the signal being supplied for control of the air speed of the craft. At the same time relay 680 is energized: movable contacts 676 and 677 engage fixed contacts 678' and 679', thus short circuiting the precessing motor to give dynamic braking, and also completing the normal turn control circuit, interrupting the supply of voltage from conductors 1253 and 1254.

Amplifier 1560 is of such a nature as to require an input voltage of a selected minimum magnitude before operation of the amplifier takes place: no amplifier output results from any applied unidirectional voltage below this minimum. By this means performance of incorrect control of the craft due to temporary unbalance of any of the control circuits is prevented. In particular, temporary unbalances which may occur at the moment of shifting from one section of the course to the next, are made incapable of causing change in the movement of the craft. It is obvious that the telemetric systems associated with tuning the airborne radio instruments may be coupled to the lock out amplifier by similar means, if this is considered desirable.

The complete system of Figure 12

The system as a whole is shown in Figure 12; since enlarged views of the Present Panel and Pilot's Indicator Panel are shown in Figures 23 and 24 respectively, these components are represented only in outline in Figure 12. For the sake of clarity of illustration, the cruise-land switch is shown in Figures 12 and 15b as a simple manually operated arrangement: in practice the switching components of this arrangement are preferably built into a junction box to which the various components may be conveniently connected, and is solenoid-actuated in response to a simple manual switch preferably located on the Pilot's Indicator Panel. Reference numeral 1163 thus is used to refer to means for broadly causing performance of the switching function.

All the components shown in Figure 12 have already been discussed, and are identified by the reference numerals originally assigned them, except that in this figure the tuning control connection between the Preset Panel 86' and the Omnidirectional Range receiver and Distance Measuring Equipment interrogator are this time explicitly shown at 1376 and 1377. The structure of indicator 60 is also more completely shown in Figure 12 than heretofore, and the computer is shown as including a warning lamp 110' which indicates to the navigator when each section of the flight is completed. If the schedule distance computer is to be used in early sections of the flight, this warning is necessary so that the navigator can tell where to set knob 75 at the beginning of each leg to compensate for departure from schedule, as discussed hereinbefore.

A few units appear in Pilot's Indicator Panel 87' of Figure 24 which are not shown in Figure 9: these units include main switch 370" and pilot light 368', "Orbit" pilot light 622, and switches 118 and 825. These units appear in Figure 15a and were discussed in connection with that figure: they are mounted on the Pilot's Indicator Panel in the interests of ease of operating the system. Indicator 104 is as discussed in connection with Figure 31.

The indicator for off-track distance

Indicator 103 is shown in Figure 24 as having a long pointer and a short pointer. Both the dial 1581 and the outline of the pointers of this indicator are made distinctive from those of indicator 104, in order to minimize the possibility of confusion of the two instruments. The short pointer 1582 of indicator 103 is driven by the long pointer 1583 through a 10 to 1 gear reduction. The slider 564 of the off-track distance potential divider 562 (Figure 15a) is driven at a 20 to 1 gear reduction as compared to the long pointer 1583.

The instrument is set up so that when the craft is on its proper course, as selected by knob 106, both the long pointer and the short pointer of this indicator are at zero. As the craft moves to left or right from the desired path the long pointer moves counterclockwise or clockwise away from zero, so that when the craft is five miles to the left of the desired course, for example, the long pointer has moved counterclockwise to 5. If the craft goes still farther away from the desired path, the long pointer continues past the center 5 mile indication, and its reading at 6 miles displacement could be confused with its reading at 4 miles displacement to the right except that short pointer 1582 is displaced to the left of zero by slightly more than half a scale unit. It is thus apparent that observation of both pointers of the indicator gives definite information as to the location of the craft with respect to the desired path. As illustrated in Figure 24, the indicator shows that the craft is exactly twenty miles to the right of the desired path.

It is to be noted that the zero position of both pointers of indicator 103 can be brought about for any selected track, by operation of knob 106, and need not refer to the central track. Although it is primarily intended that change of the craft from one track to another will be brought about automatically by use of knob 106, it may be that for temporary movements from track to track the pilot prefers to fly the craft directly or by manual control of the Automatic Pilot, using the pointers of indicator 103 as a Pilot's Direction Indicator.

A special use of this feature of the invention is to be found when localized storms lie along the chosen path. It may be that even the outermost track is still in the disturbed area, but that the area extends only a little farther in that direction. In these circumstances the pilot is able to control the craft directly or by manual adjustment of the Automatic Pilot, and to follow a path parallel to the farthest track but displaced even farther in the desired direction by any selected distance which is within the range of reliable reception and transmission of the radio equipment.

The gear ratios given as relating the pointers of the indicators and the sliders of their respective voltage dividers are based on the use of voltage dividers of conventional structure, that is, with a center tap at the center of a winding extending practically 360° about the center of rotation of the slider. If it is considered preferable, voltage dividers with helical windings, capable of 20 or more complete revolutions instead of only one revolution, can be used. In such a case, the need for a gear reduction between the long pointer and the slider of the voltage divider is of course obviated.

*The complete preset panel*

Figure 23 shows the Preset Panel in complete detail, as set up for a flight described below. In the figure the pilot lamps 90 are hatched to indicate different colors in the transparent jewels through which the light shines: the purpose of this will presently be explained. Apart from this, there is nothing in Figure 23 which has not been previously identified, and the same reference numerals are used as in previous figures.

*Operation of the complete system*

In explaining the operation of the system as a whole, reference will be made to a general view of the course to be flown, given in Figure 25, and a detail view of a portion of this course, given in Figure 26; figures previously described will also be referred to for operation of various components.

Referring first to Figure 25, a flight is to be made from a terminus of departure G to a terminous of arrival $D_{11}$. By reason of the presence of a danger area on the direct line between these points, a flight path having substantially a right angle bend has been laid out on the ground, and divided into sections at the points $D_1$, $D_2$, $D_3$, $D_4$, $D_5$, $D_6$, $D_7$, $D_8$, $D_9$, and $D_{10}$. The sections are identified by the point at which they have been completely traversed: for example section 2 is that between points $D_1$ and $D_2$. The geographic bearing $C_n$ of each straight line portion of the track is determined. Except for sections $D_1$ and $D_3$, all are of the same length, 100 miles. The whole distance from G to $D_{11}$, exclusive of the arc of the turn $D_8$ to $D_9$, is found to be 959.8 miles, so the length of section $D_1$ is 59.8 miles.

Having laid out the desired path, radio stations are now established on the ground, one near the middle of each section: these stations are indicated at $S_1$, $S_2$, $S_3$, $S_4$, $S_5$, $S_6$, $S_7$, $S_8$, $S_{10}$, and $S_{11}$. The cross track offset $x_n$ and the along track onset $y_n$ for each station are accurately measured, the former being considered positive if the station is to the right of the flight path. An orbiting station $S_9$ is now located so that a circle drawn with it as a center is tangent to both straight line paths $D_7$—$D_8$ and $D_9$—$D_{10}$. This is the only station whose location is critical.

Except for station $S_9$, each station has an Omnidirectional Range transmitter and a Distance Measuring Equipment responder. It may be convenient to assign two frequencies to the ODR transmitter for each of these systems, and to use them alternately; if their reliable service areas do not overlap, no confusion will ordinarily result. This has been done with the Omnidirectional Range stations, which radiate on frequencies of 125.4 and 120.8 megacycles.

Such a limited number of frequencies is of course not required, and interference with other local services may sometimes be avoided by judicious selection of frequencies. The responders of the Distance Measure Equipment are shown to operate at a number of different frequencies, in illustration of this point.

Station $S_9$ has no Omnidirectional Range transmitter, and its Distance Measuring Equipment responder must operate at a frequency distinguishable from those of stations $S_8$ and $S_{10}$. This station serves section 9 only, and is used solely for orbiting purposes. As discussed in connection with Figure 15a and Figure 15b, all the settings of the Preset Panel during orbiting except $x_n$, indicated on counters 96, must be the same as for the ensuing section, the orbiting station being separately switched to replace the regular station for control of the cross track channel of the computer.

There follows a typical tabulation of data of interest to those planning to fly the selected course using the system comprising the invention.

| Section No. | Station No. | Radio Frequency | | Track Bearing | Offset | Onset | Orbiting | |
|---|---|---|---|---|---|---|---|---|
| | | Bearing | Distance | | | | Frequency | Offset |
| 1 | $S_1$ | 125.4 | 1108 | 30.4 | +7.4 | −20.0 | | |
| 2 | $S_2$ | 120.8 | 1064 | 30.4 | +20.0 | −44.6 | | |
| 3 | $S_3$ | 125.4 | 1108 | 30.4 | −10.1 | −60.0 | | |
| 4 | $S_4$ | 120.8 | 1064 | 30.4 | 0.0 | −39.1 | | |
| 5 | $S_5$ | 125.4 | 1121 | 30.4 | +26.1 | −40.0 | | |
| 6 | $S_6$ | 120.8 | 1049 | 30.4 | +6.6 | −60.1 | | |
| 7 | $S_7$ | 125.4 | 1086 | 30.4 | −6.7 | −49.2 | | |
| 8 | $S_8$ | 120.8 | 1064 | 30.4 | +4.9 | −39.5 | | |
| 9 | $S_9$ | 125.4 | 1108 | 116.7 | +16.2 | −50.0 | 1089 | −19.9 |
| 10 | $S_{10}$ | 125.4 | 1103 | 116.7 | +19.9 | −50.0 | | |
| 11 | $S_{11}$ | 120.8 | 1064 | 116.7 | +23.3 | −51.1 | | |

Suppose a number of regular tracks are established spaced by 10 miles, as shown in Figure 26, three on each side of the center line, which is the flight path originally laid out, and suppose that at a given altitude craft are allowed to travel in the same direction on all six tracks. These tracks are identified in Figure 26, and it will be seen that track number 6 is 25 miles to the right of the center line. Since station $S_9$ in Figure 25 is only 16.2 miles from the center line, it is apparent that track No. 6 cannot be used in section 9 or in portions of sections 8 and 10. Ordinarily such a station location would be avoided.

For any craft proceeding from G to $D_{11}$, the data given in the foregoing table are pertinent, regardless of what track is being followed or what is the scheduled air speed. The Preset Panel may accordingly be set up as shown in Figure 23, where it is indicated as designed to serve a course having a maximum of twelve sections, and as providing one extra or "emergency" leg for special use.

In the present case section number 9 is that during which a turn is to be made. Pilot light 90 associated with this leg is accordingly provided with a blue jewel, to distinguish it from sections 1–8, 10 and 11 which involves no changes of course and are accordingly provided with green jewels. Eleven is the total number of sections in the course, so the pilot light for the twelfth section is given a brown or amber jewel to indicate that it does not require presetting. The jewel for the emergency leg is red.

The radio maintenance crew at the originating airport adjusts the various counters in the Preset Panel in accordance with the data in the table. Thus using leg 5 for an example, the telemetric transmitter which is to control the automatic tuning of the Omnidirectional Range receiver is adjusted so that when placed in control of the tuning system of the receiver the latter will be tuned to 125.4 megacycles. The telemetric transmitter which is to control the automatic tuning of the Distance Measuring Equipment receiver is adjusted so that when placed in control of the tuning system the receiver will be tuned to 1121 megacycles. The telemetric transmitter which is to control the angle circuit of the Navigating Computer is adjusted so that when placed in control of the circuit the angle will be adjusted to a value of 30.4 degrees. The potential dividers used to coordinate the cross track and along track channels of the Directional Computer with the location of the ground station relative to the selected path are set at the resistance equivalents of 26.1 miles and —40.0 miles, respectively.

The selector switch in the Preset Panel must be reset to a zero position in which it is ready to advance its switch arms to engage the first set of fixed contacts, associated with the first section of the flight.

The proper connection must also be made to switches 536 and 809 (see Figure 15a). In accordance with the previous discussion it is necessary, for the particular path being followed, that contacts 1-8, 10 and 11 of switch 536 be connected to conductor 541, and that contact 9 be connected to conductor 846. In the same fashion contacts 1-8, 10 and 11 of switch 809 must be connected to conductor 838, and contact 9 to conductor 839. It is of course within the skill of the ordinary radio engineer to design a plugging board for making rapid changes in the wiring of these switches. As a practical matter, however, for routine operation, it is much more efficient to provide a sufficient number of Preset Panels so that each may be set up permanently for a particular path and not readjusted thereafter between the periodic checks on its condition.

The Navigating Computer and Pilot's Indicator Panel are permanent parts of the craft, and will have been put in a "normal" condition by the ground crew. In the normal condition of the Pilot's Indicator Panel of Figure 24, both hands of indicators 103 and 104 are at zero, switches 370" and 1163 are in their central "off" positions, switch 118 is in its "Track" position, switch 825 is in its "Forward" position, change switch 111 is in its "Automatic" or downward position, and knobs 106 and 107 are set at the centers of their ranges.

In the normal condition of the Navigating Computer of Figures 15a and 15b and 16 motors 573, 734 and 984 are deenergized in a position such that sliders 564, 640, 722, 954, 966, 974 and 975 are at the taps of their respective windings; indicators 103, 104 and 60 then read zero as just pointed out. The position of motors 314 (Figure 14), 173 (Figure 13) and 486 (Figure 15a) and their associated sliders 252, 253, 400 and 401, 142 and 394, and 480 and 481 are not critical, since they automatically adjust themselves to any conditions of proposed flight.

When the flight is about to begin, the pilot is assigned a scheduled track number and ground speed, say for example track number 5 and ground speed 225 miles per hour. At the same time the navigator or radio operator is given a previously adjusted and checked Preset Panel, and is informed of the length of the last section of the path. The craft which is to make the flight is of course equipped with an Automatic Pilot giving control of ailerons, rudder, elevators and throttles, to ensure straight, level, directed flight at a constant altitude and air speed, and with the air-borne components of the Instrument Landing System, in addition to the Navigating Computer and the Pilot's Indicator Panel of the present system, both properly adjusted as just described.

Upon taking over the craft from ground personnel, the pilot sets knob 107 of Figure 24 to 225 and knob 106 to position 5. Knobs 1200, 1300 and 1400 (Figure 21) are in their central positions, and knob 1158 (Figure 2) is in its "off" position. By conventional switching means not shown in Figures 21 and 22 the gyroscopes of the Automatic Pilot are next brought up to speed and its amplifiers are warmed up in readiness to operate. The heaters of the amplifiers of the Directional Computer, of the Bearing and Distance Converters, and of the various auxiliary telemetric systems, are also energized for warming up by any conventional means not disclosed.

The navigator in the meantime has connected the Preset Panel to the Navigating Computer, the Pilot's Indicator Panel and the components of the Instrument Landing System. After making this connection, he sets knob 75 (see Figures 12 and 16) to the value of $y_g$ for the last section of the flight. This is ordinarily 100 miles since, as previously pointed out, the off schedule distance control is used only in the final leg of the flight, which is generally of the normal length. The amplifiers of the Scheduling Computer are not yet energized, because it will be hours before the last leg of the flight approaches. The Instrument Landing System receivers are not yet energized either, unless it is desired to take off along the back beam of the Instrument Landing System, but the Azimuth Coupling Unit must be energized and warmed up ready for use.

The take-off is performed manually by the human pilot. As the flight begins the pilot closes switch 370" (Figure 15a) to its "Navigate" position and then proceeds to take off manually in the usual fashion, following the prescribed procedure for a craft assigned to track number 5, by gaining the desired altitude and achieving the desired heading before reaching the terminus of departure.

By reason of the fact that the indicator 104 has been reset to zero, contacts 112 and 113 are in engagement. When switch 370" is closed, actuator 800 is energized through slow acting relay 826' which is energized from bus 329 through switch 11, switch 809', conductor 838, pole changer 808', and contacts 112 and 113. Accordingly the selector switches are advanced to the position in which the Navigating Computer and the Bearing and Distance Converters are controlled in accordance with the constants of section number 1 of the flight. Switch arm 818 is advanced to the next contact 819, but the contacts of this switch are of the shorting style, and no interruption of this circuit, and hence no second operation of the actuator results.

It is unlikely that the frequency of the Omnidirectional Range transmitter in the first leg of the present flight is the same as that to which the receiver was last tuned. The telemetric system of this receiver is accordingly unbalanced, and the tuning mechanism operates to balance the telemetric system and at the same time tune the receiver to a frequency of 125.4 megacycles. When the station is tuned in, sliders 252 and 253 in Figure 14 are in a position corresponding to the last bearing of the craft from some transmitting station, determining the phase of the voltages on suppressor grids 266 and 267 relative to the impulse voltage on control grids 262 and 263. Since the receiver is now tuned to a different station, however, the phase angle is no longer that required to cause equal discharge of pentodes 205 and 206, indicator 207 departs from its center zero position and essentially unidirectional signal voltage is applied to unit 312. Here it is converted to an alternating signal voltage having the frequency of source 155, whose phase and amplitude are determined by the polarity and magnitude of the unidirectional signal voltage. This alternating signal voltage is supplied to amplifier 313, and energizes motor 314 for operating shaft 301 in a direction to reduce the signal voltage. The latter is also applied to lock out amplifier 1560 (Figure 16), which actuates relays 1110 and 680 (Figure 21) into their energized positions in which no control function can be initiated by the Navigating Computer.

Operation of motor 314 (Figure 14) causes generator 333 to supply a voltage which opposes the alternating signal voltage, but which does not entirely wipe it out, since if the voltage difference between them is not above a minimum value the motor begins to slow down, thus reducing the output of the generator and effectively increasing the signal to the amplifier. An equilibrium point is reached, for any given value of signal voltage, in which a residual difference voltage sufficient to maintain the particular speed of the motor is maintained. The larger the signal, the faster the generator must be driven to wipe out all but this residual voltage, and the smaller the signal, the slower the generator must be driven. The arrangement thus gives automatic reduction in the rebalancing rate as the condition of rebalance is approached. While the generator voltage can exceed the signal voltage if the latter decreases exceptionally rapidly, this is not ordinarily encountered in practice.

Operation of motor 314 acts through shaft 301 to rotate knob 256 and with it sliders 252 and 253 until the voltage on the suppresson grid of one pentode leads the impulse voltage by 90 degrees, and the voltage on the suppressor grid of the other pentode lags the impulse voltage by 90 degrees. The plates are now at the same potential, indicator 207 is at its center zero position, no signal is being supplied by converter 312, and operation of motor 314 ceases. No voltage appearing at the input to amplifier 313, there is accordingly no voltage supplied to the lockout amplifier through rectifier 362, and as far as the bearing converter is concerned, the lockout amplifier is deenergized and the relays may be released.

The Omnidirectional Range as described above has a 180 degree ambiguity, and the pilot should initially check the indication of knob 256 on dial 257 with his compass. The bearing of the air strip from each of the commonly used first radio stations is of course known, and if desired the pilot can manually set knob 256 to the approximate bearing angle, so as to prevent the system from coming to balance in the 180 degree position.

The operation of motor 314 or hand knob 256 results in rotation of shaft 37 to a position determined by the bearing of the craft from the first ground station $S_1$. By this means angle B for the first leg of the flight is set into the computer through differential 420 in Figure 15a: for the flight charted in Figure 25, B would be approximately 215 degrees, depending on the exact location of the air strip with respect to terminus G.

A second operation taking place when the selector switch is advanced to its section 1 contacts is the energization of the telemetric system for controlling tuning of the Distance Measuring Equipment receiver. This, like the Omnidirectional Range receiver, is unlikely to be tuned to the correct station for the ensuing flight, and the resulting unbalance of the telemetric system operates the tuning mechanism to bring about rebalance and at the same time to tune the receiver to a frequency of 1108 megacycles.

When the station is tuned in, slider 142 in Figure 13 is at a position corresponding to the last distance between the craft and some transmitting station, where it made the potential of fixed contact 151 equal to that of fixed contact 150. Since the receiver is now tuned to a different station, however, the potential of contact 151 is no longer equal to that of contact 150, and movable contact 147 impresses an alternating voltage upon the input of amplifier 160 and also upon the input of lockout amplifier 1560, which accordingly holds relays 680 and 1110 in their energized positions.

Energization of amplifier 160 causes operation of motor 173 in a direction to reduce the signal to the amplifier. Generator 184 cooperates with motor 173 just as was described in connection with the Bearing Converter, and a residual voltage maintains operation of the motor, adjusting slider 142 along winding 143 until fixed contact 151 is brought to the same potential as fixed contact 150. Operation of motor 173 then ceases, and since there is no input voltage to amplifier 160, no voltage is supplied to the lockout amplifier through rectifier 199, and as far as the Distance Converter is concerned the lockout amplifier is deenergized and relays 680 and 1110 may be released.

The operation of motor 173 results in rotation of shaft 36 to a position determined by the distance of the craft from the first ground station $S_1$. By this means distance $d$ for the first leg of the flight is set into the computer by adjustment of slider 394 in Figure 15a: for the flight charted in Figure 25, $d$ would be approximately 40 miles, depending on the exact location of the ground strip with respect to terminus G.

A third operation taking place when the selector switch is advanced to its section 1 contacts is the energization of the telemetric system for adjusting the input to differential 420 of Figure 15a, which is to be proportional to angle $C_1$. This is accomplished by the operation of switches 453, 454, 455, 456 and 457, which function to energize sliders 425 and 426 of the first endless voltage divider 427 by connecting it to rebalancing voltage divider 477. In the setting up of the Preset Panel, sliders 425 and 426 of the first voltage divider have been set to a position corresponding to an angle $C_1$ of 30.4 degrees, and if sliders 481 and 480 of potential divider 477 are not at the corresponding position on winding 477, a voltage appears between sliders 425 and 426 and is impressed on amplifier 506 and also, through rectifier 1534, on lockout amplifier 1560. Energization of amplifier 506 causes rotation of motor 486 in a direction to move sliders 480 and 481 so that the voltage between sliders 425 and 426 is reduced to zero and at the same time provides a mechanical input into differential 420. Velocity generator 494 operates in the same fashion in this telemetric system as it did in the Distance and Bearing Converters previously discussed. When sliders 480 and 481 assume the proper position as determined by the manual settings of sliders 425 and 426, amplifiers 506 and 1560 are no longer energized. Rotation of motor 486 ceases, and the lockout amplifier is free to release relays 680 and 1110 as far as the angle circuit is concerned, and the mechanical input into differential 420 corresponding to an angle of (90+30.4)

degrees has been completed.

By the means described above it is now evident that slider 394 has been adjusted on winding 393 to a position determined by the distance of the craft from a particular transmitting station $S_1$, and that sliders 400 and 401 have been adjusted with respect to windings 396 to a position which is determined by the difference between 90+C, put into the differential by motor 486, and B, put into the differential by shaft 37. The vector network is accordingly coordinated with the first leg of the flight to be traversed.

A fourth operation taking place when the selector switch is advanced to its section 1 contacts is the insertion in the cross track channel of the Directional Computer of an independently energized, preset voltage divider whose setting is proportional to $x_1$. This is accomplished by switches 533 and 539, and this completes the circuit from conductor 542 of Figure 15a to conductor 535.

A fifth operation taking place when the selector switch is advanced to its section 1 contacts is the insertion into the along track channel of the Directional Computer of an independently energized voltage divider preset to the value of $y_1$ for the first section of the course. This is accomplished by switches 706 and 712, and results in completing the circuit of the along track channel of the computer from conductor 715 to conductor 423.

A final function performed by movement of the selector switch to its section 1 contacts is the energization of the pilot lamp 90 associated with the constants for section 1 on the Preset Panel: this is accomplished by switch 794. Switch 536 of the selector switch has advanced to its section 1 contact also, but in this position it simply completes the circuit from conductor 535 to conductor 541, establishing the normal condition of the cross track channel of the Directional Computer.

Since the pilot has already set knob 106 to the position corresponding to track number 5, the Directional Computer is now in full normal operation, the cross track channel proceeding at once to operate in accordance with Equation 1, and the along track channel proceeding to operate in accordance with Equation 2. If the actual location of the craft is not such as will satisfy Equation 1, the cross track channel is unbalanced, and a voltage is supplied to amplifier 574 and lockout amplifier 1560. Amplifier 574 energizes motor 573 for operation in such a direction as to reduce the voltage coming to the amplifier, and also for driving velocity generator 590 which functions in cooperation with motor 573 in the manner previously described. The unbalance of the cross track channel is reduced by movement of slider 564 in accordance with operation of motor 573, until it takes a position such that the channel is again balanced. When this condition has been attained, input to the amplifier 574 and also to lockout amplifier 1560 is again reduced to zero, operation of motor 573 ceases, and so far as the cross track channel of the Directional Computer is concerned, the lockout amplifier is deenergized and relays 680 and 1110 may be returned to their deenergized position.

Operation of motor 573, in addition to positioning slider 564, also positions transmitter 631 of telemetric system 632. Receiver 634 of the system accordingly operates, setting indicator 103 to a position other than its central zero position, indicating to the pilot that he is not yet on the desired track. At the same time slider 640 is moved along winding 642, providing an alternating voltage to the input of modulator 650. A unidirectional voltage accordingly appears across resistor 672, but since knob 1163 is in its central off position, this voltage can be transmitted neither to Azimuth Coupling Unit 33 nor to cross pointer indicator 126.

At the same time that the cross track channel is computing Equation 1, the along track channel of the Directional Computer is operating in accordance with Equation 2. The craft is obviously not located at the end of the first section of the flight, and therefore the along track channel is unbalanced, and operation of motor 734 is initiated under the control of amplifier 735, the latter being energized simultaneously with energization of the lockout amplifier 1560. Operation of motor 734 moves slider 722 to such a position that the along track channel of the Directional Computer is once again balanced. Operation of velocity generator 752 in cooperation with motor 734 is the same as previously described. When the along track channel of the computer is balanced, the input to amplifier 735 becomes zero, and operation of motor 734 ceases. Balance of the along track channel also removes the signal from the lockout amplifier from this source, and permits relays 680 and 1110 to be returned to the deenergized position, so far as the along track channel of the Directional Computer is concerned.

Operation of motor 734 to rebalance the along track channel by means of slider 722 also actuates transmitter 781 of the remote indicating telemetric system 782. Receiver 784 accordingly operates, adjusting the indication of indicator 104 so that it shows the present distance of the craft from $D_1$. As the pointer 114 of indicator 104 begins to move from zero because of energization of telemetric system 787, contacts 112 and 113 disengage, deenergizing actuator 800 in preparation for the next operation.

The position of slider 954 in Scheduling Computer 79 is also adjusted by operation of motor 734, but since the Scheduling Computer is not at present energized, no functioning of this computer results.

The foregoing operations may take place either just before the craft takes off, or during its initial take-off when it is being controlled manually by the human pilot. The prescribed take-off procedure is of course such as will bring the craft almost exactly on the desired course, with sufficient time for the human pilot to trim the craft and the Automatic Pilot for straight, level, directed flight, which is done as described above, and place the Automatic Pilot in control of the craft, before the terminus of departure is reached. In addition to the prescribed procedure referred to above, the indication of the cross track indicator 103 is of material assistance to the pilot in bringing the craft quickly to the desired track, and the indications of the along track indicator 104 also give him continuous information of his approach to the terminus of departure: the distance of the latter from $D_1$ is of course known. By the time point G is reached the aircraft should be fully controlled by the Automatic Pilot, and very nearly exactly on the desired path.

To establish full control of the craft by the Navigating Computer it is necessary that knob 1163 be moved to its "Cruise" position and that knob 1158 be moved to its "Navigate" position. The former determines that the input to the Azimuth Coupling Unit is from the computer, and the latter supplies outputs from the Azimuth Coupling Unit to the turn control circuit and the precessing motor of the directional gyroscope of the Automatic Pilot. Both of these knob settings can be made at any time after the Automatic Pilot has been placed in control of the craft and the cross track and along track channels of the computer have reached an initial balance; it is not necessary to wait until the terminus of departure is reached to do this. Until it is done, however, the human pilot must watch indicator 103, because with simple Automatic Pilot control the heading of the craft, and hence its direction of movement, is determined solely by the directional gyroscope. The presence of variable or uncompensated cross winds may under these conditions cause the craft to drift away from the desired path although its heading may not change.

Once the computer is placed in control of the craft its heading, while stabilized by the directional gyroscope as before, is subject to overriding control from the computer on departure of the craft from its desired path, as will be explained in detail, so that the heading of the craft is altered if necessary to keep it on the path.

Operation of knob 1163 to its "Cruise" position is effective, as shown in Figure 15b, to energize the Azimuth Coupling Unit from the cross track channel of the Directional Computer by switch 685, and to energize the vertical needle of the cross pointer indicator from the same source, by switch 1034. At the same time switch 1140 short circuits the input to the Glide Path Coupling Unit, and switches 1080 and 1120 are connected to energize the horizontal needle of the cross pointer indicator and the air speed control members of the Automatic Pilot from the output of the Scheduling Computer. Since the latter is not energized, however, no control or indication is accomplished thereby.

Operation of knob 1158 to its "Navigate" position actuates switch 1247 into its downwardly closed position, so that voltage from Azimuth Coupling Unit 33 is added in the turn control circuit of the Automatic Pilot if slider 640 is displaced from its central position so that a signal is supplied to the Azimuth Coupling Unit. Switch 1447 is not affected in the "Navigate" position of knob 1158, but further switching means not explicitly shown are effective to supply on connection 1169 a second voltage which energizes the precessing motor of directional gyroscope 1170, if slider 640 is displaced from its central position so that a signal is supplied to the Azimuth Coupling Unit.

From the foregoing discussion it is apparent that the Directional Computer has been manually and automatically adjusted to the constants of the first section of the course before the craft leaves the ground. As the craft moves with respect to station S₁, the value of angle B changes, altering the phase of the control grid voltage as compared to the screen grid voltage in the pentodes of the Omnidirectional Range receiver: the Bearing Converter energizes motor 314 as previously described, and causes change in the position of sliders 400 and 401 so that both channels of the Directional Computer become unbalanced.

The movement of the craft during the take-off procedure also changes its distance from station S₁, and this varies the potential of fixed contact 150 in Figure 13. Motor 173 is energized to bring fixed contact 151 to the new potential of fixed contact 150, and shaft 36 is simultaneously operated to adjust slider 394, also unbalancing both channels of the directional computer. Motor 573 rebalances the cross track channel and changes the reading of indicator 103: as the craft approaches the desired track, the indicator approaches its center zero reading more closely, so that the pilot can guide his approach to the track by indicator 103 even before the computer is in control of the craft.

The human pilot also operates the elevators and throttles of the craft so as to bring it to level flight at an assigned altitude and at an air speed which will give the desired ground speed. He then streamlines the elevators, closes switch 1447 to the right as seen in Figure 21, and adjusts manual knob 1400 to maintain the air speed and altitude previously established. During the flight the pilot may, by reference to off-track indicator 103 or cross pointer meter 126, confirm that flight is being properly maintained along the assigned track, and by reference to distance to destination indicator 104 observe the progress of the craft along the track.

Movement of knob 1158 to its "Navigate" position adds the voltage between conductors 1253 and 1254 in series with the other voltages in the aileron and rudder bridges. So long as conductors 673 and 674 in Figure 15b are at the same potential—that is, so long as slider 640 is at center tap 643, because the craft is on its assigned track—conductor 1253 and 1254 are at the same potential, and the aileron and rudder bridges are influenced solely by gyroscopes 1167 and 1170 and manual knobs 1200 and 1300. If, because the craft is not on its assigned track, slider 640 is displaced from center tap 643 the resulting voltage between conductors 673 and 674 acts on coupling unit 33 to supply at conductors 1253 and 1254 an alternating voltage of one of the two opposite phases affecting the aileron and rudder bridges. The connection is such that operation of the servomotors 1367 and 1267 is in a direction to cause the craft to turn back toward the course, and the motor operates until the voltage changes caused by movements of sliders 1191 and 1291 nullify the voltage appearing between conductors 1255 and 1355 and conductor 1235. Turn of the craft results, causing return to the assigned track, reduction in the voltage supplied at conductors 1253 and 1254, and rebalancing of the bridge as will be more fully pointed out below.

When the craft has assumed straight, level, directed flight at a selected altitude and air speed, fortuitous external forces or cumulative internal errors may cause displacement of the craft about its roll, yaw or pitch axes, and may displace it from its desired location along the assigned track, its position laterally with respect to the assigned track, or its assigned altitude. These displacements are caused, observed and corrected as follows.

First, suppose the craft is changing altitude. This is observed by the human pilot as a change in the reading of a radio altimeter or other altitude sensing instrument, and may be caused by updrafts or downdrafts, or by change in the weight of the craft, due for example to consumption of fuel. It is corrected by slight adjustment of manual knob 1400 in the elevator channel of the Automatic Pilot, which causes the channel balance to occur at a slightly different location of slider 1391 and hence a slightly different position of elevators 1474.

Second, suppose the craft is not making good the required ground speed. This is observed by the human pilot upon checking the time at which the craft completes each section of the course and enters the next: these intervals may be subdivided if it is considered desirable. If it appears that the craft is ahead of schedule or behind schedule, the cause may be change in the strength of the head wind, or perhaps a change in the efficiency of the engine due for example to partial icing of the induction system. The error is corrected, so far as the craft control system is concerned, by slight manual adjustment of throttle control 1498, which changes the magnitude of the voltage supplied from network 1481' as compared with that from bridge 1481, and therefore produces a signal at amplifier 1482 energizing motor 1483 to change the throttle setting until slider 1497 takes a new position in which the bridge unbalance voltage is equal and opposite to that due to displacement of slider 1494'. Adjustment of the air speed by knob 1498 is repeated until the desired ground speed is made good, and must be performed as often as shifting winds or other causes bring about changes in the air speed, so long as the throttles of the craft are under the control of the Automatic Pilot.

As pointed out above, the supervision of the altitude of the craft and of its ground speed are left to the human pilot, with one exception as regards the latter which will presently be pointed out. Supervision of the attitude of the craft about all three axes remains in the Automatic Pilot, through circuits previously traced, even when switch 1247 is closed downwardly as seen in Figure 21. This is because the Azimuth Coupling Unit 33 to which connection 1161 leads from switch 1247, normally comprises simply a resistance in the turn control circuit, and the circuits of the aileron and rudder channel amplifiers are completed through this resistance. The same statement can be made with respect to the elevator channel and switch 1447, with the further explanation that in the "Cruise" position of knob 1163 conductors 1147 and 1150 are short circuited and the elevator channel is the same regardless of the position of switch 1447. Accordingly all the control of the craft about its roll, yaw and pitch axes is normally exerted by the Automatic Pilot and is still exerted when switches 1247 and 1447 are so closed that the Navigating Computer may also influence the craft's movement.

Finally, the supervision of the position of the craft transversely of the assigned track is controlled by the Directional Computer. It has previously been pointed out that whenever the craft is on the assigned track, no voltage appears between conductors 673 and 674, and that when the craft is not on the assigned track a unidirectional voltage of one polarity or the other, depending on the direction of the displacement of the craft from the track, and of variable magnitude determined by the amount of such displacement, appears between conductors 673 and 674. By the action of Azimuth Coupling Unit 33 this voltage appears at conductors 1253 and 1254, Figure 21, as an alternating voltage of reversible phase and variable amplitude, the phase being determined by the polarity of the unidirectional voltage, and the amplitude being determined by the magnitude of the unidirectional voltage, subject to modification when the position of the craft is changing by reason of the rate circuit in the coupling unit. The two phases which this signal can take are the same as the two phases which can be taken by the turn control voltage, since all are based on a common source 155, and hence the coupling unit voltage can be added in the aileron and rudder channels of the Automatic Pilot and completely opposed by operation of sliders 1191 and 1291 just the same as any of the unbalance voltages in these channels. The complete circuit will be traced for one displaced position of the craft.

Suppose the craft is in straight level directed flight, but becomes displaced by translation due to a change in the cross winds so that it is to the left of the desired path. Then, as far as the Automatic Pilot of Figure 21 alone is concerned, all the channels are in satisfactory balance and no operation of servomotors 1267 and 1367 is initiated from this source. The values of $d$ and $B$, however, are such that a value for $x_d$ other than 0 is required to satisfy Equation 1, and the cross track channel of the Directional Computer supplies a signal to amplifier 574 of Figure 15b. Motor 573 operates to adjust $x_d$ by slider 564, and also adjusts slider 640. When $x_d$ has a value that satisfies Equation 1, amplifier 574 is deenergized and an alternating voltage proportional to $x_d$ is impressed upon modulator 650 and appears between conductors 673 and 674 as a unidirectional voltage. This voltage, after modification in Azimuth Coupling Unit 33 by a factor related to its rate of change, appears at the output of the coupling unit as an alternating voltage, of a first phase and amplitude, and is impressed between fixed contacts 1250 and 1251 (Figure 21). Since switch 1247 is closed in a downward direction, this voltage forms a part of the turn control circuit, and is impressed upon the aileron and rudder channel amplifiers, to cause operation of the rudder and ailerons in the proper direction to put the craft in a coordinated turn to the right.

As the craft begins to turn, directional gyroscope 1170 would normally begin to insert a signal into the rudder channel of the Automatic Pilot opposing the signal from the approach coupler, since as a matter of fact the latter signal is causing the craft to depart from the heading which the directional gyroscope is to maintain. This would result in the presence of two control functions opposing one another in the rudder channel, and the operation of the system would be impaired. To avoid this, an output from the approach coupler is applied to the precessing motor of the directional gyroscope by connection 1160 causing rotation of the stabilized axis of the gyroscope. The motor is arranged to precess the gyroscope at approximately the same rate as that at which the craft turns, so that as winding 1313 is carried with the craft by its turn in space, slider 1307 is driven by the gyroscope to turn in space as the gyroscope precesses, and therefore no signal due to change of heading is added in opposition to that supplied by the coupling unit, so that the turn can continue to the desired degree, as described above.

As the craft begins to bank for the turn, due to the effect of the coupling unit signal in the aileron channel, vertical gyroscope 1167 begins to insert a signal into the aileron channel, which increases until it wipes out the signal from the Directional Computer, when the ailerons are streamlined. The craft can continue to turn at its present rate, the turn being properly coordinated as has been explained previously.

When the craft begins to move toward the assigned track, the values of $d$ and $B$ change so that the value of $x_d$ is now too great to balance Equation 1 and operation of the cross track channel servomotor 573 in Figure 15a takes place in the opposite direction, with opposite performance of all the functions just recited following therefrom.

There has been no mention in the above of any operation of lockout amplifier 1560. This is because the sensitivity of this amplifier is adjusted so that for normal signals to the various amplifiers to which it is connected the lockout amplifier cannot operate: otherwise no correction of the position of the craft could ever take place. A large signal to any one of these amplifiers, on the other hand, such as results when the selector switch operates at the time of passing from one section of the flight to the next, is sufficient to operate the lockout relay. By this means response of the system to violent temporary and essentially erroneous unbalances, while it is adjusting itself to a new set of parameters, is prevented. Normal response to variation in the distance $d$ and bearing $B$ as they change with relative slowness during flight is permitted.

Suppose now that the craft is in section 2 of the flight, and orbiting is necessary. For station $S_2$ the values of $x_2$ and $y_2$ are given in the foregoing table as 20.0 miles and —44.6 miles. The human pilot watches indicator 104, and when it indicates —44.6 miles he closes switch 118 in its downward position as seen in Figure 24. Lamp 622 (Figure 15a) is lighted, and relay 615 is energized, connecting conductor 541 to conductor 624 and hence supplying to the cross track channel of the computer a voltage which is determined solely by $d$ and which is uninfluenced by variation in $B$. At the moment when the relay was operated, Equation 1 was satisfied, so that $x_d = x_2 + d \cos(90° + C_2 - B) - x_t$. Operation of the relay changes the value of the right hand side of the equation to $x_2 - d - x_t$, the negative sign of $d$ meaning that the the station is to the right of the craft.

At the point $y_2 = -44.6$ miles, the angle $(90° + C_2 - B)$ is 180°, and its cosine is —1, so that operation of relay 615 does not unbalance the cross track channel of the Directional Computer. Continued movement of the craft in its original direction, however, increases the arithmetic value $d$, and the cross track channel is accordingly unbalanced. The sense of the unbalance is such that motor 573 adjusts slider 640 in the same direction that would ordinarily occur if the craft were to the left of the desired path, and the Automatic Pilot is energized through connections 1169 and 1161 to turn the craft to the right. The line of zero value for $x_d$ is now a circle about station $S_2$ of radius $(x_2 - x_t)$, i. e., 20—15 miles or 5 miles, and the craft follows this line in exactly the same fashion as that set out above for normal straight flight. If knob 1163 had been left in its "off" position, and the craft were being flown manually or through manual control of the Automatic Pilot the deviation from the orbiting circle could be observed by the pilot on the off-track distance indicator 103.

As the craft follows the circle indicator 104 varies about —44.6 miles, increasing to —49.6 miles and decreasing to —39.6 miles. Each time the indicator reaches —44.6 miles, approaching it from a numerically larger value, the craft is passing through the point of tangency of the circular orbit with the assigned parallel track, and by then operating switch 118 normal rectilinear flight may be most conveniently resumed. Such operation of switch 118 extinguishes lamp 622.

Orbiting in the system comprised in the invention should not, of course, be undertaken without permission from the ground personnel, since each orbit crosses all straight line tracks further displaced from the center track than its own, and each intersection of a circular and linear track is a possible location where collision may occur.

By way of further illustration, suppose the craft has been assigned to track 6. Here the track passes to the right of the ground station, and $(90° + C_n - B) = 0$ at the point of tangency, so that cosine $(90° + C_n - B) = +1$. The value for $d$ used must now be positive rather than negative, and switch 625 must be thrown downwardly instead of upwardly. However, the orbits for craft assigned to tracks 5 and 6 are now of the same radius and the craft move in opposite directions around the same circle. This is not desirable—from a standpoint of safety it is not desirable even to have two crafts going in the same direction about a circle if it can be avoided, due to the danger of overtaking of one craft by the other. A craft following track 6 and desirous of orbiting is instructed by radio to cross over to track 5 before beginning the orbit, if that track is not occupied. This maneuver is accomplished simply by moving knob 106 from the setting corresponding to track 6 to that corresponding to track 5. If the cross track channel was balanced at track 6, the change will throw a large signal into the cross track channel, temporarily operating the lockout relay and placing the Automatic Pilot in sole control of the craft until the channel has balanced itself, and then causing the craft to turn to the left and approach the new track just as if the craft had merely been displaced from the track originally assigned. Immediately upon moving knob 106, the long pointer 1583 of indicator 103 makes a complete revolution in a counterclockwise direction, and the short pointer 1582 moves in a counterclockwise direction by one space. As the craft approaches the desired track both pointers reverse and move slowly back until when the craft is on track 5 both pointers are again at zero.

If many of the tracks are occupied, it may be impossible to give clearance for orbiting when landing facilities are so disorganized as to require delay. In such a case, the entire fleet of approaching craft may be instructed to back track, that is, to turn around and follow the same track or an adjacent emergency track in the reverse direction. When it is desired to back track on the same track, the human pilot moves knob 1158 to its "off" position, which closes switch 1247 upwardly to remove the influence of the Azimuth Coupling Unit upon the turn control circuit of the Automatic Pilot, and which interrupts energization of the precessing motor of the directional gyroscope from the Azimuth Coupling Unit. He also turns switch 825 to its "Reverse" position, and then causes a 180° turn of the craft by the turn control knob 1244. During this time the directional gyroscope 1170 is caged. Operation of switch 825 reverses the phase of the voltage representing $x_d$, by energizing phase reverser 565, and also connects the "Reverse" motor in actuator 800, rather than the "Forward" motor, for operation when contact 113 is engaged. Phase reverser 893 in the Scheduling Computer is also actuated, but is ineffective unless this computer is being used. Pole changer 808 is also operated, connecting fixed contact 112' to conductor 838 and fixed contact 112 to conductor 839. After the 180 degree turn is completed, the human pilot reestablishes control of the craft in the computer by turning knob 1158 back to its "Navigate" position.

Reversal of the $x_d$ voltage is necessary because if the craft is at a point to the west of a North and South line, for example, the craft must turn to the right if it is proceeding Northward, and to the left if it is proceeding Southward, in order to approach the line.

Reversal of the operation of the stepping switch is necessary because the ground stations already passed are now being approached again in the reverse order, and to properly interconnect the Preset Panel, the Directional Computer and the Pilot's Indicator Panel with the actual movement of the craft, the various preset constants which have already governed the flight must also be placed in control of the craft again in the reverse order.

A back tracking craft is controlled in its cross track movement just as it was when proceeding forward, the phase of any off-track voltage having been reversed. The pointer of indicator 104 moves backward, since the distance to destination is increasing rather than decreasing. For this reason contact 112' rather than contact 112 should control the operation of the stepping switch— this explains the need for pole changer 808. If it is desired to orbit thereafter, the reversal of the phase of the voltage proportional to $x_d$ brought about by reverser 565 insures that each craft circles the orbiting station in the opposite direction to that formerly used.

The foregoing explanation assumes that the craft reverses its direction of movement, but still follows the same track. It may be considered preferable that the craft in back tracking should follow the next adjacent emergency track on the side of the original track away from the axis. If this is to be accomplished, knob 106 is operated, at the time the back tracking maneuver is initiated, to the appropriate intermediate position—for a craft assigned to track 5 this position is that between tracks 5 and 6.

An interesting problem arises if the general order to backtrack is given when a particular craft is in the act of orbiting. Of course, operation of reversing switch 825 would set up the system for orbiting in the opposite direction about the same station, but this might easily cause the orbiting craft to cross an occupied track and could lead to collision. Therefore any orbiting craft under these conditions will follow the practice described above in connection with flight to avoid local storms across the track. By reverse operation of switch 1247 of Figure 21 the human pilot can take control of the craft away from the Directional Computer and restore it to the Automatic Pilot. Then by manual operation of turn control knob 1244 and visual observation of indicator 103 the human pilot can cause the craft to travel forward or backward along a remote track parallel to the center line of the assigned path, at any desired distance from his former assigned track within the range of the radio transmitter. The direction in which he follows this remote track must be coordinated with the position of switch 825, if the craft is to pass from one section of the path to an adjacent one.

If a craft practicing the invention develops trouble of some sort and is unable to keep to its schedule, the human pilot notifies the supervising ground personnel by radio, and at the same time moves knob 106 to the adjacent intermediate position furthest from the axis. The effect of this is to set contact arm 551 at one of the intermediate taps 556, and the craft accordingly is displaced to the emergency track between tracks 5 and 6, for example, if the pilot was assigned to track 5. He can now proceed at such a speed and in such a fashion as his emergency condition demands, without delaying or endangering the scheduled movement of other craft. Ground personnel can direct such changes in the tracks and elevations of scheduled craft as will clear a path for a distressed craft to make an emergency landing.

Now suppose that a craft in proceeding along track 5 at its assigned ground speed approaches $D_9$. The second Distance Measuring Equipment interrogator and Distance Converter must be turned on and allowed to reach a stable operating condition. This can of course be done automatically by further contacts operated by actuator 800 if desired. Pointer 114 is approaching zero in a counterclockwise direction. As it reaches zero, contacts 113 and 112 come into engagement, and actuator 800 operates the various stepping switches to their section 9 contacts. Here the Distance and Bearing Converters are tuned to the frequency of station $S_{10}$ rather than station $S_9$; the angle circuit is adjusted for a value $C_{10}$ of 116.7° rather than 30.4°. The $x_n$ portion of the computer is adjusted to $x_9$, and the $y_n$ portion of the computer is adjusted to $y_{10}$. The along track channel of the computer accordingly adjusts itself to the distance of the craft from station $S_{10}$, which turns out to be say 122.5 miles. The cross track channel of the computer however, is disconnected from the vector network and is instead connected to slider 844, positioned by the second Distance Measuring Equipment interrogator to represent $d_o$. When the large transient signals have died down and the lockout amplifier releases relay 680, the craft proceeds to orbit about station S₉, approaching station S₁₀ as it does so, and hence permitting pointer 114 to move back toward zero. As the change in course is completed, $y_p$ equals 100 miles, and contacts 112' and 113 engage, actuating the selector switch to the section 10 position. The settings here are the same except for the value of $x_n$, which becomes $x_{10}$, and except for the operation of switch 536 which removes the second Distance Measuring Equipment interrogator and converter from the circuit and restores the original Directional Computer configuration. The craft now proceeds along track number 5 in the new direction.

If the craft is backtracking along section 10 of the track and reaches D₉, the stepping switch operates in the reverse direction, changing $x_n$ to a value $x_0$ and substituting input 119 for inputs 36 and 37 in the cross track channel of the computer. The values of $y_n$ and $C_n$ remain unchanged at $y_{10}$ and $C_{10}$, however, and the principal DME interrogator as well as the ODR receiver are still tuned to S₁₀. Hence, although the craft follows a circular arc counterclockwise about S₉ as a center and of the desired radius, the indication of distance to destination does not return to zero, but increases past the 100 mile mark, because $y_p$ with respect to S₁₀ is still increasing.

No automatic advance at the end of the circular arc is accordingly possible in backtracking. On the other hand, the heading of the craft when the reverse turn has been completed is known if the wind direction and amount have been determined, and also the distance from station S₁₀ to the ends of the circular arcs for the several tracks can be tabulated and made available to the human pilot, who also has switch 111 conveniently located. For small changes in direction the distance information gives more accurate identification of the desired point, while for large changes in heading the angle information is more accurate; in either event the human pilot can observe approach of the craft to the point of tangency D₈ with the straight line, and when the craft appears to have reached that point manual operation of switch 111 into its upper position for a brief interval operates the stepping switch and establishes control of the craft by the computer, the constants of control being those relating to station S₈, and the backtracking flight can continue. Any residual error in the position of the craft caused by operation of switch 111 at an incorrect instant is automatically corrected by the computer.

Returning now to the original flight in a forward direction, the amplifiers of the Scheduling Computer should be warmed up ready for operation as D₁₀ is approached. The scheduled ground speed has been set on knob 107 (Figure 24) by the pilot, and the distance $y_g$ has been set on knob 75 (Figure 23) by the navigator. As the craft passes D₁₀, indicated by illumination of lamps 110 and 110', switch 370" (Figure 15a) is thrown to its "Schedule" position, and the Scheduling Computer is then energized as well as the Directional Computer.

Although winding 951 in Figure 16 was not previously energized, slider 954 has been maintained coordinated in its position with slider 722 by motor 734 to represent $y_p$. When switch 370" is thrown downward, the fixed phase of each of the motors 897 and 984 and of generators 917 and 1002, as well as the primary 861 of transformer 862 are energized. At first the input to amplifier 896 is solely determined by the position of slider 891, but as motor 897 begins to operate generator 917 also begins to supply a bucking voltage, and the system very quickly settles down to operate at a constant speed determined by the setting of knob 107. This operation moves sliders 935 and 1095 from the position in which they were set when knob 75 was adjusted to $y_g$, so that their positions at any subsequent time represent $y_t$. Slider 935 varies one of the voltages whose algebraic sum is impressed on amplifier 985, and slider 1095 increases the influence on the air speed of the craft of change in any output from slider 975, as time goes on.

By the principle of parallel summing, the input to amplifier 985 is zero, neglecting generator 1002, when slider 966 is at such a position that Equation 13 is satisfied. When the equation is not satisfied amplifier 985 is energized and motor 984 operates. The effect of generator 1002 in this circuit is the same as that previously recited in another connection, namely, to give antihunt properties, and will not be repeated. Operation of motor 984 adjust slider 966 and also sliders 974 and 975 to a position such that $y_d$ has a value satisfying Equation 13; thereafter the motor operates only enough to keep the equation satisfied as $\int V\, dt$ and $y_p$ change.

When slider 974 is displaced from its central position, alternating voltage proportional to the quantity $y_d$, the off schedule distance, is impressed on modulator 1047 and the unidirectional voltage output therefrom, appearing between conductors 1074 and 1075, is applied through switch 1080 (Figure 15b) to the horizontal needle of cross pointer indicator 126, just as voltage from conductors 673 and 674 is applied through switch 1034 to the vertical needle of the indicator. Indicator 126 therefore serves as a rough check on the position of the craft, and indeed, presents the only indication of off schedule distance available to the human pilot: a more accurate indication is available to the navigator on indicator 60.

Slider 975 of Figure 16 is also adjusted by operation of motor 984 to a position proportional to the magnitude of $y_d$. The voltage between slider 975 and center tap 983 is not equal to the off schedule distance, but to a function thereof $Ky_d$, where K may, for example, be equal to 2: to accomplish this the resistance of resistor 1093 was suitably set by the ground crew. As an example, suppose at a normal schedule speed of 200 miles per hour, the operation of the air speed channel 1177 of the Automatic Pilot requires 0.05 volt between conductors 1126 and 1127 in Figure 22 to produce a change in air speed of 1 mile per hour. Then a craft which is scheduled to be 100 miles from its destination and is 10 miles behind schedule must travel at 220 M. P. H. to make good its scheduled arrival, i. e., a voltage of 1.0 volt must be supplied.

Suppose a change of one mile in $y_t$ produces a change of 100 ohms in variable resistor 1096, and that resistor 1101 is 500 ohms. Suppose further that the voltage from center tap 983 to either end of winding 981 is 40 volts, corresponding to a maximum $y_d$ scale value of 20 miles. Then for the craft which is 10 miles behind schedule, the voltage between center tap 983 and slider 975 will be 20 volts, and for the craft which is 100 miles from destination, there will appear between conductors 1126 and 1127 a voltage of 1.0 volt, which is the voltage required. However, if correction of schedule is to be made half way to the destination, a voltage of two volts must be supplied. This is done by increasing the voltage across winding 981, adjustment being provided by variable resistor 1093. For example, if winding 981 is 500 ohms and transformer secondary winding 873 delivers 200 volts, then when resistor 1093 is adjusted to 125 ohms, K in Equation 7 will be 2. For K=2.5 the resistance of resistor 1093 is 0. Slider 1095 is continuously positioned by motor 987, so that the resistance between it and tap 1098 is a function of $y_t$. The voltage across conductors 1105 and 1106 is therefore proportional to $$K\frac{y_d}{y_t}$$

as previously pointed out, and this voltage appears at conductors 1114 and 1115 when relay 1110 is released, and is supplied by switch 1120 to conductors 1126 and 1127.

At the time D₁₀ is passed, switch 1480 in the throttle channel of the Automatic Pilot must be thrown from its downward to its upward position. Control of the throttle of the craft is now removed from the Automatic Pilot and given to the Scheduling Computer. The amplifier input circuit for the control extends from terminal 1504 (Figure 22) through ground connections 1515 and 1502, slider 1497, bridge 1481, slider 1491, conductor 1479, slider 1494', a portion of winding 1492' unless the slider is at center tap 1489, the center tap, conductors 1516 and 1127, movable contact 1123 (Figure 15b), fixed contact 1117, conductor 1115, movable contact 1121 and fixed contact 1119 of orbiting relay 614, conductor 1115, movable contact 1113 of relay 1110 (Figure 16), fixed contact 1106, conductor 1104, resistor 1101, conductors 1105 and 1114, fixed contact 1116 (Figure 15b), movable contact 1122, conductor 1126, fixed contact 1513 (Figure 22), movable contact 1512, and conductor 1517 to terminal 1503 of amplifier 1482.

At the moment when switch 1480 was thrown upwardly, throttle 1484 was at a position in which the desired air speed was being made good, to give a proper ground speed as determined by observation of the times at which the craft passed from section to section of the course or between known positions within the several sections. This gave sufficient accuracy for the remote portion of the flight, but as the terminus of arrival is approached greater accuracy is needed, and the Scheduling Computer provides this. As the craft now proceeds, indicator 69 (Figure 16) may move away from a central position, indicating that the actual distance to the destination does not agree with the schedule distance. If this happens, slider 975 is simultaneously displaced from the central position in which it was originally set, and a voltage equal to $$K\frac{y_d}{y_t}$$

is applied to amplifier terminals 1503 and 1504 of Figure 21. Throttle channel servomotor 1483 is energized, increasing the power of the craft, if falling behind schedule, to such a value that the loss of schedule will be made up by the time the craft is half way, for example, from its present position to the terminus D$_{11}$. The voltage supplied by Scheduling Computer 79 is essentially a correction voltage made necessary because of incorrect setting of knob 1498, and its effect in the throttle channel is exactly the same as though knob 1498' were turned to supply the same voltage, except that the correction is automatic and the additional voltage becomes zero as often as the craft is on schedule.

It may occur that once the craft has entered the last section of the flight, ground facilities may become disorganized for any of the well known reasons, and the craft cannot be allowed to complete its flight on schedule. Orbiting is no longer possible, except about station S$_{11}$ which is in a congested area near the landing strip where orbiting is dangerous. It may be necessary to back track, and for this reason phase reverser 893 is supplied in the circuit energizing voltage divider 890. It is more likely, however, that the craft will simply be assigned a new ground speed. To achieve this new ground speed the air speed of the craft must be changed. If there is a difference of only a few miles per hour, it may be sufficient merely to reset knob 107 at the new speed, and allow all the corrections to be made automatically by slider 1497. If the change is large, however, it is quicker and in some cases essential, due to the physical limitation of winding 981, to make a principal correction manually by operation of manual knob 1498, leaving the Scheduling Computer only the task of finally correcting the air speed to give exactly the required ground speed. Indeed, if a major change is required, the pilot should throw switch 1480 into its downward position, and correct entirely by knob 1498 as nearly as it can be done, restoring control to the Scheduling Computer only when the craft is again on the new schedule as indicated at 69. Motor 897 in the Scheduling Computer of course remains in operation during this manipulation.

As the terminus of arrival is approached, the receivers of the Instrument Landing System are warmed up so that their operation will be stable when needed. The cross pointer indicator is of course being used as a rough indicator for the Navigating Computer but when the craft passes D$_{11}$ the stepping switches are moved to their section 12 contacts. The telemetric transmitters and voltage dividers which are made effective thereby are not coordinated with any station, and in any case a prescribed let down procedure must at once be begun from that point on. Accordingly, as lamp 110 is illuminated to indicate arrival at D$_{11}$ the human pilot moves knobs 1163 and 1158 to their "off" positions: the letdown procedure can now be accomplished by means of manual knobs 1200, 1300, 1400 and 1498 of the Automatic Pilot.

As soon as the craft is reasonably within the range of the instrument landing beam, the human pilot moves knob 1163 to its "Land" position, and observes the vertical needle of cross pointer indicator 126. Probably this needle will be against one of its stops, since the craft is likely to be well to one side of the center of the landing beam, but as the letdown procedure is followed, the craft continues to approach the beam and the needle moves away from its stop toward the center. The craft is now ready for control in azimuth by the localizer receiver of the Instrument Landing System, which control is established, after bringing the craft into straight and level flight, by moving knob 1158 to its "Inbound" position.

The operation of the system as far as the roll and yaw axes of the craft are concerned is now the same, with one exception, as it was under computer control. The voltage supplied by Azimuth Coupling Unit 33 and added in the turn control circuit of the Automatic Pilot by conductors 1253 and 1254 (Figure 21) is derived from the localizer receiver through conductors 1131 and 1132, switch 685, and conductors 692 and 693 (Figure 15b). By this means any signal in the localizer receiver due to deviation of the craft from the landing beam is made use of to control the heading of the craft so that it returns to the beam.

The exception referred to above is that in the "Inbound" position of knob 1158 the supply of energy from the Azimuth Coupling Unit 33 to the precessing motor of the directional gyroscope is cut off, and instead conductors 1259' are short circuited through connection 1160'. This is largely a matter of preference, since by providing a precession motor capable of precessing the gyroscope at the high rates necessary in making automatic approaches the system as discussed heretofore could be used unchanged. However it is found more economical in some instances to supply a smaller precessing motor and forego gyroscopic stabilization of the Automatic Pilot during the original bracketing of the instrument landing beam. If this is to be done, the directional gyroscope must be prevented from nullifying the signals supplied by the Azimuth Coupling Unit in calling for change in heading: this is accomplished, as previously stated, by caging the gyroscope through means actuated upon movement of knob 1158, just as it is caged by operation of turn control knob 1244 during turns of the craft initiated by that knob.

When the horizontal needle of cross pointer indicator 126 moves away from its stop, the craft is entering the glide path beam of the Instrument Landing System. Before this the human pilot must bring the craft to the desired relatively low altitude and must also reduce the air speed of the craft to a safe value for landing. The importance of making any major change in the scheduled ground speed by knob 1498 (Figure 22) is now apparent. At the end of the flight air speed control by the computer is abandoned and control by the human pilot through the Automatic Pilot is resumed. If now the throttle channel network including sliders 1497, 1494 and 1494' is not approximately in balance, reversal in the position of switch 1480 introduces a large unbalance in the throttle channel and erratic control of the craft may result. Alternatively, switch 1480 may be simply opened and control of the throttle during landing will then be exercised solely by the normal manual control 1484'.

In any event, by operation of knob 1498, or handle 1484', and knob 1400 (Figure 21) the craft is brought to a suitable altitude and air speed for the final approach, and when the glide path beam is entered the human pilot moves knob 1158 to its "Glide" position. This operates switch 1447, opening elevator channel 1173 and adding in series therewith a voltage supplied on conductors 1147 and 1150 from the Glide Path Coupling Unit. Elevator channel 1173 having previously been in balance, the position of the elevator and hence the rate of descent of the craft is controlled by the Glide Path Coupling Unit, and is stabilized by vertical gyroscope 1167. In the same fashion the heading of the craft is then controlled by the Azimuth Coupling Unit and stabilized by directional gyroscope 1170. However, the switching means in Azimuth Coupling Unit 33 functions, when the craft is actually making the final descent, to disable the directional gyroscope caging means and instead to apply any off course signal to the precessing motor of the gyroscope through means 1160, as well as to the turn control circuit through means 1161. In this manner a permanent change in the stabilized heading of the craft accompanies corrective action of the Automatic Pilot, and the stabilizer function of the directional gyroscope is not lost by caging during this critical portion of the flight.

During the final approach therefore the ailerons, the rudder, and the precession motor of the directional gyroscope are controlled from the localizer receiver of the Instrument Landing System, the elevators are controlled from its glide path receiver, and the throttles are controlled by the human pilot either directly or through the Automatic Pilot. The marker beacon receiver operates its signal 127 to give the pilot the usual information as to approach to the field, and when within 100 feet of the ground the human pilot takes over by operating the main switch in the Automatic Pilot, not shown, and completes the landing manually.

It is of course well known that a "straight line" on the surface of the earth is in reality the arc of a great circle of a roughly spherical body, but for the short distances involved in any section of flight carried out using the apparatus of the invention no appreciable error is introduced by neglecting the third dimension and treating the problem on a purely two dimensional basis. This interpretation of the term "straight line" is to be understood in the foregoing specification and the subjoined claims.

It should be pointed out that in case of failure of one or more ground stations the pilot will be informed of this condition by radio and will resort to normal flight control by the Automatic Pilot across the area temporarily not served by radio. In such an event the computer should be deenergized until the craft is well within the service area of another ground station, as otherwise the erratic reception and consequent erratic operation of the computer could cause unpredictable movement of the craft: the operation of the Automatic Pilot can be relied upon within known limits and can be corrected by the magnetic compass carried by every craft, and is therefore preferable to unreliable radio apparatus.

When the craft is again within the reliable range of a ground station, control by the computer can be resumed. However, it is necessary to advance actuator 800 so that the selector switches are on the proper contacts of their respective banks. This is done by closing switch 111 upwardly, as seen in Figure 19 and opening it as many times as there have been stations out of operation. Each closure of switch 111 acts just as would the normal engagement of contacts 112 and 113, so that in a very brief interval the switches can be advanced to their proper position.

SUMMARY

From the foregoing it will be apparent that I have invented a system of air traffic control in which the movement of a craft can be controlled either by signals from an Instrument Landing System or by signals from an Omnidirectional Range and a Distance Measuring Equipment installation. The system is adapted for installation in craft equipped with a suitable Automatic Pilot and with suitable localizer, glide path, marker beacon and Omnidirectional Range receivers and a pair of Distance Measuring Equipment interrogators. The system includes converters for bearing and distance data, Azimuth and Glide Path Coupling Units, a Navigating Computer, a Preset Panel, and a Pilot's Indicator Panel, together with suitable interconnections and switching means, and can be modified to permit orbiting or back tracking in cases where delay is necessary. The Navigating Computer is in two parts, a Directional Computer which coordinates the movement of the craft with a particular straight line on the ground, and a Scheduling Computer used preferably during only the last section of the flight, and controlling the air speed of the craft so that it makes good a scheduled ground speed. In the practice of the invention extended flight under control of the Navigating Computer is made possible by dividing the desired route into a number of sections, providing ground stations for all sections, and including means for transferring control of the craft from one ground station to the next as the course is followed. Means are also provided for enabling a change in the direction of the straight line course at any point to be made. The invention contemplates the establishment of a network of such station in an area to be traversed, so that flights interconnecting all major cities in the area can be made automatically, supervision being of course retained by specially qualified ground personnel and exercised through radio communication with the various craft.

Numerous objects and advantages of my invention have been set forth in the foregoing description, together with details of the structure and function of the invention, and the novel features thereof have been clearly disclosed. The disclosure, however, is illustrative only, and I may make changes in detail, especially in matters of shape, size and arrangement of parts, within the principle of the invention, to the full extent indicated by the broad general meaning of the terms in which the appended claims are expressed.

I claim as my invention:

1. Supervisory means for use with a craft which is to follow a prescribed course made up of a number of sections in sequence comprising, in combination: radio stations each in a known position relative to one section of said course; radio receiving means carried by said craft and tunable to any one of said stations, for giving signals proportional to the distance and the bearing of said craft from said station; means energized by said signals to produce an effect proportional to a coordinate of the position of said craft in a Cartesian system; adjusting means for orienting the axes of said system with geographic axes having a selected relationship to the section of said course with which said station is associated, so that when said craft reaches the end of said section, said effect assumes a predetermined value; and means actuated when said effect assumes said value for tuning said receiving means to the succeeding station and for operating said adjusting means to orient the axis of said system with geographic axes having said selected relationship to the succeeding section of said course.

2. Supervisory means for use with a craft which is to follow a prescribed course, made up of a number of sections in sequence, comprising, in combination: radio stations each in a known position relative to one section of said course; radio receiving means, carried by said craft and tunable to any one of said stations, for giving signals proportional to the distance and the bearing of said craft from said station; means energized by said signals to produce a pair of effects proportional to the coordinates of the position of said craft in a Cartesian system; adjusting means for orienting the axes of said system with geographic axes having a selected relationship to the section of said course with which said station is associated, so that when said craft reaches the end of said section, one of said effects assumes a predetermined value; and means actuated when said one effect assumes said value for tuning said receiving means to the succeeding station and for operating said adjusting means to orient the axes of said system with geographic axes having said selected relationship to the succeeding section of said course.

3. Supervisory means for use with a craft which is to follow a prescribed course, made up of a number of sections in sequence, comprising, in combination: radio stations each in a known position relative to one section of said course; radio receiving means, carried by said craft and tunable to any one of said stations, for giving signals proportional to the distance and the bearing of said craft from said station; means energized by said signals to produce an effect proportional to a coordinate of the position of said craft in a Cartesian system; adjusting means for orienting the axes of said system with geographic axes having a selected relationship to the section of said course with which said station is associated, so that when said craft reaches the end of said section, said effect assumes a predetermined value; means controlling a component of the movement of the craft in accordance with said effect; and means actuated when said effect assumes said predetermined value for tuning said receiving means to the succeeding station and for operating said adjusting means to orient the axes of said system with the geographic axes having said selected relationship to the succeeding section of said course.

4. Supervisory means for use with a craft which is to follow a prescribed course, made up of a number of sections in sequence, comprising, in combination: radio stations each in a known position relative to one section of said course; radio receiving means, carried by said craft and tunable to any one of said stations, for giving signals proportional to the distance and the direction of said craft from said station; computing means energized by said signals to produce an effect proportional to a coordinate of the position of said craft in a Cartesian system; adjusting means for orienting the axes of said system with geographic axes having a selected relationship with the section of said course with which said station is associated, so that when said craft reaches the end of said section, said effect assumes a predetermined value; control means regulating a component of the movement of the craft in accordance with said effect; resetting means actuated when said effect assumes said value for tuning said receiving means to the succeeding station and for operating said adjusting means to orient the axes of said system with geographic axes having said selected relationship to the succeeding section of said course; and means preventing operation of said controlling means whenever said resetting means is in operation.

5. Supervisory means for use with a craft which is to follow a prescribed course, made up of a number of sections in sequence, comprising, in combination: first control means normally regulating a component of the movement of said craft; radio stations each in a known position relative to one section of said course; radio receiving means, carried by said craft and tunable to any one of said ground stations, for giving signals proportional to the distance and the direction of said craft from said station; computing means energized by said signals to produce an effect proportional to a coordinate of the position of said craft in a Cartesian system; adjusting means for orienting the axes of said system with geographic axes having a selected relationship to the section of said course with which said station is associated, so that when said craft reaches the end of said section, said effect assumes a predetermined value; second control means, independent of said first named control means, regulating said component of the movement of the craft in accordance with said effect; resetting means actuated when said effect assumes said value for tuning said receiving means to the succeeding station and for operating said adjusting means to orient the axes of said system with geographic axes having said selected relationship to the succeeding section of said course; and means preventing operation of said independent controlling means whenever said resetting means is in operation.

6. Apparatus for controlling the movement of a craft in accordance with a radio signal, comprising in combination, balanceable means effective when balanced to give an output determined by said signal, control means connected to said balanceable means for causing change in the movement of said craft in accordance with said output, and means connected to said balanceable means for preventing operation of said control means when the unbalance of said first named means exceeds a predetermined value.

7. In apparatus for controlling the movement of a craft, in combination: tunable radio receiving means giving outputs proportional to the bearing and the distance of said craft from a station of known location; means for tuning said receiving means; computing means deriving from said outputs a pair of signal voltages varying in accordance with the components of the displacement of said craft from said station on Cartesian coordinates; said computing means including means for translating and rotating the axes of said coordinates to determine the position of the ground station thereon; a preset panel including, for each of a plurality of ground spaces, a control bank having means for adjusting the tuning of said radio means and means for determining the translated and rotated position of said axes; means selectively connecting said banks in controlling relation to said tuning and computing means; means indicating which of said banks is so connected, and means responsive to the magnitude of said signal voltages.

8. In a device of the class described, in combination, means for indicating the magnitude of a variable quantity, switching means actuable to connect said indicating means to indicate a plurality of such quantities in a predetermined succession, and means connecting said indicating means to said switching means, to actuate said switching means each time said indicating means gives a predetermined indication.

9. Means for controlling the flight of an aircraft so that it moves along a selected ground path between a terminus of origin and a terminus of destination comprising, in combination: a radio station located on the ground and emitting radiations having characteristics which vary, at the point of reception, with distance and direction of propagation; radio receiving means in said craft for deriving, from said radiations, outputs proportional to the bearing and distance of said craft from said station; computing means connected to said receiving means for deriving from said outputs a signal proportional to the distance by which said craft is off its course, an automatic pilot for normally maintaining said craft in straight and level flight, and means connecting said computing means to said automatic pilot to change the heading of said craft in accordance with said signal.

10. Means for controlling the flight of an aircraft so that it moves at a scheduled rate between a terminus of origin and a terminus of destination comprising, in combination: a radio station located on the ground and emitting radiations having characteristics which vary, at the point of reception, with distance and direction of propagation; radio receiving means in said craft for deriving, from said radiations, outputs proportional to the bearing and distance of said craft from said station; computing means connected to said receiving means for deriving from said outputs a signal proportional to the distance by which said craft is off its schedule, control apparatus for normally maintaining said craft in flight at a selected airspeed, and means connecting said computing means to said control apparatus to change the airspeed of said craft in accordance with said signal.

11. In a device of the class described, in combination: means energizable with a pair of alternating voltages of like frequency to give a unidirectional voltage which varies in magnitude and reverses in polarity with variation in the amount and reversal in the direction of the phase displacement between said pair of alternating voltages, phase adjusting means included in said first named means and movable out of an inoperative position to adjust the phase of one of the voltages of said pair; motor means for causing operation of said phase adjusting means; means causing operation of said motor means, in accordance with said unidirectional voltage, so as to operate said phase adjusting means to reduce said voltage to zero; means actuated from a zero position by said motor means to give a mechanical output proportional to the adjustment of said phase adjuster from the inoperative position thereof; and means giving a unidirectional output voltage which varies in magnitude with said unidirectional voltage, and which is of the same polarity regardless of the polarity of said unidirectional voltage.

12. In a device of the class described, in combination: means energizable with a pair of alternating voltages of like frequency to give a unidirectional voltage which varies in magnitude and reverses in polarity with variation in the amount and reversal in the direction of the phase displacement between said pair of alternating voltages; phase adjusting means included in said first named means and movable out of an inoperative position to adjust the phase of one of the voltages of said pair; motor means for causing operation of said phase adjusting means; means causing operation of said motor means, in accordance with said unidirectional voltage, so as to operate said phase adjusting means to reduce said voltage to zero; and means actuated from a zero position by said motor means to give a mechanical output proportional to the adjustment of said phase adjuster and hence to said angle.

13. Apparatus for supervising the movement of a craft along an assigned path comprising, in combination: first means adjustable in accordance with the direction of said assigned path; second means variable in accordance with the distance and direction of said craft from a first point of known position; third means adjustable in accordance with the component, along said path, of the distance between said first point and a second point; interconnections joining said first, second and third means to comprise portions of a normally energized balanceable system; fourth means operable to balance said system; and means supplying an output in accordance with operation of said balancing means, the normal condition of said apparatus being that in which said output is zero when said craft is at said second point.

14. Apparatus responsive to deviation of a craft from a predetermined schedule of movement along a path divisible into successive sections each adjacent to a control point, comprising, in combination: computing means adjustable to give a first signal in accordance with the along course distance of the craft from the end of a section of the path; means for severally causing adjustment of said computing means in accordance with the distances of successive control points along the path from the ends of the adjacent path sections; means for successively connecting said last named means in adjusting relation to said computing means in the order in which said path sections are encountered in movement of the craft; means actuating said connecting means whenever said first signal reaches a selected value corresponding to arrival of the craft at the end of a path section; means giving a second signal in accordance with the scheduled distance of the craft from the end of a final path section; means giving an output in accordance with the relation between said signals; means energizing said two last named means at the same time that the last selecting means is connected to said computing means; and means responsive to said output.

15. Apparatus for use in a dirigible craft which is to move along a selected straight path, comprising, in combination: first means giving a mechanical output determined by the distance of the craft from a point whose displacement from the selected path is known; second means giving a mechanical output determined by the bearing of the craft from said point, measured from a zero of direction with respect to which the selected path makes a known angle; computing means connected to said first and second means, and adjustable in accordance with said displacement and said known angle to derive from said outputs a first effect proportional to a coordinate of the actual position of the craft in a Cartesian system whose axis of ordinates is aligned with the selected path; further means adjustable to produce a second effect proportional to the like coordinate of a selected position of the craft in said Cartesian system; and signal means connected to said computing means and said further means for giving a signal which varies in accordance with any disparity between said effects.

16. Apparatus for use in a dirigible craft which is to move at a selected rate along a selected straight path comprising, in combination: first means giving a mechanical output determined by the distance of the craft from a first point whose displacement from a second point is known in terms of its components along and normal to the selected path; second means giving a mechanical output determined by the bearing of the craft from said first point, measured from a zero of direction with respect to which the selected path makes a known angle; computing means connected to said first and second means, and adjustable in accordance with said components and said known angle, to derive from said outputs a first effect proportional to a coordinate of the actual position of the craft in a Cartesian system whose origin is at said second point and whose axis of ordinates is aligned with the selected path; further means for producing a second effect proportional to the like coordinate of the scheduled position of the craft in said Cartesian system; and signal means connected to said computing means and said further means for giving a signal which varies in accordance with any disparity between said effects.

17. In a device of the class described, in combination: radio responsive means giving first and second outputs proportional respectively to the distance and bearing of a dirigible craft from a ground station; computing means connected to said radio responsive means and actuated by said outputs to give a signal which varies in accordance with departure of the craft from a selected path passing at a known distance from the ground station; and means in said computing means operable to eliminate therefrom the effect of said second output, so that said signal thereafter varies in accordance with departure of the craft from a circular path centered on the ground station and having said known distance as its radius.

18. Apparatus of the class described comprising, in combination: tunable radio responsive means giving outputs in accordance with the distance and direction of a dirigible craft from a radio transmitting station to which said means is tuned; computing means connected to said radio responsive means and adjustable in accordance with the direction of the section of a path to be followed which is associated with the radio station, the distance of that path section from the radio station, and the position of a destination therealong, to derive from said outputs a signal which is a measure of the distance from the craft to the destination; means presettable to a plurality of sets of values associated with a plurality of such radio stations, including the desired tuning of said radio responsive means, the direction of the path section, its distance from the station, and the position of the destination along the path section; selecting means connected to said presettable means and operable to select said sets of values in a predetermined sequence; means connected to said selecting means, said computing means, and said radio responsive means for tuning said radio responsive means and adjusting said computer in accordance the values comprising the particular set selected by said selecting means; and control means connected to said selecting means and said computing means for operating said selecting means to select a new set of said values each time said signal assumes a predetermined magnitude.

19. Apparatus according to claim 18 together with means connected to said control means for reversing the sense of operation of said selecting means so that said predetermined signals are reversed.

20. Apparatus according to claim 18 in which said computing means includes means giving a further pair of signals which are proportional respectively to the components, parallel and normal to the path, of the displacement of the craft from a scheduled position on the path; and means connected to said computing means for controlling the heading and airspeed of the craft in accordance with said further signals.

21. Apparatus according to claim 18 in which said computing means includes means giving a further signal proportional to one of two mutually perpendicular components of the displacement of the craft from a scheduled position on the path, one of said components being parallel to the path; and means connected to said computing means for controlling the movement of the craft in accordance with said further signal.

22. In an electrical analogue computer, in combination: means adjustable to give a first output representing the displacement of a fixed point from a standard path; means adjustable to give a second output representing the direction of the standard path relative to a standard direction; means adjustable to give a third output representing the displacement from the standard path of a selected one of a plurality of paths parallel to said standard path; further means giving outputs representing the distance and direction of a movable point from the fixed point; and means connected to said adjustable means and said further means for combining said outputs to give a signal representing the displacement of the movable point from the selected path.

23. In an electrical analogue computer, in combination: means adjustable to give a first output representing the displacement of a fixed point from a standard path; means adjustable to give a second output representing the direction of the standard path relative to a standard direction; means adjustable to give a third output representing the displacement of a desired path from the standard path; means adjustable to give a fourth output representing the component parallel to the standard path of the distance from the fixed point to a point of destination; radio responsive means giving a further output representing the component parallel to the standard path of the distance from the fixed point to a dirigible craft; and means connected to said adjustable means and said radio responsive means for combining said outputs to give a signal representing the actual component, parallel to the standard path, of the distance from the craft to the destination.

24. In an electrical analogue computer, in combination: means adjustable to give a first output representing the displacement of a fixed point from a standard path; means adjustable to give a second output representing the direction of the standard path relative to a standard direction; means adjustable to give a third output representing the displacement of a desired path from the standard path; means adjustable to give a fourth output representing the component parallel to the standard path, of the distance from the fixed point to a point of destination; radio responsive means giving a further output representing the component parallel to the standard path of the distance from the fixed point to a dirigible craft; means for supplying a second signal representing the scheduled component, parallel to the standard path, of the distance from the craft to the destination; and means energized with said first and second signals to give a further signal representing off schedule distance of the craft.

25. Apparatus of the class described comprising, in combination: first means giving a signal in accordance with the off scheduled distance of a dirigible craft; second means connected to said first means for controlling the airspeed of the craft in accordance with said signal; and means connected to said second means for reducing said signal in inverse proportion to the distance of the craft from its destination.

26. Apparatus of the class described comprising, in combination: first means giving a signal in accordance with the off schedule distance of a dirigible craft; second means connected to said first means for controlling the airspeed of the craft in accordance with said signal; means connected to said second means for reducing said signal in inverse proportion to the distance of the craft from its destination; and means in said first named means for increasing the proportion of the signal supplied relative to the distance of the craft from its destination.

27. Apparatus for supervising the movement of a craft along an assigned path comprising, in combination: a resistive resolver for giving an electrical output which is the product of a first variable multiplied by a trigonometric function of a second variable; means supplying a signal to said resolver as said first variable which is determined by the distance of the craft from a point of known position relative to the path; means supplying a further signal to said resolver as said second variable which is determined by the direction of the craft from said point and by the direction of the path; means giving a second electrical output which is determined by the distance from the path to said point; further means adjustable to give a variable electric output; interconnections joining said resolver and the two last named means to comprise a normally energized balanceable system; and means supplying an output signal determined by the unbalance of said system, the normal condition of said apparatus being that in which the output signal from said balanceable system is zero when the craft is on the assigned path.

28. Apparatus for supervising the movement of a craft along an assigned path comprising, in combination: means giving a first electrical signal determined by the component, along the path, of the actual distance between the craft and a point of known location; means giving a second electrical signal determined by the like component of the desired distance between the position of the craft and said point; further means adjustable to provide a variable electrical signal; interconnections joining the above named means to comprise a normally energized balanceable system; and means supplying an output signal determined by the unbalance of said system, the normal condition of said apparatus being that in which said output signal from said balanceable system is zero when the craft is at the distance from the point of known location required by its schedule.

29. Apparatus responsive to departure of a craft from a desired path having a straight portion, of known direction and distance from an adjacent first control point, and a circular portion tangent to said straight portion and centered on an adjacent second control point, comprising, in combination: a computer normally giving an output determined by departure of the craft from a straight path, said output having a first component adjustable in accordance with the distance from the straight portion of the path to the first control point, and a further component adjustable as a linear function of the distance from the first control point to the craft and as a trigonometric function of the direction of the craft from the control point and of the direction of the path; a first device adjustable to give an output in accordance with the radius of said circular portion; a second device adjustable to give an output in accordance with the distance from the second control point to the craft; and means operable when the craft is about to begin the curved portion of the track to substitute said first and second devices for said first and further components of said computer, so that the output thereof is thereafter determined by departure of the craft from the circular path.

30. Apparatus responsive to departure of a craft from a desired path having a straight portion, of known direction and distance from an adjacent first control point, and a circular portion tangent to said straight portion and centered on an adjacent second control point, comprising, in combination; a computer normally giving an output determined by departure of the craft from a straight path, said output having a first component adjustable in accordance with the distance from the straight portion of the path to the first control point, and a further component adjustable as a linear function of the distance from the first control point to the craft and as a trigonometric function of the direction of the craft from the control point; a first device adjustable to give an output in accordance with the radius of said circular portion; a second device adjustable to give an output in accordance with the distance from the second control point to the craft; and means operable when the craft is about to begin the curved portion of the track to substitute said first and second devices for said first and further components of said computer, so that the output thereof is thereafter determined by departure of the craft from the circular path.

31. Apparatus responsive to departure of a craft from a desired path having a straight portion, of known direction and distance from an adjacent first control point and a circular portion tangent to said straight portion and centered on an adjacent second control point, comprising, in combination: a computer normally giving a first output determined by departure of the craft from a straight path and a second output determined by the distance, along the path, from the end thereof to the craft, said second output having a first component adjustable in accordance with the distance from the straight portion of the path to the first control point, a second component adjustable in accordance with the distance along the path from the first control point to the end of the straight portion of the path, and a further component adjustable as a linear function of the distance from the first control point to the craft and as a trigonometric function of the direction of the craft from the control point and of the direction of the path; a first device adjustable to give an output in accordance with the radius of said circular path; a second device adjustable to give an output in accordance with the distance from the second control point to the craft; and means actuated when said second computer output becomes zero to substitute said first and second devices for said first and further components of said computer, so that the first output of said computer is thereafter determined by departure of the craft from the circular path.

32. Apparatus responsive to departure of a craft from a desired straight path having a known direction and divided into at least two portions having known distances from adjacent control points comprising, in combination: a computer giving an output which is initially determined by departure of the craft from the first portion of the path and including first signal means supplying a signal determined by the distance from the first portion of the path to the adjacent first control point, second signal means supplying a signal determined by the direction of the path, third and fourth adjustable signal means, means connected to said third and fourth signal means for normally adjusting the same in accordance with the distance and direction respectively of the craft from the first control point, a resolver giving a further signal which is a linear function of a first input and a trigonometric function of a second input, means supplying the signal from said third signal means as the first input to said resolver, means supplying the signals from said second and fourth signal means as the second input to said resolver, and means supplying the output from said computer in accordance with the signals from said first signal means and said resolver; and computer sequencing means connected to said computer and including further signal means supplying a signal determined by the distance from the second portion of the path to the adjacent second control point and means operable to substitute said further signal means for said first signal means and to cause adjustment of said third and fourth signal means in accordance with the distance and direction respectively of the craft from the second control instead of from the first control point.

33. Apparatus responsive to departure of a craft from a desired straight path having a known direction and divided into at least two portions having known distances from adjacent control points comprising, in combination: a computer giving a first output which is initially determined by departure of the craft from the first portion of the path and a second output which is initially determined by the distance, along the path, from the craft to the end of the first portion of the path, and including first signal means supplying a signal determined by the distance from the first portion of the path to the adjacent first control point, second signal means supplying a signal determined by the direction of the path, third and fourth adjustable signal means, means connected to said third and fourth signal means for normally adjusting the same in accordance with the distance and direction respectively of the craft from the first control point, fifth signal means supplying a signal determined by the distance along the path from the craft to the end of the first portion of the path, further signal means supplying a signal determined by the distance along the path from the first control point to the end of the path, a resolver giving a pair of further signals each of which is a linear function of a first input and a trigonometric function of a second input, means supplying the signal from said third signal means as the first input to said resolver, means supplying the signals from said second and fourth signal means as the second input to said resolver, means supplying a first output from said computer in accordance with the signal from said first signal means and one of said resolver signals, and means supplying the second output from said computer in accordance with the signal from said fifth signal means and the other of said resolver signals; and computer sequencing means connected to said computer and including first and second further signal means supplying signals determined respectively by the distance from the second portion of the path to the second control point and by the distance, along the path, from the second control point to the end of the second portion of the path, and means connected to said computer and operable in response to said second computer output becoming zero to substitute said further signal means for said first and fifth signal means and to cause adjustment of said third and fourth signal means in accordance with the distance and direction respectively of the craft from the second control point instead of from the first control point.

34. Apparatus for use in supervising the movement of a craft along a desired straight path having a known direction and divided into at least two portions having known distances from adjacent control points comprising, in combination: a computer normally giving an output determined by the distance, along the path, from the craft to the end of the path and including first signal means supplying a signal determined by the distance, along the path, from the adjacent first control point to the end of the first portion of the path, second signal means supplying a signal determined by the direction of the path; third and fourth adjustable signal means, means connected to said third and fourth signal means for normally adjusting the same in accordance with the distance and direction respectively of the craft from the first control point, a resolver giving a further signal which is a linear function of a first input and trigonometric function of a second input, means supplying the signal from said third signal means as the first input to said resolver, means supplying the signals from said second and fourth signal means as the second input to said resolver, and means supplying the output from said computer in accordance with the signals from said first signal means and said resolver; and computer sequencing means connected to said computer and including further signal means supplying a signal determined by the distance, along the path, from the second control point to the end of the second portion of the path, and means operable to substitute said further signal means for said first signal means and to cause adjustment of said third and fourth signal means in accordance with the distance and direction of the craft from the second control point instead of from the first control point.

35. Apparatus for use in supervising the movement of a craft along a desired straight path having a known direction and divided into at least two portions having known distances from adjacent control points comprising, in combination: a computer normally giving an output determined by the distance, along the path, from the craft to the end of the path and including first signal means supplying a signal determined by the distance, along the path, from the adjacent first control point to the end of the first portion of the path, second signal means supplying a signal determined by the direction of the path; third and fourth adjustable signal means, means connected to said third and fourth signal means for normally adjusting the same in accordance with the distance and direction respectively of the craft from the first control point, a resolver giving a further signal which is a linear function of a first input and a trigonometric function of a second input, means supplying the signal from said third signal means as the first input to said resolver, means supplying the signals from said second and fourth signal means as the second input to said resolver, and means supplying the output from said computer in accordance with the signals from said first signal means and said resolver; and computer sequencing means connected to said computer and including further signal means supplying a signal determined by the distance, along the path, from the second control point to the end of the second portion of the path, and null-responsive means connected to said computer and operable when said output becomes null to substitute said further signal means for said first signal means and to cause adjustment of said third and fourth signal means in accordance with the distance and direction of the craft from the second control point instead of from the first control point.

36. Apparatus for use in supervising the movement of a craft along a desired path having first and second straight portions, the directions of said straight portions and the locations of first and second control points respectively adjacent thereto being known, comprising, in combination: a computer giving an output which is initially determined by the distance, measured along the first straight portion of the path, from the craft to the end of said first portion and including first signal means supplying a signal determined by the distance, measured along the first straight portion of the path, from the first control point to the end of said first portion, second signal means giving a signal determined by the direction of said first portion, third and fourth adjustable signal means, means connected to said third and fourth signal means for normally adjusting the same in accordance with the distance and direction respectively of the craft from the first control point, a resolver giving a further signal which is a linear function of a first input and a trigonometric function of a second input, means supplying the signal from said third signal means as the first input to said resolver, means supplying the signals from said joint second and fourth signal means as the second input to said resolver, and means supplying an output from said computer in accordance with the signals from said first signal means and said resolver; and computer sequencing means connected to said computer and including further signal means supplying a signal determined by the distance, measured along the second straight portion of the path, from the second control point to the end of said second portion and means operable to substitute said further signal means for said first signal means and to cause adjustment of said third and fourth signal means in accordance with the distance and direction respectively of the craft from the second control point instead of from the first control point.

37. Apparatus for use in supervising the movement of a craft along a desired path having first and second straight portions and an intermediate circular portion tangent to said straight portions, at least the second straight portion being of a predetermined length, the directions of said straight portions and the locations of first and second control points respectively adjacent thereto being known, and the circular portion being of known radius and being centered on a third control point of known location adjacent thereto, comprising, in combination: a self-balancing computer giving a first output which is initially determined by the departure of the craft from the first straight portion of the path and a second output which is initially determined by the distance, measured along said first straight portion, between the end thereof and the position of the craft, and including first and second signal means supplying signals determined respectively by the distance of said first portion from said first control point and by the distance, measured along said first portion, from the end thereof to said first control point, third signal means supplying a signal determined by the direction of said first straight portion, a resolver giving first and second further signals each of which is a linear function of a first input and a trigonometric function of a second input, fourth and fifth adjustable signal means, means connected to said fourth and fifth signal means for normally adjusting the same in accordance with the distance and direction respectively of the craft from the first control point, means supplying the signal from said fourth signal means as the first input to said resolver, means supplying the signals from said third and fifth signal means as the second input to said resolver, first and second adjustable balancing signal means, means adjusting the first balancing signal means and varying the first output of the computer in accordance with signals from said first signal means and said resolver, and means adjusting the second balancing signal means and varying the second output of the computer in accordance with signals from said second signal means and said resolver; and computer sequencing means connected to said computer and including first further signal means, means connected to adjust said first further signal means in accordance with the distance of the craft from the third control point, second and third further signal means supplying signals determined respectively by the distance of the second straight portion of the path from the second control point and by the distance, measured along said second portion, from the end thereof to said second control point, fourth further signal means supplying a signal determined by the desired radius of the circular portion of the path, fifth further signal means supplying a signal determined by the direction of said second straight portion, means connected to said computer and operative upon said second computer output becoming zero to substitute the signals from said first, third, fourth and fifth further signal means for the first output from said resolver and for the signals from said second, first and third signal means respectively and to cause adjustment of said fourth signal means and said fifth signal means in accordance with the distance and direction respectively of the craft from the second control point instead of from the first control point, and means operative upon said second computer output subsequently exceeding the value corresponding to said predetermined length and thereafter decreasing to said value for substituting the signals from said second and fifth further means and the first resolver output for the signals from said fourth further signal means, said third signal means and said first further signal means.

38. Apparatus for use in supervising the movement of a craft along a desired path having a first, circular portion of known radius about a first adjacent control point as a center and a second, straight portion of predetermined length, the direction of said straight portion and the location of a second control point adjacent thereto being known, comprising, in combination: a computer giving a first output which is initially determined by the radial departure of the craft from the circular course and the second output which is determined by the distance, measured along the straight portion of the path, between the end thereof and the location of the craft, and including first signal means supplying a signal determined by the known radius of said circular portion, second signal means supplying a signal determined by the distance, measured along said straight portion, between the end thereof and said second control point, third signal means supplying a signal determined by the direction of said straight portion, fourth and fifth adjustable signal means, means connected thereto for normally adjusting the same in accordance with the distance and direction respectively of the craft from the second control point, a resolver giving first and second further signals each of which is a linear function of a first input and a trigonometric function of a second input, means supplying the signal from said fourth signal means as said first resolver input, means supplying the signals from said third and fifth signal means as said second resolver input, sixth adjustable signal means, means connected thereto for adjusting the same in accordance with the actual distance from the craft to the first control point, means varying the first output of the computer in accordance with signals from said first and sixth signal means, and means varying the second output of the computer in accordance with the signal from said second signal means and the second signal from said resolver; and computer sequencing means including further signal means supplying a signal determined by the distance of the straight portion of the path from said second control point and means connected to said computer and operative upon said second computer output becoming proportional to said predetermined length to substitute the signal from said further signal means and the first output of said resolver for the signals from said sixth and first signal means, respectively.

39. Apparatus for use in supervising the movement of a craft with respect to a path having a first straight section, a circular section tangent thereto, and a second straight section tangent to said circular section comprising, in combination: an adjustable computer giving a pair of outputs, means initially adjusting said computer in accordance with characteristics of said first straight section and of craft movement so that said outputs are representative of the components, perpendicular and parallel respectively to said first section, of the distance from the end thereof to the craft, means energized with said second output to cause a first readjustment of said computer, when said second output becomes substantially zero, in accordance with characteristics of said circular and second straight sections of the path and of craft movement, so that said outputs become representative of the radial displacement of the craft from the circular section and of the component, along said second straight section, of the distance from the end thereof to the craft, and to thereafter cause a second readjustment of said computer when said second output first exceeds and then decreases to a predetermined value to cause a further readjustment of said computer in accordance with characteristics of said second straight section of the path and of craft movement so that said outputs become representative of the components, perpendicular and parallel to said second section, of the distance from the end thereof to the craft.

40. Apparatus for use in supervising the movement of a craft with respect to a straight line path divided into a plurality of sections comprising, in combination: an adjustable computer giving first and second outputs, means initially adjusting said computer in accordance with characteristics of the first section of the path and of the movement of a craft, so that said outputs are representative respectively of the components, perpendicular and parallel to said section, of the distance from the end thereof to the craft, and means energized with said second output for readjusting said computer each time said second output becomes substantially zero, in accordance with characteristics of a successive section of said path, so that said outputs become representative of the components perpendicular and parallel to said successive sections of the successive distances from the ends thereof to the craft.

41. Apparatus for use in a dirigible craft which is to move along a selected straight path comprising, in combination: first means giving a mechanical output determined by the distance of the craft from a first point whose displacement from a second point is known in terms of the components of said displacement along and normal to the selected path; second means giving a mechanical output determined by the bearing of the craft from said first point, measured from a zero of direction with respect to which the selected path makes a known angle; computing means connected to said first and said second means, and adjustable in accordance with said components and said known angle to derive from said outputs a first effect proportional to a coordinate of the actual position of the craft in a Cartesian system whose origin is at said second point and whose axis of ordinates is aligned with the selected path; further means adjustable to produce a second effect proportional to the like coordinate of a desired position of the craft in said Cartesian system; signal means connected to said computing means and said further means for giving a signal which varies in accordance with any disparity between said effects; means presettable in accordance with sets of data, each including said known angle and said components of displacement, for a series of said points associated respectively with a series of sections of said path; and means connected to said last named means and to said computing means for adjusting said computing means in accordance with the data included in successive sets as the craft moves through successive sections of said path.

42. Means for controlling the flight of an aircraft so that it moves according to a program between a terminus of origin and a terminus of destination comprising, in combination: a radio station located on the ground and emitting radiations having characteristics which vary, at the point of reception, with distance and direction of propagation, radio receiving means in the craft for deriving, from said radiations, outputs proportional to the bearing and distance of said craft from said station; computing means connected to said receiving means for deriving from said outputs a signal proportional to the amount by which said craft has departed from its programmed movement; control means for normally maintaining said craft in a selected flight condition; and means connecting said computing means to said control means to change the condition of flight of said craft in accordance with said signal.

43. Apparatus for use in a dirigible craft which is to move at a selected rate comprising, in combination: first means giving a mechanical output determined by the distance of the craft from a first point whose displacement from a second point is known in terms of its components along and normal to the selected path; second means giving a mechanical output determined by the bearing of the craft from said first point, measured from a zero of direction with respect to which the selected path makes a known angle; computing means connected to said first and second means, and adjustable in accordance with said components and said known angle to derive from said outputs a first effect proportional to the distance of the craft from a line through said second point and perpendicular to said path; further means for producing a second effect proportional to the like coordinate of the scheduled distance of the craft from said destination; and signal means connected to said computing means and to said further means for giving a signal which varies in accordance with any disparity between said effects.

References Cited in the file of this patent

UNITED STATES PATENTS

| | | |
|---|---|---|
| 1,086,729 | Rey | Feb. 10, 1914 |
| 1,215,815 | Kaminski et al. | Feb. 13, 1917 |
| 1,896,805 | Sperry et al. | Feb. 7, 1933 |
| 1,947,018 | Plastino | Feb. 13, 1934 |
| 2,171,293 | Plastino | Aug. 29, 1939 |
| 2,204,438 | Neufeld | June 11, 1940 |
| 2,280,117 | Crane et al. | Apr. 21, 1942 |
| 2,288,102 | Meredith | June 30, 1942 |
| 2,293,570 | Stibitz | Aug. 18, 1942 |
| 2,320,066 | Bristol | May 25, 1943 |
| 2,322,225 | Crane et al. | June 22, 1943 |
| 2,331,698 | Keeler | Oct. 12, 1943 |
| 2,338,536 | Plaut-Carcasson | Jan. 4, 1944 |
| 2,364,102 | Sessums | Dec. 5, 1944 |
| 2,374,480 | Glass | Apr. 24, 1945 |
| 2,390,383 | Neufeld | Dec. 4, 1945 |
| 2,423,336 | Moseley | July 1, 1947 |
| 2,458,361 | Field et al. | Jan. 5, 1949 |
| 2,465,624 | Agins | Mar. 29, 1949 |
| 2,472,129 | Streeter | June 7, 1949 |
| 2,508,082 | Wald | May 16, 1950 |
| 2,508,565 | Chance | May 23, 1950 |
| 2,509,632 | Field | May 30, 1950 |
| 2,515,495 | Curry | July 18, 1950 |
| 2,569,328 | Omberg | Sept. 25, 1951 |
| 2,593,950 | Williams | Apr. 22, 1952 |
| 2,599,889 | Biggs et al. | June 10, 1952 |
| 2,612,331 | Frazier et al. | Sept. 30, 1952 |
| 2,613,339 | Palmer | Oct. 7, 1952 |

OTHER REFERENCES

"Theory of Servomechanisms," by James, Nichols and Phillips; McGraw-Hill Book Co. Inc., 1947, pages 108 and 109.